United States Patent
Slaughter et al.

(10) Patent No.: US 6,973,493 B1
(45) Date of Patent: Dec. 6, 2005

(54) MECHANISM AND APPARATUS FOR SECURITY OF NEWLY SPAWNED REPOSITORY SPACES IN A DISTRIBUTED COMPUTING ENVIRONMENT

(75) Inventors: Gregory L. Slaughter, Palo Alto, CA (US); Thomas E. Saulpaugh, San Jose, CA (US); Bernard A. Traversat, San Francisco, CA (US); Mohamed M. Abdelaziz, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 768 days.

(21) Appl. No.: 09/653,241

(22) Filed: Aug. 31, 2000

Related U.S. Application Data

(60) Provisional application No. 60/202,975, filed on May 9, 2000, provisional application No. 60/208,011, filed on May 26, 2000, provisional application No. 60/209,430, filed on Jun. 2, 2000, provisional application No. 60/209,140, filed on Jun. 2, 2000, provisional application No. 60/209,525, filed on Jun. 5, 2000.

(51) Int. Cl.[7] .................. G06F 15/167; G06F 15/173; G06F 16/16
(52) U.S. Cl. ...................... 709/225; 709/212; 709/216; 709/229; 705/14
(58) Field of Search ............................. 709/225, 212, 709/216, 229

(56) References Cited

U.S. PATENT DOCUMENTS

| 4,491,946 A | 1/1985 | Kryshow, Jr. et al. |
| 4,713,806 A | 12/1987 | Oberlander et al. |

(Continued)

FOREIGN PATENT DOCUMENTS

| EP | 300 516 | 1/1989 |

(Continued)

OTHER PUBLICATIONS

"T Spaces", Wyckoff, McLaughry, Lehman and Ford, IBM Systems Journal—vol. 37, No. 3, 1998.*

(Continued)

*Primary Examiner*—David Wiley
*Assistant Examiner*—Arrienne M. Lezak
(74) *Attorney, Agent, or Firm*—Meyertons Hood Kivlin Kowert & Goetzel, P.C.; Robert C. Kowert

(57) ABSTRACT

A system and method for providing security for newly spawned spaces in a distributed computing environment. A client may access a first space service. The creation of a second space may be requested, such as by the client sending an appropriate request to an interface of the first space. In one embodiment, the first space and second space may share a common storage model, storage facility, and/or XML schema. The second space may initially be configured to permit access only to the requesting client. In one embodiment, a root authentication token is created for the second space. An authentication service associated with the second space may be initialized, whereby the second space is configured to permit access only to a client holding the root authentication token. The root authentication token may be sent to the requesting client or service. The requesting client may send the root authentication token to a second client. The second client may then access the second space by sending to the second space at least one of the messages specified in the second schema along with the root authentication token. The requesting client may also modify the initially configured security policy of the second space such that the second space is configured to permit access to other clients.

33 Claims, 32 Drawing Sheets

U.S. PATENT DOCUMENTS

| | | |
|---|---|---|
| 4,809,160 A | 2/1989 | Mahon et al. |
| 4,823,122 A | 4/1989 | Mann et al. |
| 4,939,638 A | 7/1990 | Stephenson et al. |
| 4,956,773 A | 9/1990 | Saito et al. |
| 5,088,036 A | 2/1992 | Ellis et al. |
| 5,109,486 A | 4/1992 | Seymour |
| 5,187,787 A | 2/1993 | Skeen et al. |
| 5,218,699 A | 6/1993 | Brandle et al. |
| 5,257,369 A | 10/1993 | Skeen et al. |
| 5,293,614 A | 3/1994 | Ferguson et al. |
| 5,297,283 A | 3/1994 | Kelly, Jr. et al. |
| 5,307,490 A | 4/1994 | Davidson et al. |
| 5,311,591 A | 5/1994 | Fischer |
| 5,339,435 A | 8/1994 | Lubkin et al. |
| 5,386,568 A | 1/1995 | Wold et al. |
| 5,390,328 A | 2/1995 | Frey et al. |
| 5,423,042 A | 6/1995 | Jalili et al. |
| 5,440,744 A | 8/1995 | Jacobson et al. |
| 5,448,740 A | 9/1995 | Kiri et al. |
| 5,452,459 A | 9/1995 | Drury et al. |
| 5,455,952 A | 10/1995 | Gjovaag |
| 5,471,629 A | 11/1995 | Risch |
| 5,475,792 A | 12/1995 | Stanford et al. |
| 5,475,817 A | 12/1995 | Waldo et al. |
| 5,481,721 A | 1/1996 | Serlet et al. |
| 5,504,921 A | 4/1996 | Dev et al. |
| 5,511,197 A | 4/1996 | Hill et al. |
| 5,524,244 A | 6/1996 | Robinson et al. |
| 5,553,282 A | 9/1996 | Parrish et al. |
| 5,555,367 A | 9/1996 | Premerlani et al. |
| 5,555,427 A | 9/1996 | Aoe et al. |
| 5,557,798 A | 9/1996 | Skeen et al. |
| 5,560,003 A | 9/1996 | Nilsen et al. |
| 5,561,785 A | 10/1996 | Blandy et al. |
| 5,577,231 A | 11/1996 | Scalzi et al. |
| 5,594,921 A | 1/1997 | Pettus |
| 5,603,031 A | 2/1997 | White et al. |
| 5,617,537 A | 4/1997 | Yamada et al. |
| 5,628,005 A | 5/1997 | Hurvig |
| 5,640,564 A | 6/1997 | Hamilton et al. |
| 5,644,768 A | 7/1997 | Periwal et al. |
| 5,649,186 A | 7/1997 | Ferguson |
| 5,652,888 A | 7/1997 | Burgess et al. |
| 5,655,148 A | 8/1997 | Richman et al. |
| 5,659,751 A | 8/1997 | Heninger |
| 5,671,225 A | 9/1997 | Hooper et al. |
| 5,675,796 A | 10/1997 | Hodges et al. |
| 5,680,573 A | 10/1997 | Rubin et al. |
| 5,680,617 A | 10/1997 | Gough et al. |
| 5,684,955 A | 11/1997 | Meyer et al. |
| 5,689,709 A | 11/1997 | Corbett et al. |
| 5,706,435 A | 1/1998 | Barbara et al. |
| 5,706,502 A | 1/1998 | Foley et al. |
| 5,724,588 A | 3/1998 | Hill et al. |
| 5,727,145 A | 3/1998 | Nessett et al. |
| 5,737,607 A | 4/1998 | Hamilton et al. |
| 5,745,678 A | 4/1998 | Herzberg et al. |
| 5,745,695 A | 4/1998 | Gilchrist et al. |
| 5,745,703 A | 4/1998 | Cejtin et al. |
| 5,745,755 A | 4/1998 | Covey |
| 5,748,897 A | 5/1998 | Katiyar |
| 5,754,849 A | 5/1998 | Dyer et al. |
| 5,757,925 A | 5/1998 | Faybishenko |
| 5,761,656 A | 6/1998 | Ben-Shachar |
| 5,764,897 A | 6/1998 | Khalidi |
| 5,768,532 A | 6/1998 | Megerian |
| 5,774,551 A | 6/1998 | Wu et al. |
| 5,778,187 A | 7/1998 | Monteiro et al. |
| 5,778,228 A | 7/1998 | Wei |
| 5,778,368 A | 7/1998 | Hogan et al. |
| 5,787,425 A | 7/1998 | Bigus |
| 5,787,431 A | 7/1998 | Shaughnessy |
| 5,790,548 A | 8/1998 | Sistanizadeh et al. |
| 5,802,367 A | 9/1998 | Held et al. |
| 5,808,911 A | 9/1998 | Tucker et al. |
| 5,809,507 A | 9/1998 | Cavanaugh, III |
| 5,813,013 A | 9/1998 | Shakib et al. |
| 5,815,149 A | 9/1998 | Mutschler, III et al. |
| 5,815,709 A | 9/1998 | Waldo et al. |
| 5,815,711 A | 9/1998 | Sakamoto et al. |
| 5,818,448 A | 10/1998 | Katiyar |
| 5,829,022 A | 10/1998 | Watanabe et al. |
| 5,832,219 A | 11/1998 | Pettus |
| 5,832,529 A | 11/1998 | Wollrath et al. |
| 5,832,593 A | 11/1998 | Wurst et al. |
| 5,835,737 A | 11/1998 | Sand et al. |
| 5,842,018 A | 11/1998 | Atkinson et al. |
| 5,844,553 A | 12/1998 | Hao et al. |
| 5,845,129 A | 12/1998 | Wendorf et al. |
| 5,860,004 A | 1/1999 | Fowlow et al. |
| 5,860,153 A | 1/1999 | Matena et al. |
| 5,864,862 A | 1/1999 | Kriens et al. |
| 5,864,866 A | 1/1999 | Henckel et al. |
| 5,872,928 A | 2/1999 | Lewis et al. |
| 5,872,973 A | 2/1999 | Mitchell et al. |
| 5,875,335 A | 2/1999 | Beard |
| 5,878,411 A | 3/1999 | Burroughs et al. |
| 5,884,024 A | 3/1999 | Lin et al. |
| 5,884,079 A | 3/1999 | Furusawa |
| 5,887,134 A | 3/1999 | Ebrahim |
| 5,890,158 A | 3/1999 | House et al. |
| 5,892,904 A | 4/1999 | Atkinson et al. |
| 5,933,497 A | 8/1999 | Beetcher et al. |
| 5,935,249 A | 8/1999 | Stern et al. |
| 5,940,827 A | 8/1999 | Hapner et al. |
| 5,944,793 A | 8/1999 | Islam et al. |
| 5,946,485 A | 8/1999 | Weeren et al. |
| 5,946,694 A | 8/1999 | Copeland et al. |
| 5,963,947 A * | 10/1999 | Ford et al. .................... 707/10 |
| 5,966,531 A | 10/1999 | Skeen et al. |
| 5,969,967 A | 10/1999 | Aahlad et al. |
| 5,974,420 A * | 10/1999 | Lehman et al. ............. 707/101 |
| 5,987,506 A | 11/1999 | Carter et al. |
| 5,999,179 A | 12/1999 | Kekic et al. |
| 6,003,763 A | 12/1999 | Gallagher et al. |
| 6,009,103 A | 12/1999 | Woundy |
| 6,016,496 A | 1/2000 | Roberson |
| 6,016,500 A | 1/2000 | Waldo et al. |
| 6,026,414 A | 2/2000 | Anglin |
| 6,031,977 A | 2/2000 | Pettus |
| 6,061,699 A | 5/2000 | DiCecco et al. |
| 6,061,713 A | 5/2000 | Bharadhwaj |
| 6,292,186 B1 * | 9/2001 | Lehman et al. ............. 345/705 |
| 6,324,566 B1 | 11/2001 | Himmel et al. |
| 6,332,062 B1 | 12/2001 | Phillips et al. |
| 6,405,175 B1 | 6/2002 | Ng |
| 6,560,633 B1 * | 5/2003 | Roberts et al. ............. 709/202 |
| 6,615,235 B1 * | 9/2003 | Copeland et al. ........... 709/203 |
| 2002/0004733 A1 | 1/2002 | Addante |
| 2002/0010757 A1 | 1/2002 | Granik et al. |
| 2002/0032677 A1 | 3/2002 | Morgenthaler et al. |
| 2002/0038344 A1 | 3/2002 | Ullman et al. |
| 2002/0069105 A1 | 6/2002 | Botelho et al. |
| 2002/0080927 A1 | 6/2002 | Uppaluru |
| 2002/0133412 A1 * | 9/2002 | Oliver et al. ................. 705/26 |

FOREIGN PATENT DOCUMENTS

| | | |
|---|---|---|
| EP | 351 536 | 1/1990 |
| EP | 384 339 | 8/1990 |
| EP | 472 874 | 3/1992 |
| EP | 474 340 | 3/1992 |
| EP | 497 022 | 8/1992 |
| EP | 555 997 | 8/1993 |

| | | |
|---|---|---|
| EP | 565 849 | 10/1993 |
| EP | 569 195 | 11/1993 |
| EP | 625 750 | 11/1994 |
| EP | 651 328 | 5/1995 |
| EP | 660 231 | 6/1995 |
| EP | 697 655 | 2/1996 |
| EP | 718 761 | 6/1996 |
| EP | 767 432 | 4/1997 |
| EP | 778 520 | 6/1997 |
| EP | 794 493 | 9/1997 |
| EP | 803 810 | 10/1997 |
| EP | 803 811 | 10/1997 |
| EP | 805 393 | 11/1997 |
| EP | 810 524 | 12/1997 |
| EP | 817 020 | 1/1998 |
| EP | 817 022 | 1/1998 |
| EP | 817 025 | 1/1998 |
| EP | 836 140 | 4/1998 |
| EP | 892 530 | 1/1999 |
| GB | 2 253 079 | 8/1992 |
| GB | 2 262 825 | 6/1993 |
| GB | 2 305 087 | 3/1997 |
| JP | 11-45187 | 10/1997 |
| WO | 92/07335 | 4/1992 |
| WO | 92/09948 | 6/1992 |
| WO | 93/25962 | 12/1993 |
| WO | 94/03855 | 2/1994 |
| WO | 96/03692 | 2/1996 |
| WO | 96/10787 | 4/1996 |
| WO | 96/18947 | 6/1996 |
| WO | 96/24099 | 8/1996 |
| WO | 98/02814 | 1/1998 |
| WO | 98/04971 | 2/1998 |

OTHER PUBLICATIONS

XP-002211482, "Federating and Administering Lookup Services", pp. 320-329, 405-419, 635-656, Jun. 1999.
XP-002212134, "The Search API's", pp. 297-305, 320-329 Jun. 1999.
"Network Nirvana and the Intelligent Device", Spotlight, XP-002927392, pp. 16-19, Apr. 1999.
"Behavioral Specification Using XML", Mckee and Marshall, IEEE, pp. 53-59, 1999.
"JavaSpaces", Chapter 15, XP-002212109, pp. 636-657, Jun. 1999.
"T Spaces", Wycoff, et al., 8M Systems Journal, pp. 454-474, 1998.
"Management of Advanced Services in H.323 Internet Protocol Telephony", Pagurek, et al. IEEE pp. 91-100. Mar. 26, 2000.
"Service Location Protocol: Automatic Discovery of IP Network Services", Erik Guttman of Sun Microsystems, IEEE Internet Computing, pp. 71-80, Jul. 1999.
Carriero, et al., "Distributed Data Structures in Linda," Yale Research Report YALEU/DCS/RR-438, Nov. 1985.
Chung, et al., "A Tiny' Pascal Compiler: Part 1: The P-Code Interpreter," BYTE Publications, Inc., Sep. 1978.
Chung, et al., "A Tiny' Pascal Compiler: Part 2: The P-Compiler," BYTE Publications, Inc., Oct. 1978.
Dave, et al., "Proxies, Application Interface, And Distributed Systems," Proceedings International Workshop On Object Orientation In Operating Systems, pp. 212-220, Sep. 24, 1992.
Deux, et al., "The O2 System," Communications Of The Association For Computing Machinery, Col. 34, No. 10, pp. 34-48, Oct. 1, 1991.
Dijkstra, "Self-stabilizing Systems in Spite of Distributed Control," Communications of the ACM, vol. 17, No. 11, pp. 643-644, Nov. 1974.

Dolev, et al., "On the Minimal Synchronism Needed for Distributed Consensus," Journal of the ACM, vol. 34, No. 1, pp. 77-97, Jan. 1987.
Dollimore, et al., "The design of a System for Distributing Shared Objects," The Computer Journal, No. 6, Cambridge, GB, Dec. 1991.
Dourish, "A Divergence-Based Model of Synchrony and Distribution in Collaborative Systems," Xerox Technical Report EPC-1194-102, pp. 1-10, 1994.
Drexier, et al., "Incentive Engineering for Computational Resource Management," The Ecology of Computation, Elsevier Science Publishers B.V., pp. 231-266, 1988.
Gelernter, et al., "Parallel Programming in Linda," Yale University, pp. 1-21, Jan. 1995.
Droms, "RFC 1541 Dynamic Host Configuration Protocol," <http://www.cis.ohio-state.edu.htbin/rfc/rfc1541.html>, pp. 1-33, Oct. 1993.
Emms, "A Definition Of AN Access Control Systems Language," Computer Standards And Interfaces, vol. 6, No. 4, pp. 443-454, Jan. 1, 1997.
Fleisch, et al., "High Performance Distributed Objects Using Distributed Shared Memory & Remote Method Invocation," System Sciences, 1998, Proceedings of the 31$^{st}$ Hawaii Internat'l. Conference, Jan. 6-9, 1998, pp. 574-578.
Gelernter, "Generative Communication in Linda," ACM Transactions on Programming Languages and Systems, vol. 7, No. 1, pp. 80-112, Jan. 1985.
Gottlob, et al., "Extending Object-Oriented Systems with Roles," ACM Transactions On Information Systems, vol. 14, NO. 3, pp. 268-296, Jul. 1996.
Gray, et al. "Leases: An Efficient Fault-Tolerant Mechanism for Distributed File Cache Consistency," ACM, pp. 202-210, 1989.
Guth, "JavaOne: Sun to Expand Java Distriubted Computing Effor," <http://www.sunworld.com/swol-02-1998/swol-02-sunspots.html>, XP-002109935, p.1, Feb. 20, 1998.
Guyennet, et al., "A New Consistency Protocol Implemented in the CaliF System," IEEE, 1094-7256/97, pp. 82-87, 1997.
Guyennet, et al., "Distributed Shared Memory Layer for Cooperative Work Applications," IEEE, 0742-1303/97, pp. 72-78, 1997.
Hamilton, et al., "Subcontract: A Flexible Base for Distributed Programming," Proceedings of 14$^{th}$ Symposium of Operating System Principles, Dec. 1993.
Hamilton, "Java and the Shift to Net-Centric Computing," Computer, pp. 31-39, Aug. 1996.
Harris, et al., "Proposal for a General Java Proxy Class for Distributed Systems and Other Uses," Netscape Communications Corp., Jun. 25, 1997.
Hartman, et al., "Liquid Software: A New Paradigm For Networked Systems," Technical Report 96-11, Dept. of Comp. Sci., Univ. of Arizona, Jun. 1996.
Howard, et al., "Scale and Performance in a Distributed File System," ACM Transactions on Computer Systems, vol. 6, No. 1, pp. 51-81, Feb. 1988.
Pier, "A Retrospective on the Dorando, A High-Performance Personal Computer," Xerox Corporation, Aug. 1983.
Pinakis, "Using Linda as the Basis of an Operating System Microkernel," University of Western Australia, Dept. of Computer Science, pp. 1-165, Aug. 1993.
Riggs, et al., "Picking State in the Java ™ System," USENIX, Association Conference on Object-Oriented Technologies and Systems, CP-002112719, pp. 241-250, Jun. 17-21, 1996.

Rosenberry, et al., "Understanding DCE," Chapters 1-3, 6, 1992.

Sharrott, et al., "ObjectMap: Integrated High Performance Resources into a Distributed Object-oriented Environment," ICODP, 1995.

Stevenson, "Token-Based Consistency of Replicated Servers," IEEE, CH2686-4/89/0000/0179, pp. 179-183, 1989.

Thompson, "Regular Expression Search Algorithm," Communications of the ACM, vol. II, No. 6, p. 149 et seq., Jun. 1968.

Venners, "Jini Technology, Out of the Box," JAVAWORLD, 'Online!, pp. 1-4, Dec. 1998.

Waldo, et al., "Events in An RPC Based Distributed System," Proceedings Of The 1995 USENIX Technical Conference, Proceedings USENIX Winter 1995 Technical Conference, New Orleans, LA, USA, 16-20, pp. 131-142, Jan. 1995.

Wilson, et al., "Design of the Opportunistic Garbage Collector," Proceedings of the Object Oriented Programming Systems Languages And Applications Conference, New Orleans, vol. 24, No. 10, Oct. 1989.

Wollrath, et al., "A Distributed Object Model for theJaca ™ System," USENIX Association, Conference on Object-Oriented Technologies and Systems, Jun. 17-21, 1996.

Wu, "A Type System For An Object-Oriented Database Systems," Proceedings of the International Computer Software and Applications Conference (COMPSAC), Tokyo, Japan, pp. 333-338, Sep. 11-13, 1991.

Yemini, et al., "Towards Programmable Networks," IFIP/IEEE International Workshop on Distributed Systems: Operations and Management, L'Aquila, Italy, Oct. 1996.

Yin, et al., "Using Leases to Support Server Driven Consistency in Large-Scale Systems," Computer Services Department, University of Texas at Austin, p. 285-294, May 26-28, 1998.

Yin, et al., "Volume Leases for Consistency in Large-Scale Systems," IEEE Transactions on Knowledge & Data Engineering, vol. 11, No. 4, pp. 563-576, Jul./Aug. 1999.

Mitchell, et al., "An Overview of the Spring System," Feb. 1994.

Mitchell, et al., "Mesa Language Manual," Xerox Corporation, Palo Alto Research Center, 1978.

McDaniel, "An Analysis of a Mesa Instruction Set," Xerox Corporation, May 1982.

McGrath, "Discovery and its Discontents: Discovery Protocols for Ubiquitous Computing," Presented at Center for Excellence in Space Data and Information Science, NASA Goddard Space Flight Center, Apr. 5, 2000.

Mummert, et al., "Long Term Distributed File Reference Tracing: Implementation and Experience," Carnegie Mellon University School of Computer Science, pp. 1-28, Nov. 1994.

Orfali, et al., "The Essential Distributed Objects Survival Guide," Chapter 11: Corba Commercial ORBs, pp. 203-215, John Wiley & Sons, Inc., 1996.

Ousterhout, et al., "The Sprite Network Operating System," Computer, IEEE, pp. 23-36, Feb. 1988.

Pier, "A Retrospective on the Dorando, A High-Performance Personal Computer," IEEE Conference Proceedings, The 10th Annual International Symposium on Computer Architecture, 1993.

Hunt, "IDF: A Graphical Data Flow Programming Language for Image Processing and Computer Vision," Proceedings of the International Conference on Systems, Man, and Cybernetics, pp. 351-360, Los Angeles, Nov. 4-7, 1990.

IBM ™ Technical Disclosure Bulletin, "Object Location Algorithm," vol. 36, No. 09B, pp. 257-258, Sep. 1993.

IBM, "Chapter 6—Distributed SOM (DSOM)," SOMobjects Developer Toolkit Users Guide, Version 2.1, pp. 6-1-6-90, Oct. 1994.

Anonymous, "Change-Notification Service for Shared Filed," IBM Technical Disclosure Bulletin, vol. 36, No. 8, pp. 77-82, XP002109435 New York, US, Nov. 1973.

IBM ™ Technical Disclosure Bulletin, "Retrieval of Qualified Variables Using Extendible Hashing," vol. 36, No. 12, pp. 301-303, Dec. 1993.

Anonymous, "Resource Preemption for Priority Scheduling," IBM Technical Disclosure Bulletin, vol. 16, No. 6, p. 1931, XP002109435 New York, US, Nov. 1973.

IBM ™ Technical Disclosure Bulletin, "Local Network Monitoring to Populate Access Agent Directory," vol. 36, No. 09A, pp. 403*405, Sep. 1993.

MUX-Elektronik, Java 1.1 Interactive Course, www.lls.se/~mux/javaic.html, 1995.

Jones, et al., "Garbage Collection: Algorithms for Automatic Dynamic Memory Management," pp. 165-175, John Wiley & Sons, 1996.

Kambhatla, et al., "Recovery with Limited Replay: Fault-Tolerant Processes in Linda," Oregon Graduate Institute, Technical Report CSIE 90-019, pp. 1-16, Sep. 1990.

Kay, et al., "An Overview of the Raleigh Object-Oriented Database System," ICL Technical Journal, vol. 7, No. 4, pp. 780-798, Oxford, GB, Nov. 1991.

Kougiouris, et al., "Support for Space Efficient Object Invocation in Spring," Sep. 1994.

Krasner, "The Smalltalk-80 Virtual Machine," BYTE Publications, Inc., pp. 300-320, Aug. 1991.

Lamport, et al., "The Byzantine Generals Problem," ACM Transactions on Programming Languages and Systems, vol. 4, No. 3, pp. 382-401, Jul. 1982.

LINDA Database Search, pp. 1-68, Jul. 20, 1995.

Liskov, et al., "Distributed Object Management in Thor," International Workshop on Distributed Object Management, 1992.

Gosling, et al., "The Java ™ Language Specification, " Addison-Wesley, 1996.

Jaworski, "Java 1.1 Developer's Guide, 2nd Edition," Sams.net, 1997.

Coulouris, et al., "Distributed Systems Concepts and Designs," Second Edition, Addison-Wesley, 1994.

Mullender, "Distributed Systems," Second Edition, Addison-Wesley, 1993.

Lindholm, et al., "The Java ™ Virtual Machine Specification," Addison Wesley, 1996.

"SOAP: Simple Object Access Protocol," msdn online Web Workshop, Microsoft, Apr. 26, 2000, http://msdn.Microsoft.com/xml/general/soapspec.asp, 34 pages.

Rob Guth, "Sun tries on JacaSpaces for Distributed OS," Aug. 1997, vol. 19, Issue 34, 2 pages.

Microsoft, "Microsoft.NET: Realizing the Next Generation Internet," A Microsoft White Paper, Jun. 2000, 8 pages.

K. F. Eustice, et al., "A Universal Information Appliance," IBM Systems Journal, vol. 38, No. 4, 1999, Pp. 575-601.

Wycoff et al., "T Spaces," IBM Systems Journal, vol. 37, No. 3-Java Technology, Aug. 1998, 36 pages.

Steve Morgan, "Jini to the Rescue," IEEE Spectrum, Apr. 2000, vol. 37, No. 4, 8 pages.

"Java ™ Remote Method Invocation Specification," Sun Microsystems, Inc., <java.sun.com/products/dk1.2beta 1>, 1997.

Agha, et al., "Actorspaces: An Open Distributed Programming Paradigm," University of Illinois, Report No. UIUCDCS-R-92-1766, Open Systems Laboratory TR No. 8, pp. 1-12, Nov. 1992.

Ahmed, et al., "A Program Building Tool for Parallel Applications," Yale University, pp. 1-23, Dec. 1, 1993.

Aldrich, et al., "Providing Easier Access to Remote Objects in Client-Server System," System Sciences, 1998, Proceedings of the 31st Hawaii Internat'l. Conference, Jan. 6-9, 1998, pp. 366-375.

Aldrich, et al., "Providing Easier Access to Remote Objects in Distributed Systems," Calif. Institute of Technology, www.cs.Caltech.edu/%7Ejedi/paper.html, Nov. 21, 1997.

Anderson, et al., "Persistent Linda: Linda+Transaction+ Query Processing," Proceedings of the 13th Symposium on Fault Tolerant Systems, pp. 93-109,1991.

"Transparent Network Computing," Locus Computing Corporation, Jan. 5, 1995.

Alexander, et al., "Active Bridging," Proceedings of the ACM/SIGCOMM'97 Conference, Cannes, France, Sep., 1997.

Beech, et al., "Object Databases as Generalizations of Relational Databases," Computer Standards & Interfaces, vol. 13, Nos. 1/3 pp. 221-230, Amsterdam, NL, Jan. 1991.

Bertino, et al., Object-Oriented Database Management Systems: Concepts and issues,: Computer, vol. 24, No. 4, pp. 33-47, Los Alamitos, CA, Apr. 1991.

Betz, et al, "Interoperable Objects: Laying the Foundation for Distributed Object Computing," Dr. Dobb's Journal, vol. 19, No. 11, p. 18(13), Oct. 1994.

Bevan, et al., "An Efficient Reference Counting Solution To The Distributed Garbage Collection Problem," Parallel Computing, NL, Elsevier Science Publishers, Amsterdam, vol. 9, No. 2, pp. 179-192, Jan. 1989.

Birrell, et al., "Distributed Garbage Collection for Network Objects," Digital Systems Research Center, No. 116, pp. 1-18, Dec. 15, 1993.

Birrell, et al., "Grapevine: An Exercise in Distributed Computing," Communications fo the ACM, vol. 25, No. 4, pp. 260-274, Apr. 1982.

Birrell, et al., "Network Objects," DEC SRC Research Report 115, Feb. 28, 1995.

Birrell, et al., "Implementing Remote Procedure Calls," ACM Transactions on Computer Systems, vol. 2, No. 1, pp. 39-59, Feb. 1994.

Birrell, et al., "Network Objects," Operating Systems Review, 27(5), pp. 217-230, Dec. 1993.

Cannon, et al., "Adding Fault-Tolerant Transaction Processing to Linda," Software-Practice and Experience, vol. 24(5), pp. 449-466, May 1994.

Cardelli, "Obliq, A Lightweight Language For Network Objects," Digital SRC, pp. 1-37, Nov. 5, 1993.

Carriero, et al., "Distributed Data Structure in Linda," Principles of Programming Language, pp. 1-16, 1986.

* cited by examiner

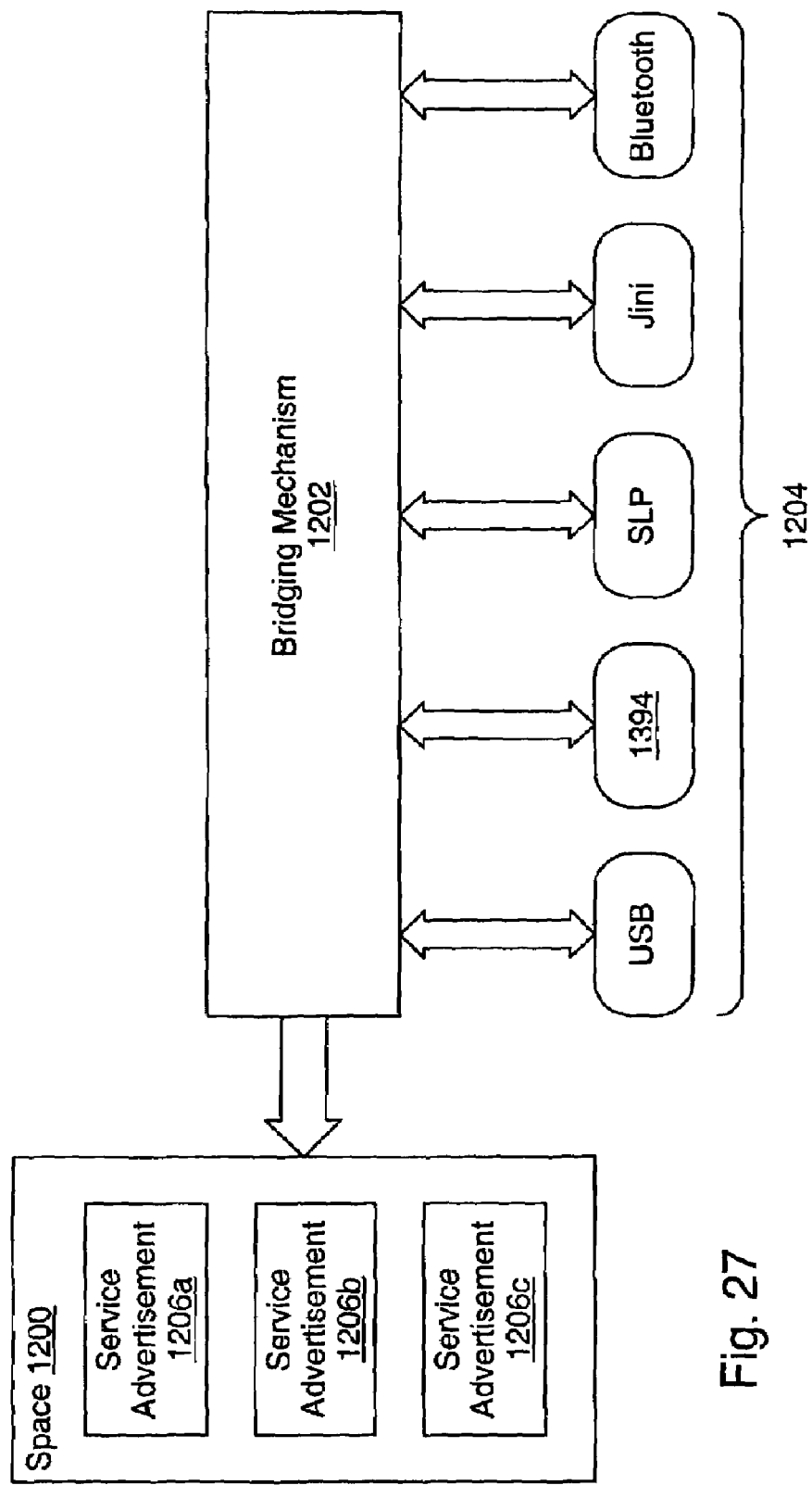

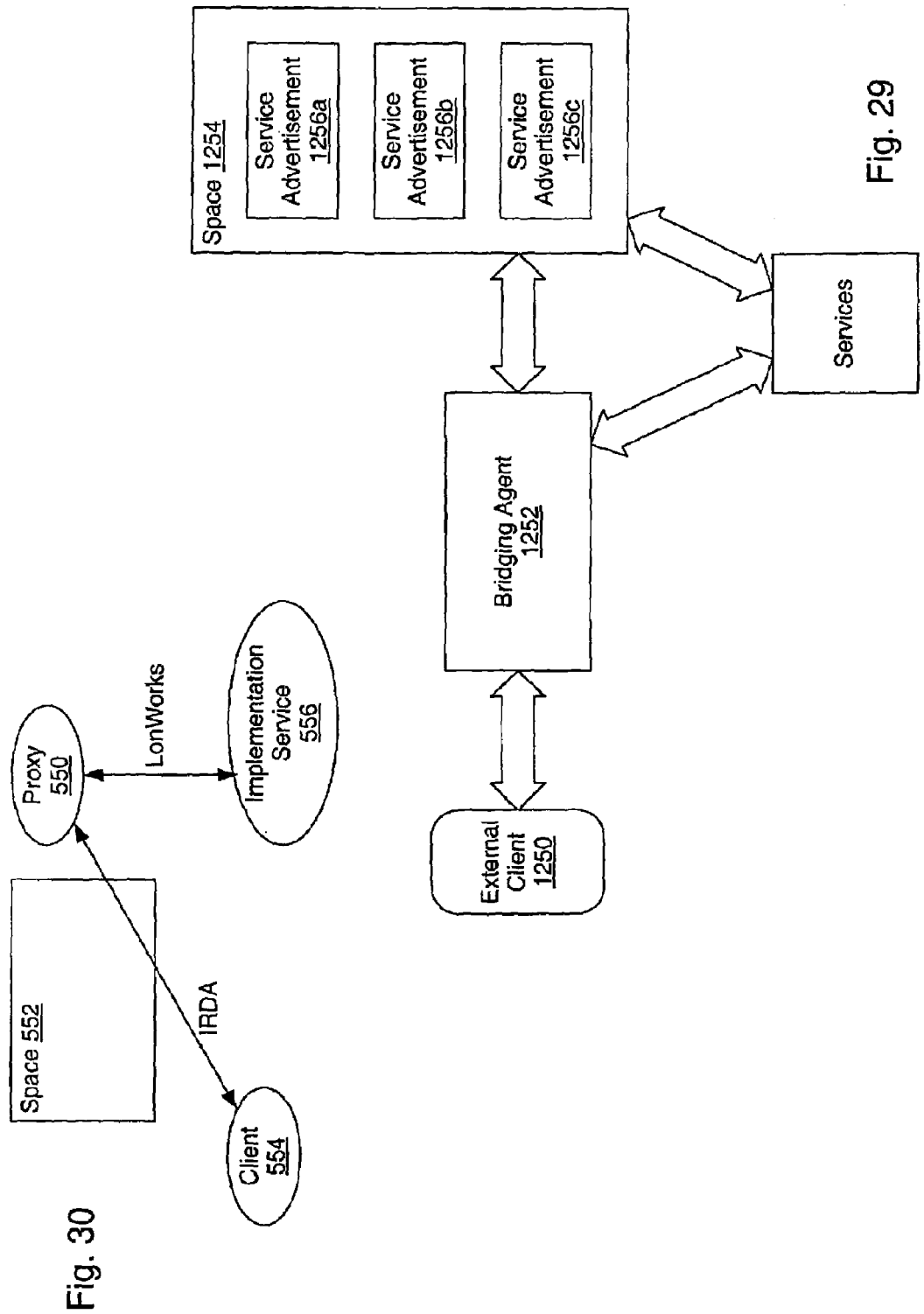

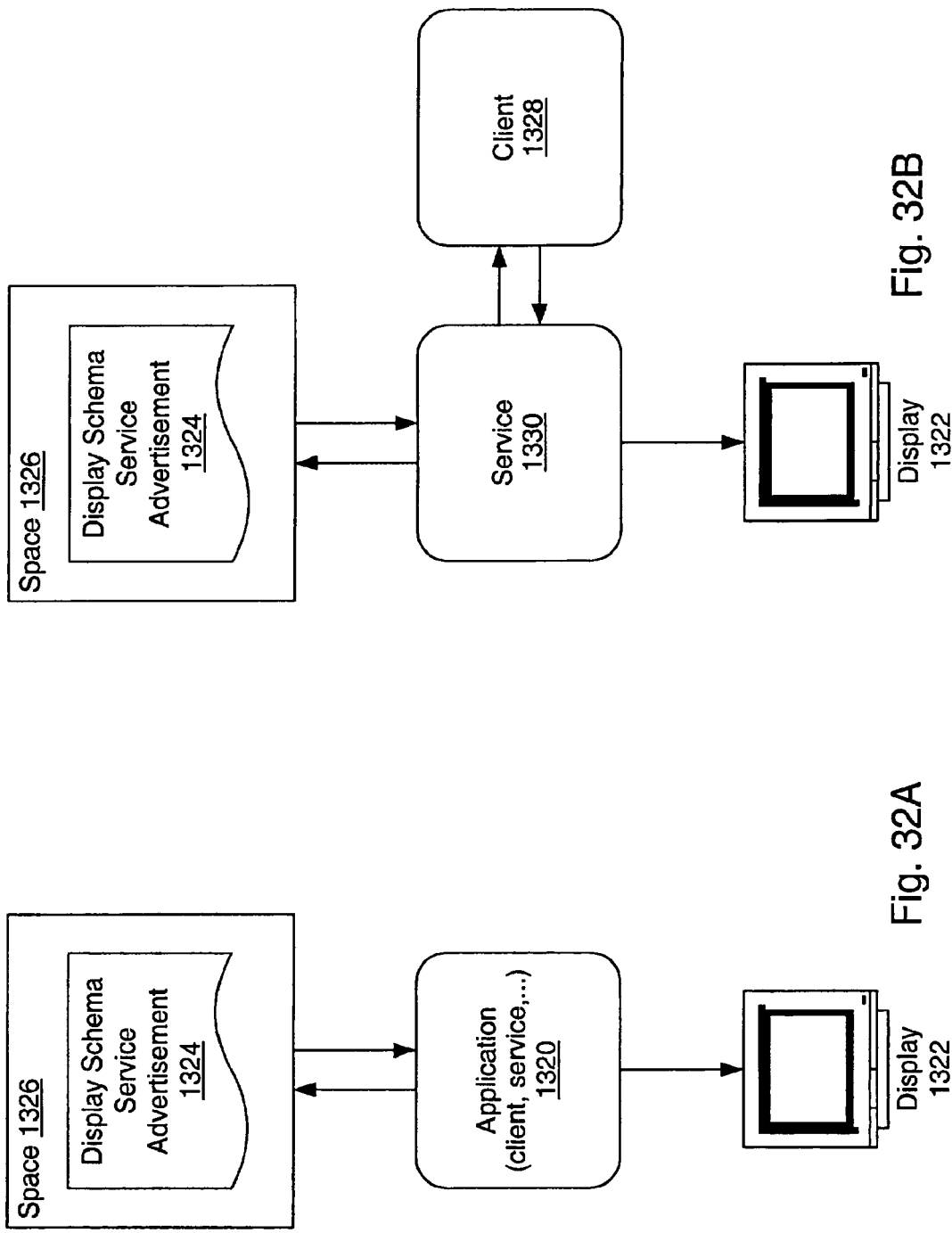

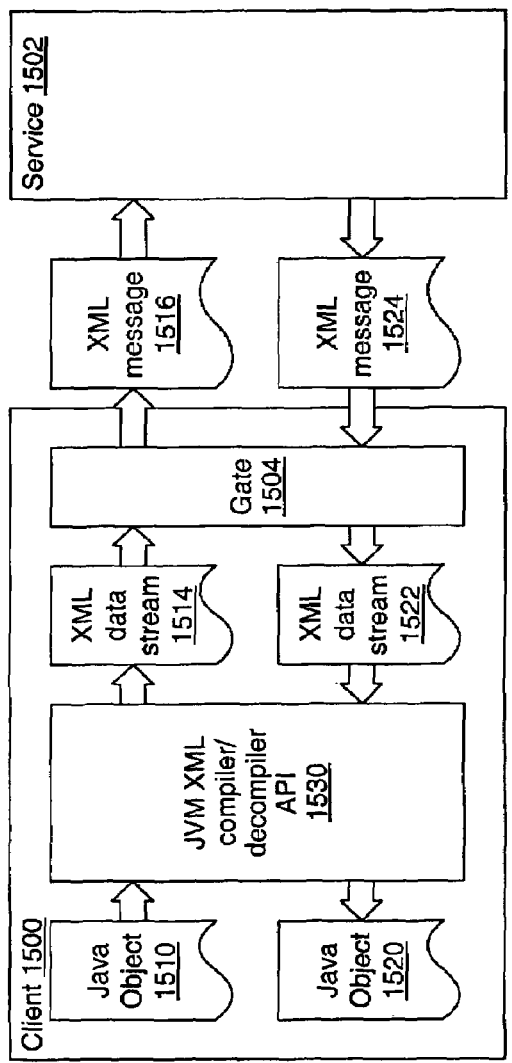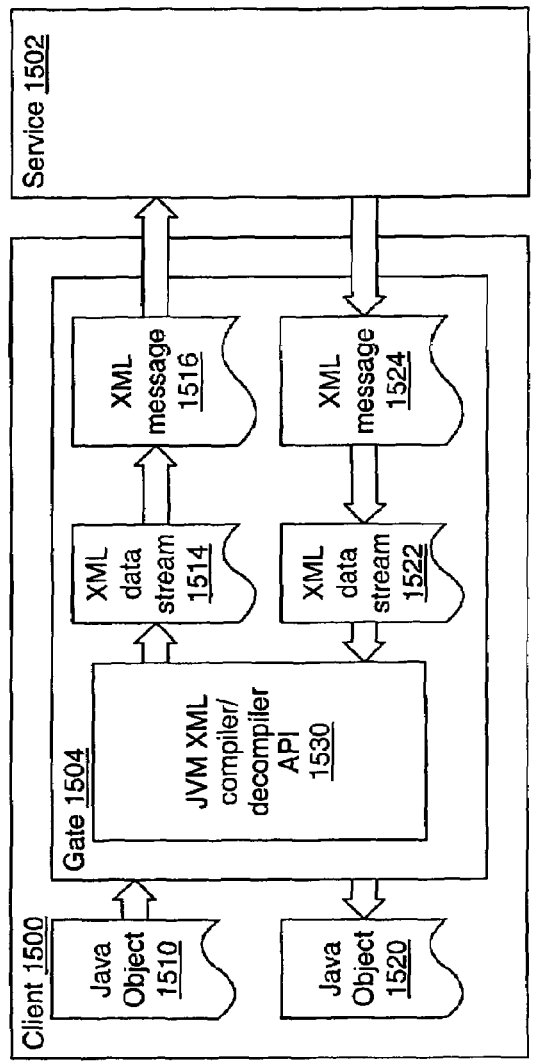
Fig. 35a
Fig. 35b

MECHANISM AND APPARATUS FOR SECURITY OF NEWLY SPAWNED REPOSITORY SPACES IN A DISTRIBUTED COMPUTING ENVIRONMENT

PRIORITY INFORMATION

This application claims benefit of priority to the following provisional applications, each of which is hereby incorporated by reference in its entirety:

Ser. No. 60/202,975 filed May 9, 2000 titled Distributed Computing Environment;

Ser. No. 60/208,011 filed May 26, 2000 titled Distributed Computing Environment;

Ser. No. 60/209,430 filed Jun. 2, 2000 titled Distributed Computing Environment;

Ser. No. 60/209,140 filed Jun. 2, 2000 titled Distributed Computing Environment; and Ser. No. 60/209,525 filed Jun. 5, 2000 titled Distributed Computing Environment.

BACKGROUND OF THE INVENTION

1. Field of the Invention

This invention relates to distributed computing environments including Web-centric and Internet-centric distributed computing environments, and more particularly to a heterogeneous distributed computing environment based upon a message passing model for connecting network clients and services.

2. Description of the Related Art

Intelligent devices are becoming more and more common. Such devices range from smart appliances, personal digital assistants (PDAs), cell phones, lap top computers, desktop computers, workstations, mainframes; even, super computers. Networks are also becoming an increasingly common way to interconnect intelligent devices so that they may communicate with one another. However, there may be large differences in the computing power and storage capabilities of various intelligent devices. Devices with more limited capabilities may be referred to as small footprint devices or "thin" devices. Thin devices may not be able to participate in networks interconnecting more capable devices. However, it may still be desirable to interconnect a wide variety of different types of intelligent devices.

The desire to improve networking capabilities is ever increasing. Business networks are expanding to include direct interaction with suppliers and customers. Cellular phones, personal digital assistants and Internet-enabled computers are commonplace in both business and the home. Home networks are available for interconnecting audio/visual equipment such as televisions and stereo equipment to home computers, and other devices to control intelligent systems such as security systems and temperature control thermostats. High bandwidth mediums such as cable and ASDL enable improved services such as Internet access video on demand, e-commerce, etc. Network systems are becoming pervasive. Even without a formal network, it is still desirable for intelligent devices to be able to communicate with each other and share resources.

Currently, traditional networks are complex to set up, expand and manage. For example, adding hardware or software to a network often requires a network administrator to load drivers and configure systems. Making small changes to a network configuration may require that the entire network be brought down for a period of time. Also, certain intelligent devices may not support the necessary interfaces to communicate on a given network.

What is needed is a simple way to connect various types of intelligent devices to allow for communication and sharing of resources while avoiding the interoperability and complex configuration problems existing in conventional networks. Various technologies exist for improving the addition of devices to a network. For example, many modern I/O buses, such as the Universal Serial Bus, 1394 and PCI, support plug and play or dynamic discovery protocols to simplify the addition of a new device on the bus. However, these solutions are limited to specific peripheral buses and are not suitable for general networks.

A more recent technology, Jini from Sun Microsystems, Inc., seeks to simplify the connection and sharing of devices such as printers and disk drives on a network. A device that incorporates Jini may announce itself to the network, may provide some details about its capabilities, and may immediately become accessible to other devices on the network. Jini allows for distributed computing where the capabilities of the various devices are shared on a network. The Jini technology seeks to enable users to share services and resources over a network. Another goal of the Jini technology is to provide users with easy access to resources anywhere on the network while allowing the network location of the user to change. Jini also seeks to simplify the task of building, maintaining and altering a network of devices, software and users.

Jini requires that each Jini enabled device has a certain amount of memory and processing power. Typically, a Jini enabled device is equipped with a Java Virtual Machine (JVM). Thus, Jini systems are Java technology centered. Java is a high level object oriented programming language developed by Sun Microsystems, Inc. Java source code may be compiled into a format called bytecode, which may then be executed by a Java Virtual Machine. Since Java Virtual Machines may be provided for most computing platforms, Java and thus Jini provide for a certain amount of platform independence. The Jini architecture leverages off the assumption that the Java programming language is the implementation language for the components of the Jini system. The ability to dynamically download and run Java code is central to many features of the Jini architecture.

The purpose of the Jini architecture is to federate groups of devices and software components into a single dynamic distributed system. A key concept within the Jini architecture is that of a service. A service is an entity that can be used by a person, a program, or another service. Two examples of services are printing a document and translating from one word processor format to another. Jini allows the members of a Jini system to share access to services. Services in a Jini system communicate with each other by using a service protocol, which is a set of interfaces written in the Java programming language. Services are found and resolved in a Jini system by a look-up service. A look-up service maps interfaces indicating the functionality provided by a service to sets of objects that implement the service.

Descriptive entries may also be associated with a service. Devices and applications use a process known as discovery to register with the Jini network. Once registered, the device or application places itself in the look-up service. The look-up service may store not only pointers to these services on the network, but also may store the code for accessing these services. For example, when a printer registers with the look-up service, it loads its printer driver and/or an interface to the driver into the look-up service. When a client wants to use the printer, the driver and driver interface get downloaded from the look-up service to the client. This code mobility means that clients can take advantage of services from the network without pre-installing or loading drivers or other software.

Communication between services in a Jini system is accomplished using the Java Remote Method Invocation (RMI). RMI is a Java programming language enabled extension to traditional remote procedure call mechanisms. RMI allows not only data to be passed from object to object around the Jini network, but full objects including code as well. Jini systems depend upon this ability to move code around the network in a form that is encapsulated as a Java object.

Access to services in a Jini system is lease based. A lease is a grant of guaranteed access over a time. Each lease is negotiated between the user of the service and the provider of the service as part of the service protocol. A service may be requested for some period and access may be granted for some period presumably considering the request period. Leases must be renewed for a service to remain part of the Jini system.

FIG. 1 illustrates the basic Jini technology stack. The Jini technology defines a distributed programming model 12 (supported by JavaSpaces, leases, and object templates). Object communication in Jini is based on an RMI layer 14 over a TCP/IP capable networking layer 16.

Jini is a promising technology for simplifying distributed computing. However, for certain types of devices, Jini may not be appropriate. The computing landscape is moving toward a distributed, Web-centric service and content model where the composition of client services and content changes rapidly. The client of the future may be a companion type device that users take with them wherever they go. Such a device may be a combination of a cell phone and a PDA for example. It would be desirable for such devices to be able to communicate and share resources with more powerful devices as well as thinner or less powerful devices.

Also, with the advent of the Internet and resulting explosion of devices connected to the net, a distributed programming model designed to leverage this phenomenon is needed. An enabling technology is needed that facilitates clients connecting to services in a reliable and secure fashion. Various clients from thick to thin and services need to be connected over the Internet, corporate Internets, or even within single computers. It is desirable to abstract the distance, latency and implementation from both clients and services.

The key challenge for distributed computing technology is to be scalable from powerful thick clients down to very thin clients such as embedded mobile devices. Current distributed computing technologies, such as Jini, may not be scalable enough for the needs of all types of clients. Some devices, such as small footprint devices or embedded devices, may lack sufficient memory resources and/or lack sufficient networking bandwidth to participate satisfactorily in current distributed computing technologies. The low end of the client spectrum, including embedded mobile devices, often have limited or fixed code execution environments. These devices also may have minimal or no persistent storage capabilities. Most small, embedded mobile devices do not support a Java Virtual Machine. Most code-capable small clients run native code only. Also, most small devices have little more than flash memory or battery backed RAM as their sole persistent storage media. The size of the storage is often very small and sometimes read-only in nature. Furthermore, the access time of this type of storage media is often an order of magnitude greater than hard disk access time in more powerful clients.

Existing connection technologies, such as Jini, may not be as scalable as desired because they are too big. For example, Jini requires that all participants support Java; however, many small clients may not have the resources for a Java Virtual Machine. Furthermore, due to its use of RMI, Jini requires that clients be able to download code and content. Jini may augment the existing client platform by downloading new classes, which may pose security and size concerns for small devices such as embedded devices. Jini works by clients and resources communicating by passing code and data. When a client activates a Jini service, the service may return its results to the client, which may include a large amount of code or content. In Jini, a client may call a method and a large object may be returned, and thus downloaded. The client may not have the resource to accept the returned object. Also, RMI and Java itself require a lot of memory. Many small foot print devices may not have the resources to participate effectively or at all in current distributed computing technologies.

Another concern with existing distributed computing technologies is that they often require certain levels of connection capability and protocols. For example, Jini assumes the existence of a network of reasonable speed for connecting computers and devices. Jini also requires devices to support TCP/IP network transport protocol. However, many smaller devices may have limited connection capabilities. Small devices may have high latency or low speed network connections and may not support TCP/IP.

As mentioned above, Jini requires devices to support Java and thus include a Java Virtual Machine, which requires a certain amount of processing and storage capabilities that might not be present for many small devices. This also restricts the flexibility of Jini in that non-Java devices may not directly participate in a Jini system. Since Jini requires Java, it may be deemed a homogenous environment. However, it is desirable to have a distributed computing facility for heterogeneous distributed computing that scales from extremely small embedded devices through PDA's and cell phones to laptops and beyond even to the most powerful computers.

Other heterogeneous solutions exist, such as the Common Object Request Broker Architecture (CORBA). CORBA is an architecture that enables program objects to communicate with one another regardless of the programming language they were written in or what operating system they're running on. However, CORBA does not address all of the connection issues that are addressed by Jini. Also, CORBA suffers from similar scalability problems as Jini.

Technology such as Jini and CORBA use a code-centric programming model to define the interface between remote components. A code-centric programming model defines programmatic interfaces or API's for communication between remote clients or components. The API's may be defined in a particular programming language. The API's must be agreed to by all software components to ensure proper interoperability. Since all access to components is through the use of these standards API's, the code that implements these API's must be present in the client platform. The code may be statically linked into the platform or dynamically downloaded when needed. Many embedded or mobile devices simply cannot accept code dynamically from a network due to the quality control issues involved as well as the reliance on a single language and program execution environment. Data-centric models, such as networking protocols, may avoid the dependence on moving code; however, such protocols are not rich enough to easily provide for distributed computing and they also lack the ease of programming with code and other programming features, such as type safety.

Conventional distributed computing systems rely on the ability of a program executing on a first device to be able to remotely call a program on a second device and have the results returned to the first device. The Remote Procedure Call (RPC) is a basic mechanism for remotely calling a program or procedure. CORBA and Jini are both based on the ability to remotely invoke program methods. However, communicating by passing code or objects, such as in Jini or CORBA, may be somewhat complex. For example, as mentioned above, Jini uses the Java Remote Method Invocation (RMI) to communicate between services. In order for a client to move Java objects to and from remote locations, some means of serialization/deserialization is needed. Such current facilities in the Java Development Kit (JDK) rely upon the reflection API to determine the content of a Java object, and ultimately that code must consult the Virtual Machine. This code is quite large and inefficient.

The fundamental problems with the current method for doing serialization/deserialization include its size, speed, and object traversal model. Code outside the JVM does not know the structure or graph of a Java object and thus must traverse the object graph, pulling it apart, and ultimately must call upon the JVM. Traditional serialization and reflection mechanisms for storing and moving Java objects are just not practical for all types of devices, especially thinner devices. Some of the difficulties with Java reflection and serialization are that an object's graph (an object's transitive closure) reflection is difficult to do outside the JVM. Serialization is too large, requiring a large amount of code. Also, serialization is a Java specific object interchange format and thus may not be used with non-Java devices.

The Jini distributed computing model requires the movement of Java objects between Java devices. Thus, the serialization mechanism itself is not platform independent since it may not be used by non-Java platforms to send and receive objects. Serialization is a homogenous object format—it only works on Java platforms. Serialization uses the reflection API and may be limited by security concerns, which often must be addressed using native JVM dependent methods. The reflection API may provide a graph of objects, but is inefficient due to the number of calls between the JVM and the code calling the reflection methods.

The use of Java reflection to serialize an object requires an application to ping pong in and out of the JVM to pick apart an object one field at a time as the transitive closure of the object is dynamically analyzed. Deserializing an object using Java deserialization requires the application to work closely with the JVM to reconstitute the object one field at a time as the transitive closure of the object is dynamically analyzed. Thus, Java serialization/deserialization is slow and cumbersome while also requiring large amounts of application and JVM code as well as persistent storage space.

Even for thin clients that do support Java, the Jini RMI may not be practical for thin clients with minimal memory footprints and minimal bandwidth. The serialization associated with the Jini RMI is slow, big, requires the JVM reflection API, and is a Java specific object representation. Java deserialization is also slow, big and requires a serialized-object parser. Even Java based thin clients may not be able to accept huge Java objects (along with needed classes) being returned (necessarily) across the network to the client as required in Jini. A more scalable distributed computing mechanism is needed. It may be desirable for a more scalable distributed computing mechanism to address security concerns and be expandable to allow for the passing of objects, such as Java objects, and even to allow for process migration from one network mode to another.

Object based distributed computing systems need persistent storage. However, as discussed above, attempts at object storage are often language and operating system specific. In addition, these object storage systems are too complicated to be used with many small, embedded systems. For example, the Jini technology uses JavaSpaces as persistent object containers. However, a JavaSpace can only store Java objects and cannot be implemented in small devices. Each object in a JavaSpace is serialized and pays the above-described penalties associated with Java serialization. It may be desirable to have a heterogeneous object repository for distributed computing that may scale from small to large devices.

JavaSpaces from Sun Microsystems, Inc., draws from the parallel processing work of David Gelernter, a computer science professor at Yale University. Gelernter's set of functions named "Linda" create a shared memory space called a TupleSpace, in which results of a computer's processes or the processes themselves may be stored for access by multiple CPUs. Linda therefore provides a global shared memory for multiple processors.

Another technology which extends Linda is TSpaces from IBM Corporation. TSpaces extends the basic Linda TupleSpace framework with real data management and the ability to download new datatypes and new semantic functionality. TSpaces provides a set of network communication buffers and a set of APIs for accessing those buffers. Like many of the solutions discussed above, TSpaces therefore uses a code-centric programming model and shares the drawbacks of such a model. Additionally, TSpaces is implemented in the Java programming language and therefore requires a Java Virtual Machine or other means of executing Java bytecode, such as a Java-capable microprocessor. Therefore, TSpaces may be inappropriate for small-footprint devices which cannot devote sufficient resources for executing Java bytecode.

It is desirable in object oriented distributed systems to be able to locate object repositories and find particular objects within those repositories. As mentioned above, the Jini look-up server may not be practical for small devices with small memory footprints. A more efficient mechanism for locating object stores may be desirable.

Distributed object access also desires a fair and efficient sharing mechanism. As described above Jini currently uses a leasing mechanism to share objects. However, Jini leases are time based which may result in a number of problems. For example, the current object holder might have no idea how long to lease an object and may hold it too long. Also, the use of time-based leases may require that time be synchronized between multiple machines. Moreover time based leasing may require operating system support. Also, Jini leases are established and released via RMI. Thus, the Jini leasing mechanism suffers from the above-noted problems with using RMI. Other leasing mechanisms may be desirable.

Generally speaking, it is desirable for small memory foot print mobile client devices to be able to run a variety of services, both legacy and new, in a distributed environment. The types of small clients may include cell phones and PDA's with a variety of different networking interfaces, typically low bandwidth. Often these devices have very small displays with limited graphics, but they could include laptops and notebook computers, which may have a larger display and more sophisticated graphics capabilities. The services may be a wide range of applications as well as control programs for devices such as printers. It is desirable for a mobile client to be able to use these services wherever they may be.

A mobile client will often be at a temporary dynamic network address, so networking messages it sends cannot be routed beyond that networking interface (otherwise there may be collisions when two different clients on different networks have the same dynamic address). Mobile clients often do not have the capability for a full function browser or other sophisticated software. The displays may limit the client from running certain applications. Traditional application models are based on predetermined user interface or data characteristics. Any change to the application requires recompilation of the application.

It may be desirable for such clients to have a mechanism for finding and invoking distributed applications or services. The client may need to be able to run even large legacy applications which could not possibly fit in the client's memory footprint. As discussed above, current technology, such as Jini, may not be practical for small footprint devices. The pervasiveness of mobile thin clients may also raise additional needs. For example, it may be desirable to locate services based on the physical location of the user and his mobile client. For example, information about the services in a local vicinity may be very helpful, such as local restaurants, weather, traffic maps and movie info.

Similarly, information about computing resources, such as printers in a particular location, may be helpful. Current technologies do not provide an automatic mechanism for locating services based on physical location of the client. Another need raised by thin mobile clients is that of addressing the human factor. Thin mobile clients typically do not contain ergonomic keyboards and monitors. The provision of such human factor services and/or the ability to locate such services in a distributed computing environment may be desirable.

SUMMARY OF THE INVENTION

The problems outlined above are in large part solved by various embodiments of a system and method for interaction and access to shared content among clients and services within a distributed computing environment. A distributed computing environment may rely on "spaces" or object repositories to provide a rendezvous mechanism or catalyst for the interaction between clients and services. Service providers may advertise services in a space. Clients may find the advertisements in a space and use the information from an advertisement to access a service using an XML (eXtensible Markup Language) messaging mechanism of the distributed computing environment. Many spaces may exist, each containing XML advertisements that describe services or content. Thus, a space may be a repository of XML advertisements of services and/or XML data, which may be raw data or advertisements for data, such as results.

In one embodiment, a space itself is a service. Like any service, a space has an advertisement, which a client of the space must first obtain in order to be able to run that space service. A space's own advertisement may include an XML schema, a credential or credentials, and a URI (Uniform Resource Identifier) which indicate how to access the space. A client may construct a gate from a space service's advertisement in order to access the space. A client of a space may itself be a service provider seeking to advertise in that space or modify an existing advertisement. Or a client of a space may be an application seeking to access a service or content listed by the space. Thus, spaces may provide catalysts for the interaction between clients and services in the distributed computing environment.

A space may include a collection of named advertisements. A space may be created with a single root advertisement that describes the space itself. Additional advertisements may be added to a space. An advertisement's name may locate the advertisement within the space, including specifying any necessary graphing information such as a hierarchy of names. In a preferred embodiment, the structure of a space is not dictated by the distributed computing environment. That is, spaces may be structured as, for example, a flat un-related set of advertisements or a graph of related advertisements (e.g. commercial database). Since, in a preferred embodiment, the distributed computing environment does not dictate how a space actually stores its content, spaces may be supported by small to large devices. For example, a simple space may be tailored to fit on small devices, such as PDAs. More advanced spaces may be implemented on large severs employing large commercial databases.

As mentioned above, a space may contain advertisements for services in the distributed computing environment. An advertisement may provide a mechanism for addressing and accessing services and/or content within the distributed computing environment. An advertisement may specify a URI for a service. In some embodiments, the URI may allow for the service to be accessible over the Internet. An advertisement may also include an XML schema for the service. The XML schema may specify a set of messages that clients of the service may send to the service to invoke functionality of the service. The XML schema may define the client-service interface. Together, the URI and the XML specified in an advertisement may indicate how to address and access the service. Both the URI and schema may be provided in XML as an advertisement in a space. Thus, a mechanism for addressing and accessing a service in a distributed computing environment may be published as an advertisement in a space. Clients may discover a space and then lookup individual advertisement for services or content. Spaces and all advertisements within a space may be addressed using URIs. In one embodiment, space and advertisement names may follow URL (Uniform Resource Locator) naming conventions. The use of URIs, e.g. URLs, for addressing spaces may allow spaces to be addressable throughout the Internet, in some embodiments.

Once a client of a space finds the advertisement of a space service, that client of the space may run the space service, as it would any other service. Note that the client of the space service may be another service (e.g. a service seeking to advertise in the space). In one embodiment, to run a space service, the client of the space may first run an authentication service for the space to obtain an authentication token. The authentication service may be specified in the service advertisement of the space service. The client of the space uses the authentication token, the XML schema of the space (from space's service advertisement), and the URI of the space (from space's service advertisement) to construct a gate for the space. The client of the space may then run the space service by using the gate to send messages to the space service.

For embodiments employing authentication, when the space service receives the first message from the client, with the authentication token embedded, the space service uses the same authentication service (specified in the service advertisement of the space service) to authenticate the client, thus establishing its identity. The space service may determine the client's capabilities and bind them to the authentication token.

A client of a space may run various space facilities by sending messages to the space service. In one embodiment, when a client of a space sends a request to the space service, it passes its authentication token in that request, so the space service can check the request against the client's specific capabilities.

Each space is typically a service and may have an XML schema defining the core functionality of the space service. The XML schema may specify the client interface to the space service. In one embodiment, all space services may provide a base-level of space-related messages. The base-level space functionality may be the basic space functionality that is capable of being used by most clients, including small devices such as PDAs. It may be desirable to provide for additional functionality, e.g. for more advanced clients. Extensions to the base-level space may be accomplished by adding more messages to the XML schema that advertises the space. For example, in one embodiment, the base-level messages do not impose any relationship graph upon the advertisements. Messages, for example, to traverse a hierarchy of advertisements may be a space extension. Providing such additional functionality may be done by providing one or more extended XML space schemas or schema extensions for a space. The extended schemas may include the base schema so that clients of an extended space may still access the space as a base space.

In one embodiment, a space may provide a facility for a client to instantiate a service advertised in the space. Service instantiation is the initialization done that allows a client to be able to run a service. To instantiate a service, a client may first select one of the service advertisements published in the space. The client may use the various facilities, such as the look up facility, provided by the space to look up the various advertisements in the space. Then the client may request the space to instantiate the service.

In one embodiment, service instantiation may include the following actions. After the client requests the space service to instantiate the selected service, the space service may then verify the client is allowed to instantiate the requested service. The space service may perform this verification by examining the an authentication token included in the clients message. The authentication token is the credential the client received when it established a session with the space service. The space service may verify if the client is allowed to instantiate the requested service according to the client's authentication token and capabilities indicated for that client.

Assuming the client is authorized, the space service may also obtain a lease on the service advertisement for the client with the lease request time specified by the client. The space service may then send a message to the client which includes the allocated lease and the service advertisement of the service. In one embodiment, the client may run an authentication service specified in the service advertisement and obtain an authentication token. Next, the client may construct a gate for the service (for example, using the authentication token and the XML schema and service URI from the advertisement). The above described communication between the client and space service is performed using the XML messaging of the distributed computing environment. The client may then run the service using the constructed gate and XML messaging. The service may similarly construct a service gate for XML message communication with the client.

An example use of a space is discussed as follows. A client may access (i.e., connect to) a space service. (A service may act as a client for the purpose of accessing or otherwise using a space.) The space service may store one or more service advertisements and/or other content in a space, and each of the service advertisements may include information which is usable to access and execute a corresponding service. The space service may include a schema which specifies one or more messages usable to invoke functions of the space service. For example, the schema may specify methods for reading advertisements from the space and publishing advertisements in the space. The schema and service advertisements may be expressed in an object representation language such as eXtensible Markup Language (XML). In accessing the space service, the client may send information such as an XML message (as specified in the schema) to the space service at an Internet address. In accessing the space service, the client may search the one or more service advertisements stored in the space. The client may select one of the service advertisements from the space. In one embodiment, the client may send an instantiation request to the space after selecting the desired service advertisements from the space. A lease may be obtained for the desired service, and the lease and the selected service advertisement may be sent by the space service to the client. The client may then construct a gate for access to the desired service. The desired service may be executed on behalf of the client.

Another facility provided by a space service may be the spawning or creation of an empty space. This space facility may allow a client (which may be a service to another client) to dynamically create a new space. In one embodiment, this space facility may include an interface for spawning an empty space with the same functionality (same XML schema or extended schema) as the space from which it is spawned. In other embodiments, the schema of the spawned space may be a portion of the schema of the parent space, or the spawned space may have a different schema altogether, as specified at the time of its creation. This facility may be useful for generating (e.g. dynamically) spaces for results. For example, a client may spawn a space and request that a service place results or advertise results in the spawned space. The client may pass the spawned space URI and/or authentication credential to the service. Or a service may spawn a space for results and pass the spawned space URI and/or authentication credential to the client. In some embodiments, once a space is spawned, it may be discovered just like other spaces using one or more of the space discovery mechanisms described herein.

In one embodiment, a client may access (e.g., connect to) a first space service. (A service may act as a client for the purpose of accessing or otherwise using a space.) The first space service may store one or more service advertisements and/or other content in a first space, and each of the service advertisements may include information which is usable to access and execute a corresponding service. The first space service may include a first schema which specifies one or more messages usable to invoke functions of the first space service. For example, the first schema may specify methods for reading advertisements from the first space and publishing advertisements in the first space. The first schema and service advertisements may be expressed in an object representation language such as eXtensible Markup Language (XML). In accessing the first space service, the client may send information such as an XML message (as specified in the first schema) to the first space service at a first Internet address (e.g., URI). In accessing the first space service, the client may search the one or more service advertisements stored in the first space.

The creation of a second space may be requested, such as by the client sending an appropriate request to an interface of the first space. In response, a second space service with a second space may be created, such as at a second Internet address (e.g., URI). As above, the second space service may include a second schema which specifies one or more messages usable to invoke functions of the second space service. The second schema may include at least the first schema, and the second schema may include additional functionality as well The client may then access the second space by sending to the second space at least one of the messages specified in the second schema.

By using a mechanism in which a space may be created via an interface in another space (e.g. a space spawning facility), new spaces may be created efficiently. For example, in one embodiment, storage for the spawned space may be allocated using the same facility used by the original space for storage. In one embodiment, the first space may store a first set of information, such as XML advertisements or other content, according to a particular storage model. Upon its creation, the second space is operable to store a second set of information according to the same storage model. Also, a spawned space may share a common service facility with its original (or parent) space. For example, a new URI may be assigned to the new space. In one embodiment, the new URI may be a redirection to a common space facility shared with the original space. Thus, a newly spawned space may use the same or some of the same service code as that of the original code. In other words, the first space service may include a set of program instructions which are computer-executable to provide the first space. The second space service may include substantially the same set of program instructions, wherein the set of program instructions are further computer-executable to provide the second space.

In one embodiment, a new space may be spawned in a substantially secure manner. A client (including a service acting as a client of a space service) which requests creation of the space may be referred to as the requesting client. The second space may initially be configured to permit access only to the requesting client. In one embodiment, a root authentication token is created for the second space. An authentication service associated with the second space may be initialized, whereby the second space is configured to permit access only to a client holding the root authentication token. The root authentication token may be sent to the requesting client or service. The requesting client may then access the second space by sending to the second space at least one of the messages specified in the second schema and by using the root authentication token.

In one embodiment, therefore, when a requester has spawned a space, only the requestor may be allowed to access the spawned space. For example, the spawned space may be for storing results from a service that the client needs to keep secured. In one embodiment, this security may be ensured by:

Creating an initial root authentication token, and initializing the authentication service of the spawned space, so that the authentication service only authenticates the root authentication token, and so that it returns no other authentication tokens (no other clients of the spawned space allowed initially).

Initializing the security policies of the spawned space so that the root identity associated with the root authentication token has access to all facilities of the space, including the security administration facilities.

Returning the root authentication token and the service advertisement of the spawned space to the requester of the spawned space.

The requester may build a gate to access the spawned space, since it is returned the authentication credential and the service advertisement of the spawned space. In one embodiment, only the requestor and clients or services that the requestor passes the authentication credential and the spawned space's service advertisement may access the spawned space. Such limiting of access to the spawned space may be useful when a client and service are using that spawned space to store results, for example, if the client and service desire to keep the results private.

In one embodiment, the requesting client may send the root authentication token to a second client (including a service acting as a client of the space service). The second client may then access the second space by sending to the second space at least one of the messages specified in the second schema along with the root authentication token.

After running a service, the client may change the authentication policies of the spawned space using a security administration space facility, and other clients or services may then access the spawned space. The other clients may then have access to the second space service, so that, for example, the other clients may read service advertisements from the second space. In addition, the spawned space's service advertisement may be made available to other clients of the spawned space (the other clients may be services) using the discovery protocol or other means.

BRIEF DESCRIPTION OF THE DRAWINGS

FIG. 27 illustrates one embodiment of a bridging mechanism;

FIG. 29 illustrates bridging a client external to the distributed computing environment to a space in the distributed computing environment according to one embodiment;

FIG. 30 is an illustration of a proxy mechanism according to one embodiment;

FIGS. 32A and 32B illustrate examples of using schemas of dynamic display objects according to one embodiment;

FIGS. 35a and 35b are data flow diagrams illustrating embodiments where a virtual machine (e.g. JVM) includes extensions for compiling objects (e.g. Java Objects) into XML representations of the objects, and for decompiling XML representations of (Java) objects into (Java) objects;

Figure 1:
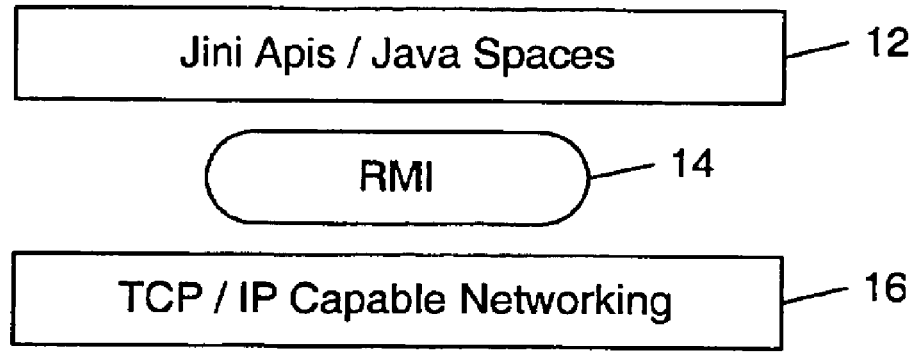
FIG. 1 is an illustration of a conventional distributed computing technology stack.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention.

DETAILED DESCRIPTION OF EMBODIMENTS OF THE INVENTION

Overview of Embodiments for Distributed Computing

Figure 2:
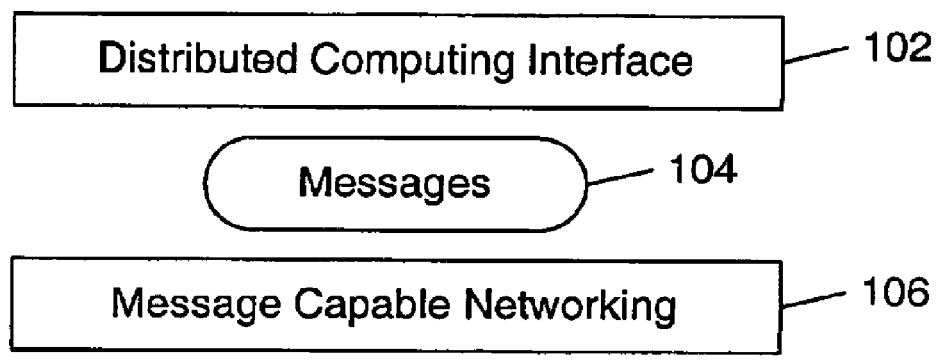
FIG. 2 is an illustration of a distributed computing environment programming model according to one embodiment.

Turning now to FIG. 2, a distributed computing environment programming model is illustrated. The model includes API layer 102 for facilitating distributed computing. The API layer 102 provides an interface that facilitates clients connecting to services. The API layer 102 is concerned with the discovery of and the connecting of clients and services. The API layer 102 provides send message and receive message capabilities. This messaging API may provide an interface for simple messages in a representation data or meta-data format, such as in the extensible Mark-up Language (XML). Note that while embodiments are described herein employing XML, other meta-data type languages or formats may be used in alternate embodiments. In some embodiments, the API layer may also provide an interface for messages to communicate between objects or pass objects, such as Java objects. API's may be provided to discover an object repository or "space", find a particular object, claim and release an object, and write or take an object to or from the object repository. Objects accessible through API layer 102 may be represented by a representation data format, such as XML. Thus, an XML representation of an object may be manipulated, as opposed to the object itself.

API layer 102 sits on top of a messaging layer 104. The messaging layer 104 is based on a representation data format, such as XML. In one embodiment, XML messages are generated by messaging layer 104 according to calls to the API layer 102. The messaging layer 104 may provide defined static messages that may be sent between clients and services. Messaging layer 104 may also provide for dynamically generated messages. In one embodiment, an object, such as a Java object, may be dynamically converted into an XML representation. The messaging layer 104 may then send the XML object representation as a message. Conversely, the messaging layer 104 may receive an XML representation of an object. The object may then be reconstituted from that message.

In one embodiment, messages sent by messaging layer 104 may include several basic elements, such as an address, authentication credentials, security tokens, and a message body. The message system transmission and receive mechanisms may be completely stateless. Any notion of state may be embedded in the message stream between sender and receiver. Thus, message transmission may be done asynchronously. In a preferred embodiment, no connection model is imposed. Thus, transports such as TCP are not required. Also, error conditions may be limited to non-delivery or security exceptions.

Messaging layer 104 sits on top of a message capable networking layer 106. In a preferred embodiment, messaging layer 104 does not require that a particular networking protocol be used. TCP/IP and UDP/IP are examples of message capable protocols that may be used for message capable networking layer 106. However, other more specialized protocols such as the Wireless Application Protocol (WAP) may also be used. Other possible message protocols are IrDA and Bluetooth network drivers beneath the transport layer. Networking layer 106 is not limited to a single reliable connection protocol, such as TCP/IP. Therefore, connection to a larger variety of devices is possible.

In one embodiment, message capable network layer 106 may be implemented from the networking classes provided by the Java2 Micro Edition (J2ME) platform. The Java2 Micro Edition platform may be suitable for smaller footprint devices that do not have the resources for a full Java platform or in which it would not be efficient to run a full Java platform. Since J2ME already provides a message capable family of networking protocols (to support sockets), it follows that for the small footprint cost of adding messaging layer 104, distributing computing facilities may be provided for small devices that already include J2ME.

Message capable networking layer 106 may also be provided by the Java Development Kit's (JDK) java.net networking classes. Alternatively, any message capable networking facilities may be used for message capable networking layer 106. In a preferred embodiment, a reliable transport is not required, thus embedded devices supporting an unreliable data gram transport such as UDP/IP may still support the messaging layer.

Figure 3:
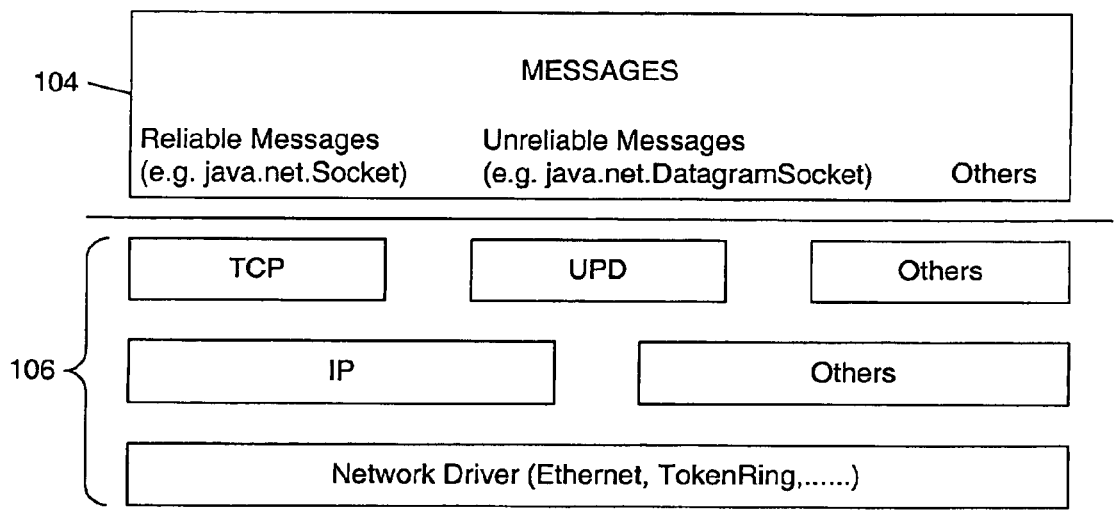
FIG. 3 is an illustration of messaging and networking layers for a distributed computing environment according to one embodiment.

Thus, thin clients may participate in a distributed computing environment by simply adding a thin messaging layer 104 above a basic networking protocol stack. As shown in FIG. 3, a basic system includes messaging layer 104 on top of a networking layer 106. The networking layer may provide for reliable messages, e.g. TCP, or unreliable messages, e.g. UDP. The Internet Protocol (IP) is shown in FIG. 3 as an example of protocol that may be used in networking layer 106. However, the distributed computing environment does not require IP. Other protocols may be used in the distributed computing environment besides IP. A network driver such as for Ethernet, Token Ring, Bluetooth, etc. may also be part of the networking layer. Many small clients already provide a network driver and transport protocol such as UDP/IP. Thus, with the addition of the thin XML based messaging layer, the device may participate in the distributed computing environment.

Thus, the foundation for the distributed computing environment is a simple message passing layer implemented on top of reliable connection and/or unreliable data grams. The messaging technology is very different from communications technologies employed in other distribution computing systems, such as Jini which employs the Java remote method invocation (RMI). The message passing layer 104 supports an asynchronous, stateless style of distributed programming, instead of the synchronous, state-full style predicated by RMI. Moreover, message passing layer 104 is based on a data representation language such as XML and thus copies data, but not code, from source to destination, unlike RMI. By using a representation data language, such as XML, messaging layer 104 may interoperate with non-Java and non-Jini platforms in a seamless fashion because Java code is not assumed on the sending or receiving end of a message. Moreover, unlike RMI, messaging layer 104 does not require a reliable transport mechanism such as TCP/IP.

The message passing layer may provide simple send( ) and receive( ) methods to send a message specified as an array or string of bytes, for example. The send( ) method may return immediately, performing the data transfer asynchronously. For flow control purposes a callback method may be supplied which is invoked in the event that the send( ) method throws an exception indicating it cannot handle the send( ) request. The receive( ) method may be synchronous and may return the next available message.

The message passing layer may also provide methods for storing XML representations of objects, services and content in "spaces". A space is named and accessed on the network using an URI (Uniform Resource Identifier). The URI may be a URL (Uniform Resource Locator) or a simpler version of a URL. In some embodiments, the URL class may be too large. For such embodiments a simpler resource locator may be used that specifies the protocol for moving the messages between client and server, protocol dependent host ID, protocol dependent port ID, and a space name.

An XML representation of an object may be added to a space using a write( ) method provided by the messaging layer. In one embodiment, the object and the client-specified name may be supplied as parameters. In one embodiment, the write method may translate the object into its XML representation. A take( ) method may be provided to return the object and remove it from the space. A find( ) method may be provided to return a specified object from its XML representation in a space. The find( ) method may also be used to return an array of matching objects in a space given a class.

Each of these space methods is implemented using the message-passing layer. A lease mechanism may also be provided, as described in more detail below.

Figure 4:
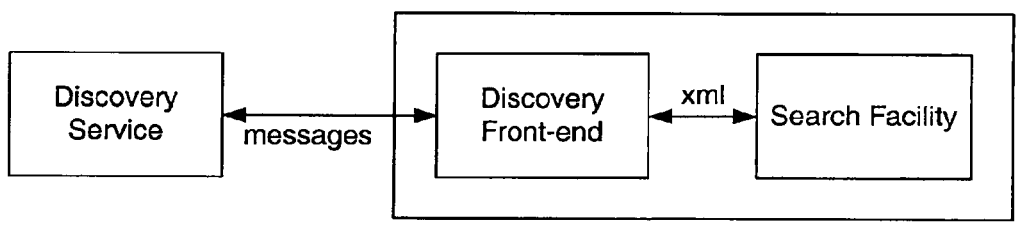
FIG. 4 is an illustration of a discovery service for finding spaces advertising objects or services in a distributed computing environment according to one embodiment.

A discovery service may be provided for clients as a general search facility that may be used by a client to locate a particular space. Rather than attempt to define a complicated search protocol which may not be feasible for a thin client to implement, the discovery service may offload the actual search to XML-based search facilities, leaving the discovery service simply to provide interface functionality to the client. The approach is illustrated in FIG. 4. In one embodiment, the discovery service receives a string specifying something to locate, and it sends an XML message to a known discovery front-end (perhaps found in a default space), which then parses the string and makes a corresponding XML query to a search facility (which may be an internet search facility). The discovery front-end may parse what it obtains from the search facility and repackage it as an array of strings (each string may be a URI for each found space) which it may send in an XML message to the client. It should be noted that the discovery service does not require that the messaging be atop a connection-oriented transport. Thus, even very thin clients that do not have TCP could use such a discovery service. The discovery front-end makes it possible for the client to discover spaces without a browser or search facility on the client. The client only needs a simple facility that sends a string that specifies keywords to the front-end, which interfaces with a search facility.

A client may be any platform that can send a message using at least a subset of the API and messaging layers. In one embodiment the API layer may provide for both static (or raw) and formatted (or cooked) messages. A server may be any platform capable of receiving and fulfilling message requests. An explicit raw message send may be provided that moves a series of bytes from a client to a server or to another client. The message type may be specified as reliable (e.g. TCP) or unreliable (e.g. UDP). The smallest of devices may use raw unreliable message passing as their sole means of participation in the distributed computing environment. The device may use these messages to announce its presence and its status. Such small devices may also receive raw messages to implement certain functions, such as turning a feature on or off.

Figure 5:
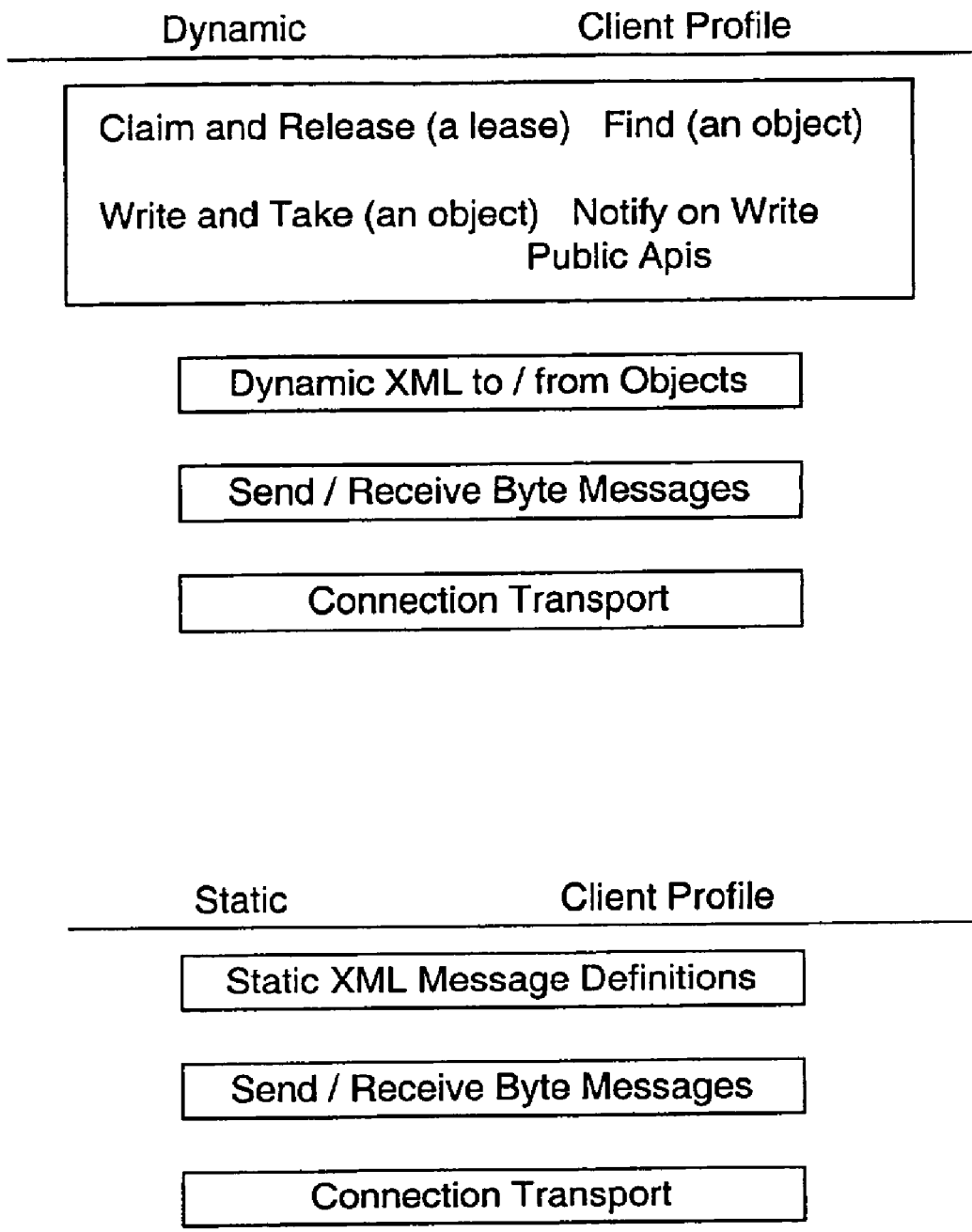
FIG. 5 illustrates client profiles supporting static and formatted messages for a distributed computing environment according to one embodiment.

Message-based services such as spaces may send and receive reliable formatted messages. A space message may be formatted with a well-defined header and with XML. In one embodiment, a formatted message send may occur when a client uses a space method to claim, write, or take objects from a space. The message contents may be dynamically formatted in XML and contain well-defined headers. FIG. 5 illustrates client profiles supporting formatted and static messages. By using static messages, small devices may use a smaller profile of code to participate in the distributed computing environment. For example, a small device could just send basic pre-defined messages. Depending on the client, the static pre-defined messages may consume a small amount of memory (e.g. <200 bytes). Static messages may also be an option even for larger devices. On the other hand, the dynamic XML messages may be useful when object values are not known at compile time.

Figure 6:
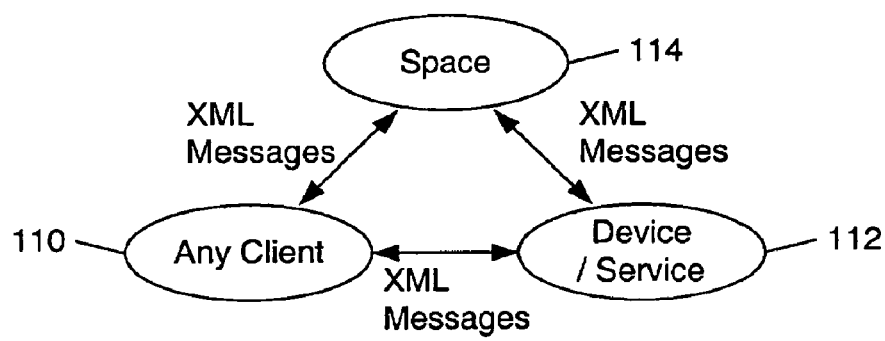
FIG. 6 is an illustration of a distributed computing model employing XML messaging according to one embodiment.

Turning now to FIG. 6, a distributed computing model is illustrated that combines a messaging system with XML messages and XML object representation. The platform independence of XML may be leveraged so that the system may provide for a heterogeneous distributed computing environment. Thus, client 110 may be implemented on almost any platform instead of a particular platform like Java. The messaging system may be implemented on any network capable messaging layer, such as Internet protocols (e.g. TCP/IP or UDP/IP). Thus, the computing environment may be distributed over the Internet. In one embodiment, the messaging system may also use shared memory as a quick interprocess message passing mechanism when the client and/or space server and/or service are on the same computer system. The distributed computing model of FIG. 6 may also be very scalable because almost any size client can be configured to send and/or receive XML messages.

Figure 7:
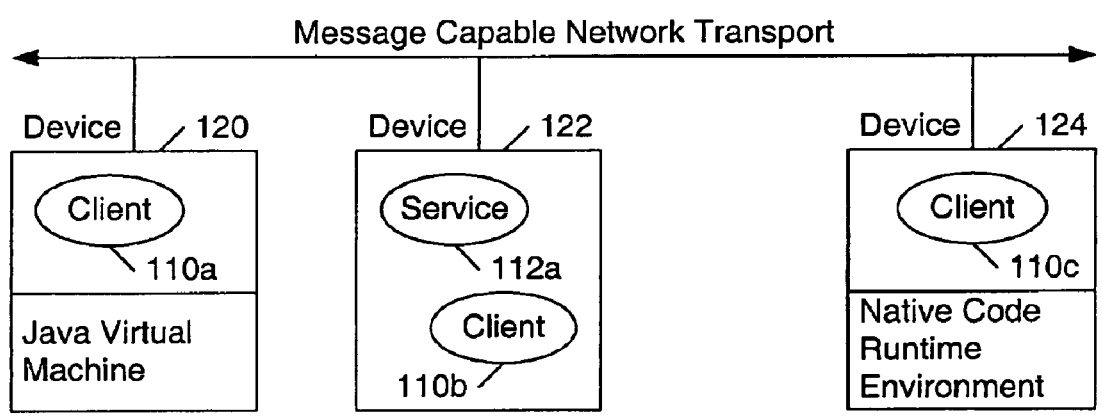
FIG. 7 illustrates a platform independent distributing computing environment according to one embodiment.

As shown in FIG. 6, two kinds of software programs may run in the distributed computing model: services 112 and clients 110. Services 112 may advertise their capabilities to clients wishing to use the service. The services 112 may advertise their capabilities in spaces 114. As illustrated in FIG. 7, clients 110 and services 112 may or may not reside within the same network device. For example, devices 120 and 124 each support one client, whereas service 112a and client 110b are implemented in the same device 122. Also, as illustrated in FIG. 7, no particular platform is required for the devices to support the clients and services. For example, device 120 is Java based, whereas device 124 provides a native code runtime environment.

A device may be a networking transport addressable unit. Example devices include, but by no means are limited to: PDAs, cellular/mobile phones, notebook computers, laptops, desktop computers, more powerful computer systems, even supercomputers. Both clients and services may be URI-addressable instances of software (or firmware) that run on devices. Using the distributed computing environment architecture, a client may run a service. A space is a service that manages a repository of XML documents. Even though it is redundant, the term, space service, may be used herein for readability. A software component may be both a client and service at different times. For example, when a service uses a space (e.g. to advertise itself), that service is a client of the space.

Figure 8:
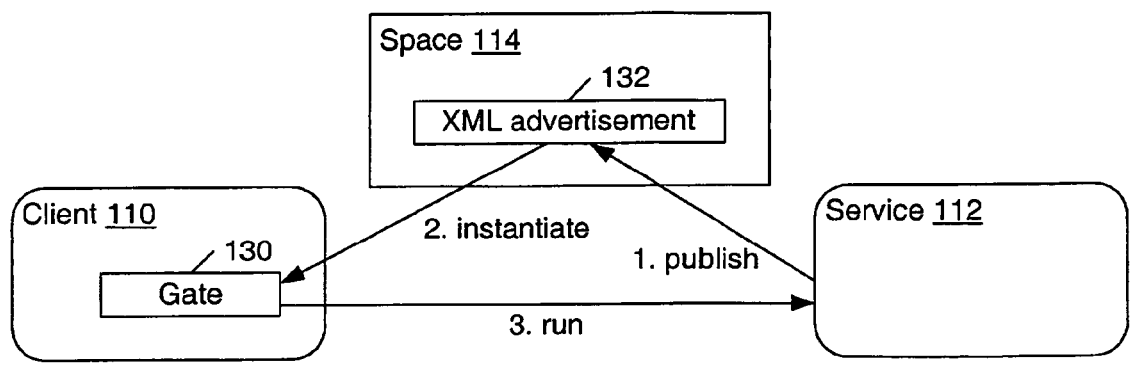
FIG. 8 is an illustration of a distributed computing model in which services are advertised in spaces according to one embodiment.

FIG. 8 illustrates the basic model of the distributed computing environment in one embodiment. The distributed computing environment may connect clients 110 to services 112 throughout a network. The network may be a wide area network such as the Internet. The network may also be a combination of networks such as a local area network (LAN) connected to a wireless network over the Internet. As shown in FIG. 8, a service 112 publishes an advertisement 132 for itself (represented in XML) in a space 114. The advertisement 132 specifies the service's XML schema and URI address. Then, a client 110 may look up the advertisement 132. The client 110 may use the advertisement 132 to instantiate a gate 130. The gate 130 allows the client 110 to run the service 112, by sending (and receiving) XML messages to (and from) the service 112.

Figure 9:
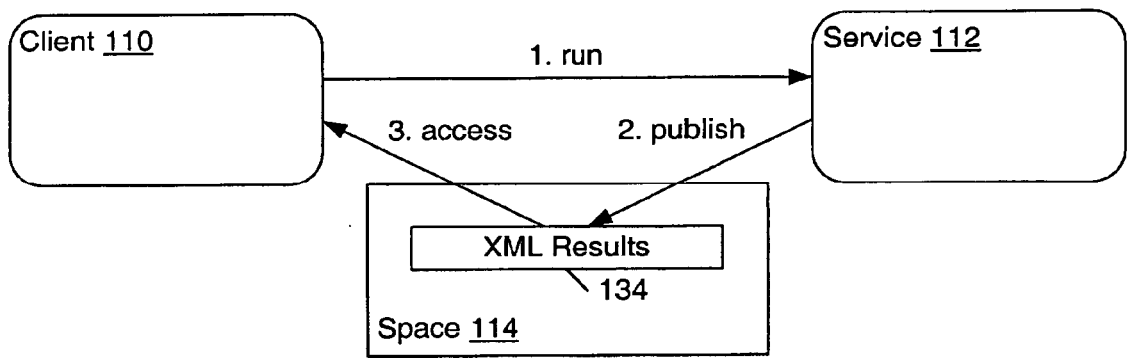
FIG. 9 is an illustration of a distributed computing model in which results are stored in spaces according to one embodiment.

Some results of running a service may be returned to the client in an XML message. However, since other results may be too large for a small client to receive and consume at once, a service 112 may put those results or an XML representation of the results 134 in a space 114, as shown in FIG. 9, and return them by reference (in an XML message) to the client 110, rather than by value. Examples of methods of returning a reference to results include, but are not limited to: returning in the message a URI referencing the results in a space, and: returning in the message an XML document including the URI of the results. Later, the client 110 may access the results, or pass them by reference to another service. The space in which results may be stored may be different from the space in which the service is advertised.

In one embodiment, the distributed computing environment uses XML for content definition, advertisement and description. New content for the distributed computing environment (messages and advertisements for example) are defined in XML. Existing content types (e.g. developed for other environments) may also be described using XML as a level of indirection (meta-data). XML provides a powerful means of representing data throughout a distributed system because, similar to the way that Java provides universal code, XML provides universal data. XML is language agnostic and is self-describing. The XML content may be strongly typed and validated using schemas. Using a provided XML schema, the system may ensure that only valid XML content is passed in a message. XML content may also be translated, into other content types such as HTML and WML. Thus, clients that do not understand XML may still use the distributed computing environment services.

In one embodiment, the distributed computing environment messages may define the protocol used to connect clients with services, and to address content in spaces and stores. The use of messages to define a protocol allows many different kinds of devices to participate in the protocol. Each device may be free to implement the protocol in a manner best suited to its abilities and role. For example, not all devices are capable of supporting a Java runtime environment. The distributed computing environment protocol definition does not require nor imply the use of Java on a device. Nor does it preclude it.

A service's capabilities may be expressed in terms of the messages the service accepts. A service's message set may be defined using an XML schema. An XML message schema defines each message format using XML typed tags. The tag usage rules may also be defined in the schema. The message schema may be a component of an XML advertisement along with the service's message endpoint used to receive messages. The distributed computing environment may allow clients to use all or some subset of a service's capabilities. Security policies may be employed to enforce the set of capabilities given to a client. For example, once a set of capabilities has been given to a client, the client may not change that set without proper authorization. This model of capability definition allows for services levels that range from a base set of capabilities to an extended set. Extensions may be added to services by adding to the number of recognized messages.

In one embodiment, all operations in the distributed computing environment are embodied as XML messages sent between clients and services. Storage (both transient and persistent) providers are examples of services that enable clients and services to store, advertise, and address content. Clients and services may find each other and broker content using a transient storage space. Services may place a content or service advertisement in a space. The advertisement may describe the content type or the capabilities of the service. Clients may subsequently browse spaces looking for advertisements that match a desired set of capabilities. When a client finds a matching advertisement, a communication channel may be established which may enable bi-directional message passing to the service backing the advertisement. In one embodiment, the communication channel is authenticated. Results (which are just another content type) from service operations may be returned directly to the client in a response message, advertised and stored in a space, or advertised in a space, but stored persistently. Stored results may be addressed using a URI (e.g. returned in the response message) and may have an associated authentication credential.

Message Gates

As discussed above, the distributed computing environment leverages off the use of a data description language, such as XML. XML may be used to describe a target entity (e.g. document, service, or client) to an extent such that code may be generated to access that entity. The generated code for accessing the target entity may be referred to as a message gate. Thus, in one embodiment, the distributed computing environment differs from other distributed computing environments in that instead of passing the necessary code between objects necessary to access the other object, the environment provides access to XML descriptions of an object or target so that code may be generated based on the XML description to access the target. The distributed computing environment may use an XML schema to ensure type safety as well as a programming model (e.g. supported messages) without having to agree upon language specific APIs, just XML schemas.

Code generated from an XML schema may also incorporate the language, security, type safety, and execution environment characteristics of the local platform. The local platform may thus have control over the generated code to ensure that it is bug-free and produces only valid data according to the schema. The generated code may conform to the client's code execution environment (e.g. Java, C++, Smalltalk), as well as its management and security framework (Web-server and/or operating system).

Note that the distributed computing environment does not require that code generated from an XML schema be generated "on the fly" at runtime. Instead, some or all of the code may be pre-generated for categories (or classes) of services, and then linked-in during the platform build process. Pre-generation of code may be useful for some clients, such as embedded devices, where certain XML schemas are already known. In one embodiment, some or all of the code doesn't actually have to be generated at all. A private code-loading scheme (within the client) might be used in one embodiment to augment the generation process. In addition, the distributed computing environment may specify, in some embodiments, an interface to download code for additional features in accessing a service (see, e.g., message conductors described below). Typically, such downloaded code may be small and the client may have the option to download the code or not.

The phrase "generated code" may refer to code that originates within the client under the control of the client code execution environment, or to code that is generated elsewhere (such as on the service system or on a space service system) and that may be downloaded to the client system after generation. Binding time, however, may be at runtime. At runtime, the generated code may be bound to a service address (URI), so that a message may be sent to that service instance.

Figure 10A:
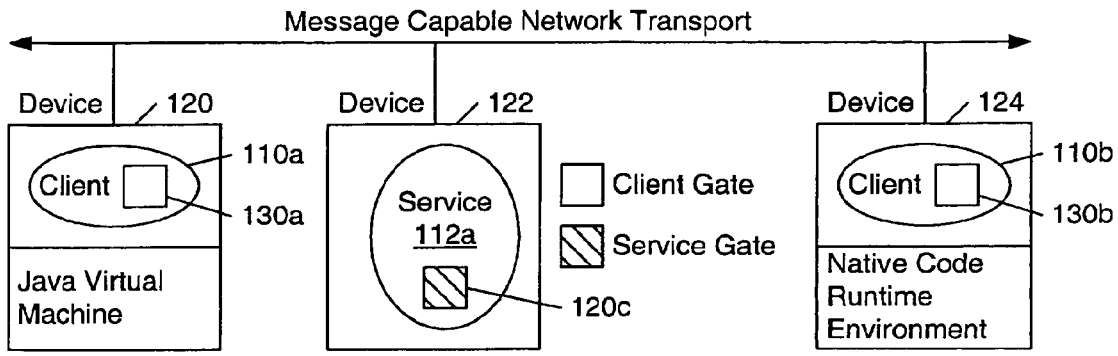
FIG. 10a is an illustration of client and service gates as messaging endpoints in a distributed computing model according to one embodiment.

As discussed above, the interface to any service in the distributed computing environment may be specified by an XML schema, defining the set of messages that a client may send (and receive from) that service. As illustrated in FIG. 10, the client 110 and service 112 may each construct a message gate 130 for communicating according to the specified XML schema. From the XML schema advertised for the service 112 (and possibly other information in the service advertisement), a message gate 130a or 130b may be constructed by the client 110a or 110b respectively. A corresponding message gate 130c generated from the same XML schema may also exist on the service 112a. A gate 130 is a message endpoint that may send and/or receive type-safe XML messages, and that may verify the type correctness of XML messages when sending and/or receiving the messages. The message gate may also provide for authentication and/or other security mechanisms to ensure that the message endpoint is secure. In one embodiment, message gates are always secure.

The distributed computing environment messaging layer described above may be coupled to or may be part of the gate. The messaging layer asynchronously delivers an ordered sequence of bytes, using a networking transport, from the sender to the receiver, maintaining the notion on both the sender and receiver that this sequence of bytes is one atomic unit, the message. The distributed computing environment does not assume that the networking transport is IP-based. Instead, the messaging layer may sit atop whatever networking transport layer is supported by the device.

Message gates may provide a mechanism to send and receive XML messages between clients and services. The XML messages may be "typed". For example, the messages may include tags to indicate if a message data field is, e.g., integer, floating point, text data, etc. A message gate may be constructed to verify the type correctness of messages sent or received. A message gate also may authenticate (e.g. securely identify) the sender of a received message. An XML schema may be provided for a service that describes the set of messages accepted by the service and/or sent by the service. A message gate may verify the correctness of messages sent or received according to the XML schema for which the gate is constructed.

A gate may be constructed as a single atomic unit of code and data that performs type verification and/or message correctness verification and/or sender identification for messages between a client and a service in the distributed computing environment. In one embodiment, once the atomic unit of code and data for a message gate has been created, it cannot be altered as to its typing, message descriptors, and sender identification. In another embodiment, the gate may be modified as to the contents of the message schema after the gate is created, including deleting, adding, or modifying messages in the message schema.

A message gate is the message endpoint for a client or service in the distributed computing environment. A message gate may provide a secure message endpoint that sends and receives type-safe XML messages. Messages gates may allow clients and services to exchange XML messages in a secure and reliable fashion over any suitable message transport (e.g. HTTP). For a client, a message gate may represent the authority to use some or all of a service's capabilities. Each capability may be expressed in terms of a message that may be sent to a service. Each such message may be sent through a client message gate which may verify the correctness of the message. The message may be received by a service message gate which may authenticate the message and verify its correctness.

A message gate may provide a secure communication endpoint that type checks XML messages. As further discussed below, a message gate may also provide a mechanism to restrict the message flow between clients and services. In one embodiment when a client desires to access a service, a client and service message gate pair is created, if not already existing. In one embodiment, the service message gate may be created when the service receives a first message from the client message gate. In one embodiment, one or more service message gates may be created when the service is initialized, and may be used to pair with client message gates when created. The creation of a message gate may involve an authentication service that may negotiate the desired level of security and the set of messages that may be passed between client and service. In one embodiment, the authentication service may accept a client ID token (also referred to as a client token), a service ID token (also referred to as a service token), and a data representation language message schema that describes the set of data representation language messages that may be sent to or received from the service. For example, messages may be described that may be sent from a client to a service to invoke the service or to invoke aspects of the service. Messages may also be described that are to be sent from the service, such as response messages and event notification messages. Refer to the Authentication and Security section below for a further discussion of how the authentication service may be used in the construction and use of message gates.

A client message gate and a service message gate pair may allow messages to be sent between the client and the service. In one embodiment, message gates may be created that only send and/or receive a subset of the total set of messages as described in the message schema for a service. This limited access may be used within the distributed computing environment to implement a policy of least privilege whereby clients are only given access to specific individual message types, based on a security policy. Refer to the Authentication and Security section below for a further discussion of security checks for gate usage and gate creation.

Client and service gates may perform the actual sending (and receiving) of the messages from the client to the service, using the protocol specified in the service advertisement (URI of service in the service advertisement). The client may run the service via this message passing. A message gate may provide a level of abstraction between a client and a service. A client may access a service object through a message gate instead of accessing the service object directly. Since the gate abstracts the service from the client, the service's code may not need to be loaded, and then started, until the client first uses the service.

The client gate may also perform verification of the message against the XML schema, or verification of the message against the XML schema may be performed by the service gate, e.g. if the client indicates it has not yet been verified. In some embodiments, verification may not be practical for simple clients and may thus not be required at the client. In some embodiments, verification may be performed by the service. The gates may also perform authentication enablement and/or security schemes. In one embodiment, if a client does not support the protocol specified in the service advertisement, then it may not be able to construct the right gate. To avoid this problem, service advertisements (used for gate construction) may include a list of possible URIs for a service, so a variety of clients may be supported.

Figure 10B:
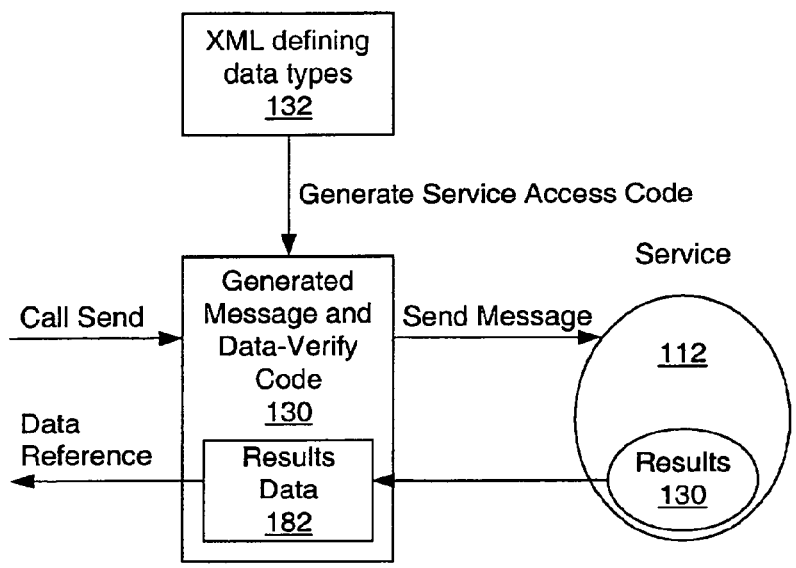
FIG. 10b is an illustration a message endpoint generation according to a schema for accessing a service according to one embodiment.

A basic message gate may implement an API to send and receive messages. The API moves data (e.g. XML messages) in and out of the gate, validating messages before sending and/or upon receiving. In one embodiment, message gates may support a fixed minimum API to send and receive messages. This API may be extended to other features as discussed below. As illustrated in FIG. 10b, a gate 130 may be generated according to an XML schema 132. The generated gate code verifies messages based upon the XML schema. The gate may verify correct message types and/or content through the message API. As illustrated in FIG. 10b, through the message API a verified message may be sent to a service. The message may be received by a corresponding gate at the service. In response to the message, the service may generate results 180. The service may return result data 182 through its gate. The results data may be the results themselves or a reference to the results, such as a URI to results stored in a space. In various embodiments, the message API may support synchronous messages (request-response), asynchronous messages (response is disconnected from request), unicast messages (point to point), multi-cast messages (broadcast), and publish and subscribe (event messages), for example. Other type of messages may also be supported, such as remote method invocation messages.

Each message sent by a gate may include an authentication credential so that the receiving gate may authenticate the message. Each message may also include a token which includes information allowing the receiving gate to verify that the message has not been compromised or altered. For example, the sender may compute a hash or checksum of the message which may be verified by the receiver. The sender may also encrypt this token and/or the entire message using the sender's private key and may include in the encrypted message the corresponding public key so that the receiver may verify that the token was not changed. See the section below on Authentication and Security.

A pair of message gates may provide a mechanism for communicating requests from clients to services and response from services to clients. Two associated message gate endpoints may be used to create a secure atomic bi-directional message channel for request-response message passing. Thus, the distributed computing environment may employ a message transport in which a message gate exists on both the client and the service sides. The two gates may work together to provide a secure and reliable message channel.

Figure 11A:
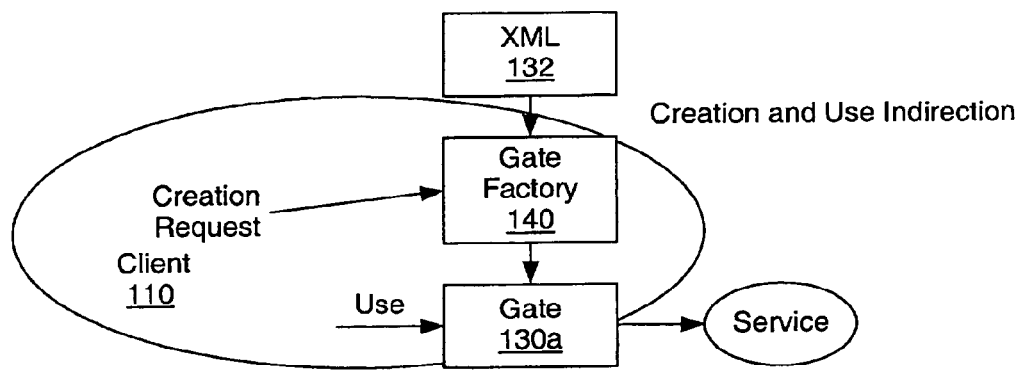
FIG. 11a illustrates gate creation in a distributed computing environment according to one embodiment.
Figure 11B:
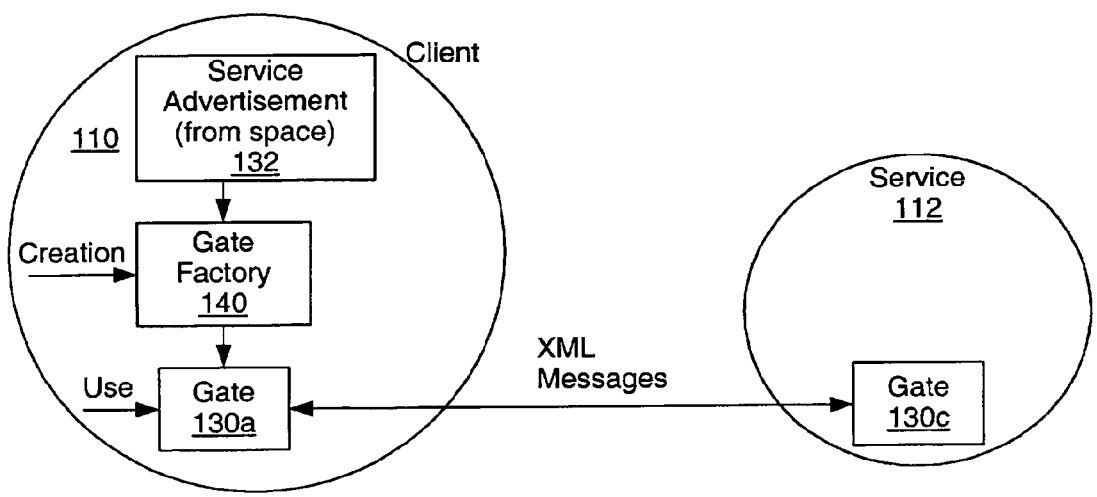
FIG. 11b illustrates gate creation and gate pairs in a distributed computing environment according to one embodiment.

Turning now to FIG. 11*a*, an illustration is provided for one embodiment showing construction of a gate 130*a* in a client 110 from a service advertisement or other service description 132. The client may have a gate factory 140 that is trusted code on the client for generating gates based on XML service descriptions. The use of the gate factory 140 may ensure that the gate it generates is also trusted code, and that the code is correct with respect to the service advertisement. As shown in FIG. 11*b*, a gate 130*c* may also be constructed at a service 112. The client gate 130*a* and the service gate 130*c* provide message endpoints for communications between the client and service. In one embodiment, the pieces the gate factory needs to construct a gate 130 are the XML schema of the service (from the service advertisement) and the URI of the service (from the service advertisement). In another embodiment, an authentication credential may also be obtained and used in gate construction by running an authentication service specified in the service advertisement.

A gate factory may provide a trusted mechanism to create message gates. In some embodiments, in order to ensure that a message gate is a trusted message endpoint, the code used to create the gate must be trusted code. A gate factory 140 may be a trusted package of code that is used to create gates. In one embodiment, each client and service device platform that desires to send and receive messages in the distributed computing environment may have a gate factory. In some embodiments, gates may be pre-constructed by a separate gate factory so that a device with pre-constructed gates may not need a full gate factory, or may include a partial gate factory for binding a service URI and/or an authentication credential to the pre-constructed gate at runtime (e.g. when messaging is desired).

A gate factory for a device may generate gate code that may incorporate the language, security, type safety, and/or execution environment characteristics of the local device platform. By constructing gates itself, a device has the ability to ensure that the generated gate code is bug-free, produces only valid data, and provides type-safety. An advantage of a device generating its own gate code as opposed to downloading code for accessing a service is that the client code management environment has the control. The generated code may conform to the client's code execution environment (e.g. Java, C++, Smalltalk), as well as its management and security framework (Web-server and/or operating system). Generated code is also trusted code, because the client's runtime environment was involved in its creation. Trusted security information therefore may also be added by the trusted generated code. Thus, a device may receive an XML message schema for a service and then construct a gate based on that schema to access the device. The XML schema may be viewed as defining the contract with the service and the generated gate code as providing a secure way to execute the contract. Note that open devices, in which un-trusted (e.g. downloaded) code may be run, may be configured so that gates may be generated only by trusted code. Open devices may employ a process model in which gates are enclosed in a protected, isolated code container that is not accessible to tools, such as debuggers, capable of discovering the gate's implementation, especially the gates authentication credential.

A gate factory 140 may negotiate on behalf of a client with a service to create a gate to send messages to the service. Similarly, a gate may be constructed at the service to receive messages from the client gate and send messages to the client gate. Together, the client and service gates may form a secure bi-directional communication channel.

A gate factory may provide a level of abstraction in gate creation. For example, when a client desires to use a service, instead of the client directly creating a gate to access the service, the gate may be created by a gate factory as part of instantiating the service.

The gate factory may create or may include its own trusted message gate that is used to communicate with an authentication service (e.g. specified by a service advertisement) to receive an authentication credential for the gate being constructed. For services that do not restrict access, a gate may be constructed without an authentication credential. The gates for such services may not need to send an authentication credential with each message since the service does not restrict access. The authentication service is an example of a service that does not restrict access, in one embodiment. Thus, a gate factory may be configured to optimize gate construction by checking whether a service restricts access. If the service does not restrict access, then the gate factory may avoid running an authentication service as part of gate construction and may avoid included provisions for an authentication credential as part of the constructed gate. The gate factory may also receive or download an XML message schema (e.g. specified by a service advertisement) to create a gate matching that schema. The gate factory may also receive or download a URI for the service and/or for a service message gate for use in creating the client message gate to communicate with the URI.

In addition, another gate construction optimization may be employed for certain clients that do not desire to perform checking of messages against a service's XML schema. The client may be too thin to perform the checking or may rely on the service gate to perform the checking or may simply choose not to perform the checking (e.g. to reduce gate memory footprint). The gate factory may be configured to receive an indication of whether or not a gate should be constructed to verify messages against the provided XML schema. In some embodiments, certain clients may have a gate factory that does not provide for message verification against a schema for its constructed gates. In some embodiments, gates may be pre-constructed not to verify messages. In some embodiments, a gate may be constructed to verify outgoing messages only, or verify received messages only. Thus, in some embodiments, a client may avoid or may chose to avoid building some or all of the gate code that checks the messages against the XML schema.

In some embodiments, devices may maintain a cache of gates to avoid constructing them each time the same service is run. For example, when a new gate is constructed by a gate factory, the gate may be maintained in a gate cache. When the gate is no longer being used, it is kept in the gate cache instead of being deleted. If the gate cache becomes full, one or more gates may be removed from the gate cache according to a cache replacement algorithm, such as least recently used. When the gate factory is called to construct a gate, it first checks the gate cache to see if a matching gate already exists so that construction of a new gate may be avoided.

The building of a gate may be made lightweight by appropriate reuse of pieces used to construct other gates. Certain portions of each gate may be the same, and thus may be reused from gate to gate, such as parts of the message verification code. Also, for some devices, common gate code may be built into the system software for the device and shared by all gates on that device. Thus, the gate factory may avoid rebuilding this common code for each gate. Instead, the gate factory may simply bind the gate to this system software portion. For example, a system software portion may be provided to handle the message layer over whatever transports are provided on the device.

Space services in particular may be good candidates for many of the gate construction optimizations described above since a service gate constructed for a space service may perform many of the same functions as other service gates for that space service. Refer to the Spaces section below for more information on space services.

In some instances, a more efficient form of method invocation may exist. For example, if the target service runs in the same Java Virtual Machine as the client application, a more efficient form of method invocation may be to create a Java dynamic proxy class for the service. In such a case, a java.lang.reflect.Method invocation may be faster than sending a message. A gate binding time procedure may check for such an optimization and use it instead of running the gate factory to create a gate or bind an existing gate.

In one embodiment, such as for special-purpose clients or small embedded devices, the generation of gate code at runtime may not be desirable due to memory consumption and code generation time. Thus, instead of having a gate factory that generates gates at runtime, in some embodiments gates may be pre-generated and built into the device. For example, message gates may be generated during the build of embedded software as a means of including a built-in secure message endpoint that does not have to be constructed at runtime. Thus, a client with built-in gates may not need a full gate factory, or may require only a partial gate factory for performing certain runtime binding to a built-in gate, such as for the URI and/or authentication credential.

A generation tool may be provided for the pre-construction of gates. The generation tool may include an XML parser, a code generator and a code compiler. In one embodiment, the code generator may be a Java source code generator and the code compiler may be a Java code compiler. During the build of the software for which built-in message gates is desired, the generation tool is run with input from all the relevant XML schemas for which gates are desired.

As an example, if it is desired for a device to have a built-in message gate that can send and receive messages from a digital camera, the build of the device software may include running the gate generation tool with the camera's XML message schema as input. The XML schema may be parsed by the XML parser that may convert the XML schema into an internal form suitable for quick access during a message verification process. The tool's code generator may provide source code for a gate corresponding to the camera's schema. In some embodiments, the generation tool may also compile the source code and the gate code may be linked into the software package for the device. At runtime, the camera service may be discovered in the distributed computing environment. The message URI for the camera service may be bound to the built-in gate for the camera within the device. The binding of the URI to the pre-constructed gate may be performed by a gate constructor within the device. This gate constructor may be a much smaller, simpler gate factory. When the camera service is instantiated, the URI for the camera service is passed to the gate constructor as an XML message. The gate constructor may then bind the URI to the pre-constructed gate.

Thus, a gate may be partially or fully generated at runtime, or a gate may be pre-generated before runtime with a binding process (e.g. for a URI or credential) performed at runtime. In one embodiment, a gate generation tool such as the gate factory or the generation tool for pre-constructed gates may be a Java-based tool to provide some level of platform independence. Alternatively, gate generation tools may be provided in any language, such as the native code for a particular device in the distributed computing environment.

Note that the distributed computing environment does not preclude a device from downloading part or all of a gate's code. For example, in some embodiments, a service may provide gate code that may be downloaded by a client wishing to access that service. However, downloaded code may present size, security and/or safety risks.

Figure 12:
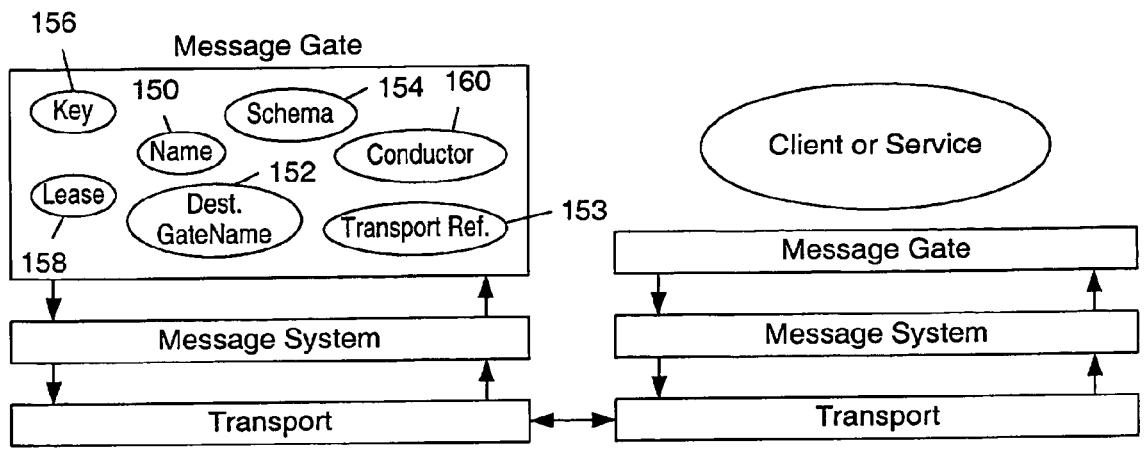
FIG. 12 is an illustration of possible gate components in a distributed computing environment according to one embodiment.

A more detailed illustration of possible gate components for one embodiment is shown in FIG. 12. A gate may include its address (or name) 150, a destination gate address 152, a valid XML schema (or internal form thereof) 154, and a transport URI 153. In other embodiments, a gate may also include an authentication credential 156. Some gates may also include a lease 158 and/or a message conductor 160 to verify message ordering.

A gate's name 150 may be a unique ID that will (for the life of the gate) refer only to it. A gate may be addressed using its gate name 150. In one embodiment, gate names may be generated as a combination of a string from an XML schema (e.g. from a service advertisement) and a random number, such as a 128-bit random number. The name 150 may allow clients and services to migrate about the network and still work together. In a preferred embodiment, the gate address is independent of the physical message transport address and/or socket layer. Thus, a gate name may provide a virtual message endpoint address that may be bound and un-bound to a message transport address. In one embodiment, a gate's name may be a Universal Unique Identifier (UUID) that may, for the life of the gate, refer only to it.

A gate name may persist as long as the gate persists so that different applications and clients executing within the same device may locate and use a particular gate repeatedly. For example, a gate may be created for a first client process executing within a device to access a service. After the first client process has completed its activity with the service, it may release the gate. Releasing the gate may involve unbinding the gate from the first client process's message transport address (e.g. IP and/or Port address). The gate may be stored in a gate cache or repository. A second client process executing within the same device that desires to run the same service may locate the gate by its name and use it to access the service. To use the gate, the second client process may bind the gate to its message transport address, so that the message endpoint for the second client process is a combination of the gate name and the second client process's transport address. In another example, a client may receive a dynamic IP address (e.g. a mobile client). When the client's transport address changes, a gate name (or gate names) may be re-bound to the client's new transport address so that the client may still access a service(s) that that it previously accessed without having to relocate the service and recreate the gate. A gate name may also be useful for process migration. A process and any associated gates may be checkpointed or saved at one node in the distributed computing environment and moved to another node. The process may be restarted at the new node and the associated gates may be bound to the transport address for the new node so that the process will still have access to the external services to which it had access before being migrated. A gate may track the current location of another gate to which it is paired. Thus a service or client may be migrated and still be accessible. For example, replicated or load-balanced service implementations may be abstracted from clients of the service by the gate.

Thus, a gate name 150 provides a flexible mechanism by which to address a message endpoint in the distributed computing environment. A gate name may be used to locate and/or address a gate over a wide range of networks, from a local network to the Internet. Gate names may be independent of message transport so that a message endpoint (gate) may be moved from transport to transport by unbinding and rebinding to different underlying transport addresses (e.g. IP/Port address pairs).

In one embodiment, a gate may also be separated from a service so that the same gate may be used to send requests to different services over time. This may involve un-binding the gate's destination gate address 152 and binding a new destination gate address to the gate.

A gate may be implemented as a layer above a device's transport layer (e.g. networking sockets). Each gate may include a transport reference 153. The gate name 150 may be bound to the transport reference 153 as described above. Multiple gates may share the same message transport. For example, multiple gates may have transport references 153 to the same TCP/IP socket. By sharing the same message transport, the size and complexity of each gate may be reduced. A device in the distributed computing environment may have a large number of gates that need to send and receive messages. The message handling complexity for multiple gates may be reduced by sharing a common message transport. The transport reference 153 may be a transport URI (e.g. URL) or socket reference and may provide a mechanism for naming an underlying transport and sharing the transport with other gates. Multiple local gates may include a reference 153 to the same transport, however, each local gate may behave independently of the other local gates sending and receiving messages to and from its paired remote gate.

The schema 154 may be downloaded from a space into the gate by the gate factory. The schema may be compiled into an internal form suitable for quick access during a message verification process. In one embodiment, the schema may specify two groups of messages: client service messages and provider service messages. The client service messages group includes the description of all messages that the client may send (that the provider supports), and the provider service messages group includes the description of all messages that the provider may send (that the client receives). In one embodiment, either the client or provider may send a particular request to the space service to obtain a response message with either: the entire client service messages, the entire provider service messages, the entire client and provider service messages, or a specific message of either the client service messages or the provider service messages. In addition, once a gate has been constructed, a client may query as to the capabilities of the service without the gate actually sending a message, but instead by inspecting the gate's set of messages.

As described above, a message gate may verify the sender of the message using an authentication credential, message content for type safety and according to an XML schema. However, it may also be desirable to verify that messages are sent between a client and a service in the correct order. It may be desirable to be able to provision applications (services) for clients to run without any pre-existing specific functionality related to the application on the client (e.g. no GUI for the application on the client). For example, a Web browser may be used on a client as the GUI for a service instead of requiring an application-specific GUI. Of the possible messages in the XML schema, the client may need to know what message next to send to the service. It may be desirable for the client to be able to determine which message to send next without requiring the client to have specific knowledge of the service. In one embodiment, the service may continually send response messages indicating the next input it needs. The service would then accept only the corresponding messages from the client with the requested input specified. Other ad hoc scheme for message ordering may also be employed.

In another embodiment, a message conductor 160 may be employed in the gate or associated with the gate to verify the correct sequence of messages, as opposed to verifying each message's syntax (which may already be performed in the gate according to the schema). Message conductor 160 may provide a more general approach for application provisioning. The message conductor 160 may be specified in a service's advertisement. The message conductor indication in a schema may allow code to be generated on or downloaded to the client during gate construction, which may provide the choreography needed to decide which message to send next to the service. A message conductor may be implemented as a Java application, a Java Script, WML script, or in other programming or scripting languages.

In one embodiment, the message conductor may accept as input an XML document (e.g. from a service advertisement) that presents the valid order or choreography for messages that may be sent between a client and the service. This XML document may also specify user interface information and other rules. The conductor may parse this XML document into an internal form and enforce message ordering (and/or other rules) according to the enclosed ordering information. The conductor may prevent messages from being sent out of order. Or, if a message is sent out of order, an exception may be raised within the sending device. If a message is received out of order, the conductor may send an automatic response message back declaring the ordering error. The sender may then resend messages in the correct order. Note that in some embodiments, part or all of a conductor may be shared by several gates. Thus, a conductor may be linked to multiple gates.

In one embodiment of a distributed computing environment, front ends for services (service interfaces) may be built in to clients. In one embodiment, the service interface may be a preconstructed user interface provided to the client by the service. In one embodiment, the service interface may be provided to the client in the service advertisement. The service interface may interact on the client with the user of the service to obtain input for running the service, and then may display results of running the service on the client. A "user" may be a human, embedded system, another client or service, etc. In one embodiment, a client device may not be able to provision arbitrary services, as the client device may only be able to run services for which it has a front end built in. In one embodiment, a service interface for a service may be implemented in a Web browser on the client.

In one embodiment, a message conductor and/or service interface may be external to the gate and thus abstracted from the gate and client. The abstracted message conductor may provide provisioning of arbitrary services to any client device. In one embodiment, the message conductor may be written in code that may run on substantially any platform. In one embodiment, the message conductor may be written in the Java language. In one embodiment, the message conductor may not require the arbitrary downloading of objects, for example, Java objects, returned to the client device. For example, very large objects may be returned, and the message conductor may choose to not download these very large objects. In one embodiment, the message conductor may send XML messages to services from the client device on behalf of the client. The message conductor may interact with the user of the service to receive input and display results.

In one embodiment, a service interface may be provided that interacts with the client (e.g. thru a user interface) to obtain all information to run the service, and then may display either results of running the service or information regarding the location of results, as appropriate. The service interface may be either part of a message conductor 160 or may be in addition to and work with message conductor 160. The service interface may either be:

1. Built in to the client device and thus run on the client.
2. Downloaded to the client device from the space server.
3. Run on the space server.
4. Run on the service provider.

In one embodiment, to a client, the distributed computing environment space server must support #1 always, indicate if #2 is supported (by advertisement in space), indicate if at least one of #3 and #4 is supported. Note that whether or not it supports #4 depends upon whether or not the service provider supports #4. In one embodiment, to a service provider, the distributed computing environment space server must support #4 always and indicate if it supports #3.

Regardless of where the service interface runs, once a service is activated, the service interface may interact with the client, displaying (remotely) requests for input on the client's display, and then displaying (remotely) results of running the service. Such interaction with the client is implemented in terms of XML messages.

The service interface and/or message conductor may meet the needs of a client user that may have discovered a service, but does not want to read a typically large, dry computer manual to figure out how to use the service. As the service interface and/or message conductor interacts with the user to request all input that the service needs, they may even provide short descriptions of the input requested if the user requests it. Once the service interface has obtained the necessary information from the client, it may send XML messages to the service provider that runs the service. The ordering of the messages may be verified by the message conductor 160 in the gate.

In a preferred embodiment, all messages flow through a gate. A gate may be configured to provide a flow control mechanism. For example, a service may need to handle a large amount of incoming and outgoing messages. Flow control may allow a service to keep up with high traffic volume. Gates may be configured to monitor messages for flow control tags. When a gate receives a message, it may examine that message for a flow control tag. The flow control tags may be XML tags. A message may include either an OFF tag or an ON tag, for example. If a received message includes an OFF tag, the receiving gate will stop sending messages to its paired destination gate. If the gate receives a message including an ON tag, it may resume sending messages.

In some embodiments, a client may be too thin to support a full gate, or a client may not include software to directly participate in the distributed computing environment. In such embodiments, a server (such as the space server in which the service is advertised or another server) may be a full or partial proxy gate for the client. The server may instantiate a service agent (which may include a gate) for each service to be used by the client. The service agent may verify permission to send messages; send messages to the provider, possibly queuing them until the provider can accept the next one; send messages to the client, possibly queuing them until the client can accept the next one; and manage the storing of results in a result or activation space. See also the Bridging section herein.

Figure 13:
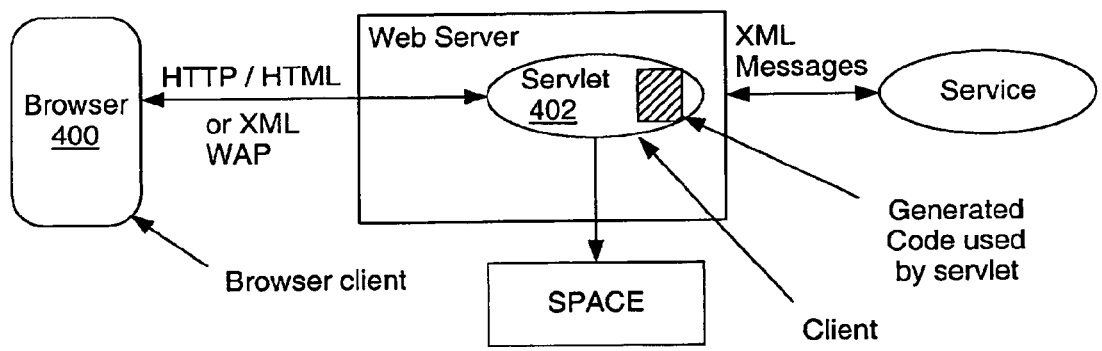
FIG. 13 is an illustration of proxy client for a conventional browser to participate in the distributed computing environment according to one embodiment.

For example, as illustrated in FIG. 13, a client may be a conventional browser 400 that does not support gates to participate directly in the messaging scheme described above. The browser 400 may be aided by a proxy servlet (agent) 402. The browser user may use a search engine to find a Web page that fronts (displays the contents of) a space advertising services within the distributed computing environment. The user is able to point and click on the space Web page and, with the help of the servlet, to access services. The Web pages may include scripts, for example, Java or WML scripts, which may be used in connecting the browser to the proxy servlet. Scripts may also be used to send messages to the proxy servlet. The servlet agent may translate Web page actions into messages on behalf of the browser client. These actions may include navigating a space, starting services, and returning results. Result page URIs (referencing pages containing XML) may be returned directly (or translated into HTML or WAP if needed) to the browser, for display to the user. Thus, the browser-based client does not need to know how to start services, nor which messages to send during the service usage session. For example, a user of a WAP browser (e.g. on a cell phone) may connect to a space page, browse its contents (services), and then start a service, all by pointing and clicking. The agent 402 provides the client interface between the conventional client and the distributed computing environment.

Figure 14:
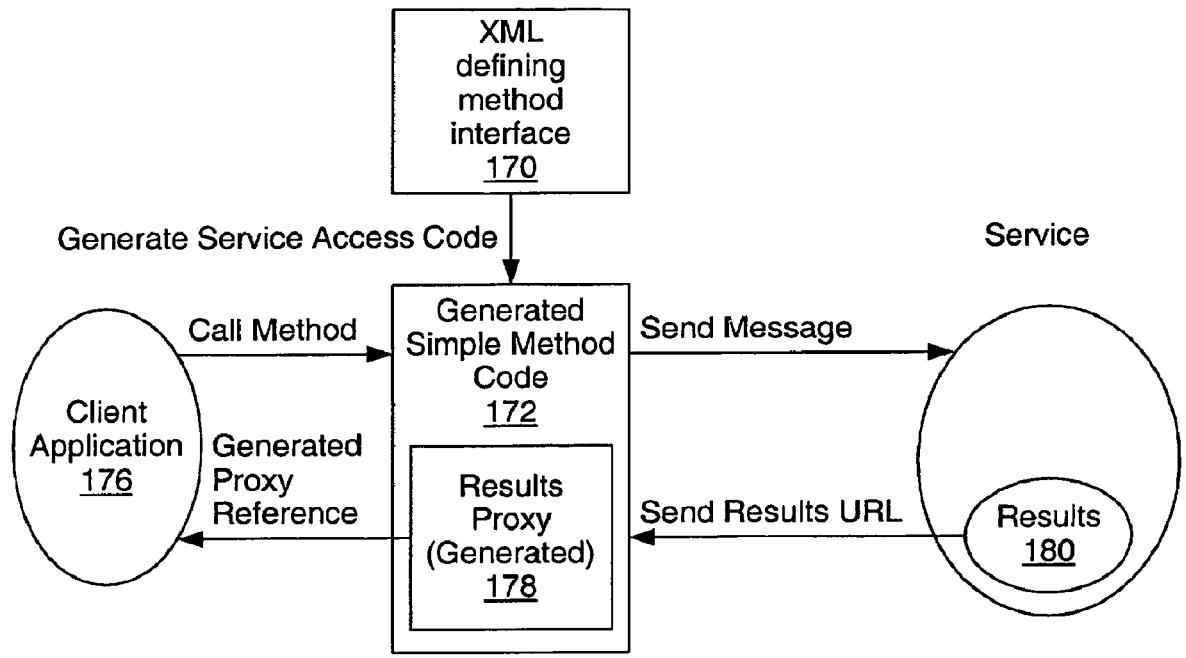
FIG. 14 illustrates the use of a method gate to provide a remote method invocation interface to a service in a distributed computing environment according to one embodiment.

The distributed computing environment may include several different types of message gates for communicating between clients and services that support different features. For example, as discussed above, some gates may support flow control or billing. Another type of message gate may support a form of remote method invocation. This type of gate may be referred to as a method gate. FIG. 14 illustrates the use of a method gate to provide a remote method invocation interface to a service. Method gates provide a method interface between clients and services. A method gate may be bi-directional, allowing remote method invocations from client to service and from service to client. A method gate 172 may be generated from XML schema information 170 (e.g. from a service advertisement in a space). The XML schema information 170 includes XML defining a method interface(s). From this information, code may be generated as part of the gate for interfacing to one or more methods. Each method invocation (e.g. from a client application 176) in the generated code may cause a message to be sent to the service containing the marshaled method parameters. The message syntax and parameters to be included may be specified in the XML schema. Thus, the method gate 172 provides an XML message interface to remotely invoke a service method. The method gate may be generated on the client or proxied on a server, such as the space server where the service method was advertised or a special gateway server.

A service may have a corresponding method gate that implements or is linked to a set of object methods that correspond to the set of method messages defined in the service's XML schema. There may be a one to one correspondence between the object methods implemented by or linked to the service's method gate and the method messages defined by the service's XML schema. Once a service's corresponding method receives a message from a client to invoke one of the service's methods, the service's method gate may unmarshal or unpack the parameters of the message invocation and then invoke the method indicated by the received message and pass the unmarshalled parameters.

The method gate may provide a synchronous request-response message interface in which clients remotely call methods causing services to return results. The underlying message passing mechanics may be completely hidden from the client. This form of remote method invocation may deal with method results as follows. Instead of downloading result objects (and associated classes) into the client, only a result reference or references are returned in XML messages, in one embodiment. An object reference 178 may be a generated code proxy (e.g. result gate) representing the real object result 180 (still stored out on the net, for example). In other embodiments, the client may choose to receive the actual result object. Also, once a client has received a result object reference, the client may use this reference to receive or manipulate the actual result object. In one embodiment, the result reference includes one or more URI's to the real result.

The real result object(s) may be stored in a service results space (which also may be created dynamically by a servlet for example). This temporary results space may act as a query results cache. The results cache (space) may be patrolled by server software (garbage collector) that cleans-up old result areas. Results returned from each method invocation may be advertised in the results space. A result itself may be or include a method that could then be remotely instantiated by a client, thus generating its own method gate. Therefore, the distributed computing environment may support recursive remote method invocation.

As mentioned above, when a client uses a method gate to remotely invoke a service method, a reference to the method results may be returned from the service method gate instead of the actual results. From this reference, a result gate may be generated to access the actual result. Thus, the client or client method gate may receive a result URI and perhaps a result XML schema and/or authentication credential for constructing a gate to access the remote method results.

In one embodiment, a service gate may create a "child gate" for the results. This child result gate may share the same authentication credential as its parent gate. In some embodiments, results may have a different set of access rights and thus may not share the same authentication credential as its parent. For example, a payroll service may allow a different set of users to initiate than to read the payroll service's results (paychecks).

A service method gate may return a child result gate to the client gate as the result of the method. The client may then use the result gate to access the actual results. In one embodiment, the software program (client) receiving the result gate cannot distinguish between the result gate and the result itself in which case the result gate may be an object proxy for the actual result object. The result gate may also be a method gate that supports remote method invocation to result objects. In this manner, a chain of parent and child method/results gates may be created.

In one embodiment, the method gates and remote methods may be in Java. Method results are correctly typed according to the Java typing system. When a Java method is remotely invoked as described above, the result gate may be cast into the Java type that matches the result type. In this embodiment, method gates may be used in the distributed computing environment to allow remote Java objects to behave as local Java objects. The method invocation and result may appear the same to the client Java software program whether the real object is local or remote.

See the Spaces section below for a further discussion on the use of spaces for results.

Message gates may also support publish and subscribe message passing for events. Message gates with event support may be referred to as event gates. A service's XML schema may indicate a set of one or more events that may be published by the service. An event gate may be constructed from the XML schema. The event gate may be configured to recognize some or all of the set of events published by a service, subscribe to those events, and distribute each event as the event is produced by the service.

The set of events for a service may be described in the service's XML message schema. For each event message in the XML schema, the event gate may subscribe itself as a consumer of that event. In one embodiment, an event gate subscribes to all events indicated by the XML schema. Each event message may be named using an XML tag. The event gate may subscribe by sending a subscription message including the XML tag for the event to be subscribed to.

When a corresponding event occurs with the service, the service may send an event message to subscribers indicating the occurrence of the event. The event message may contain an XML event document and may be sent to each subscribed gate. When a subscribed gate receives the event message, the XML event document is removed from the message and the process of distribution begins. Event distribution is the process of handing out the event document within the client platform. Each event consumer within the client platform may subscribe with the event gate for each type of event. On Java platforms, the typing system is Java (converted from the XML event type).

The event consumer may supply an event handler callback method to the event gate. The event gate may store a list of these subscriptions. As each event message arrives at the gate (from the service producing the event), the gate traverses the list of client consumers and calls each handler method, passing the XML event document as a parameter. In one embodiment, the XML event document is the only parameter passed to the handler callback method.

In one embodiment the event gate automatically subscribes itself for events on behalf of the local consumer clients. As clients register interest with the gate, the gate registers interest with the event producer service. A client may also un-subscribe interest, which causes the gate to un-register itself with the service producing the event.

An event gate may type check the event document using the XML schema just like a regular message gate does in the standard request-response message passing style described above. An event gate may also include an authentication credential in messages it sends and verify the authentication credentials of received event messages.

Note that any combination of the gate functionality described above may be supported in a single gate. Each type has been described separately only for clarity. For example, a gate may be a message gate, a method gate and an event gate, and may support flow control and resource monitoring.

Service Discovery Mechanisms

In one embodiment, the distributed computing environment may include a service discovery mechanism that provides methods for clients to find services and to negotiate the rights to use some or all of a service's capabilities. Note that a space is an example of a service. The service discovery mechanism may be secure, and may track and match outgoing client requests with incoming service responses.

A service discovery mechanism may provide various capabilities including, but not limited to:

Finding a service using flexible search criteria.

Requesting an authorization mechanism, for example, an authentication credential, that may convey to the client the right to use the entire set or a subset of the entire set of a service's capabilities.

Requesting a credential, document, or other object that may convey to the client the service's interface. In one embodiment, the service's interface may include interfaces to a requested set of the service's capabilities.

The tracking of discovery responses to the original requests. In one embodiment, each client request may include a collection of data that may also be returned in matching responses, thus allowing the requests and responses to be correlated.

In one embodiment of the distributed computing environment, a service discovery mechanism may provide a flexible search criteria based upon an extensible grammar. In one embodiment, a service name, service type, and other elements, if any, being searched for may be matched with elements in an XML document. In one embodiment, the XML document is the service advertisement for the service. XML may provide a flexible, extensible grammar for searching. XML also may provide type safety for matching elements. In one embodiment, the service names and service types may be type checked with the element types in the XML service advertisement.

In one embodiment, a distributed computing environment may include a mechanism for clients to negotiate service access rights. In one embodiment, the mechanism may be used to negotiate for a subset of a service's full capabilities. The result of the negotiation may be an authorization such as an authentication credential that conveys to the client the right to use the requested subset of the service's capabilities.

In one embodiment, the service discovery mechanism may allow a client to request a security capability credential from a service. In one embodiment, the client may present to the service a set of desired capabilities in the form of a protected (secure) advertisement. The service may then respond with a capability credential that may convey to the client the rights to use the requested capabilities described in the protected advertisement.

In one embodiment, the distributed computing environment may include a mechanism for a client to negotiate service access rights and to then obtain a security credential or document that may be used to present the service's access interface to the set or subset of the service's capabilities that were requested by the client.

In one embodiment, a client that receives a capability credential from a service may generate a custom service access interface document that may be referred to as a "complete advertisement." In one embodiment, the complete advertisement may be an XML document. The generated advertisement may provide access to the service capabilities as granted to the client by the received capability credential. In one embodiment, an interface may be provided by the advertisement only to the service capabilities to which the client has been granted access by the capability credential. In one embodiment, the client may be granted access to only required capabilities and to which the client has access privileges.

In one embodiment, the distributed computing environment may provide a mechanism by which a client may negotiate capabilities with services. In one embodiment, the client may negotiate its capabilities to the service. The service may then customize results based on the parameters negotiated with the client. For example, a client that is capable of one bit display at a resolution of 160×200 may negotiate these parameters to the service, thus allowing the service to customize results for the client.

The following is included as an example of an XML capabilities message and is not intended to be limiting in any way:

<type name="Capabilities">
        <element name="display" type="string"/>
        <element name="memory" type="string"/>
        <element name="mime" type="string"/>
    </type>

The distributed computing environment may include a mechanism that may allow clients to negotiate how a service is to return results of a service invocation. In one embodiment, during a capability credential request, a means by which to choose one of the results return methods may be conveyed to the service. The service may then generate a custom service advertisement that may convey to the client the results mechanism to be used, as well as the service interface.

In one embodiment, the distributed computing environment may include a mechanism for tracking service discovery search requests and responses to the requests. In one embodiment, search request and response messages may include a field that may be used to include a string or an XML document. In one embodiment, the string or XML document included in the field of a request message is also returned in the response message. In one embodiment, the string or XML document is required to be returned in the response message. In one embodiment, the string or XML document may include additional information inserted in or appended to the string or document when returned in the response message. In one embodiment, this mechanism may be used in debugging complex systems. In one embodiment, this mechanism may also provide to clients a method for choosing services to access by using the string or XML document to pass custom search information between a client and service that may only be understood by the client and service.

Matching Component (Service) Interfaces

The distributed computing environment may provide a mechanism for matching a component (for example, a service) specification interface with a requested interface. For example, a client (which may be a service) may desire a service that meets a set of interface requirements. Each component may have a description of the interface to which it conforms. The specification interface matching mechanism may allow a component that best matches a requestor's interface requirements to be located. The specification interface matching mechanism may also allow for "fuzzy" matching of interface requirements. In other words, the mechanism may allow matching without requiring the exact specification of all aspects of the interface, thus providing a nearest match (fuzzy) mechanism. In one embodiment, the specification interface matching mechanism may be implemented as a multi-level, sub-classing model rather than requiring specification at a single interface level.

In one embodiment, a component may use an XML Schema Definition Language (XSDL) to describe its interface. XSDL may provide a human-interpretable language for describing the interface, simplifying activities requiring human intervention such as debugging. In one embodiment, the interface description may be provided as part of an advertisement (for example, a service advertisement) as described elsewhere in this document.

Using the specification interface matching mechanism, a basic desired interface may be compared to a set of component' interface descriptions. One or more components matching the basic desired interface may be identified. The interface descriptions may include subclass descriptions describing more specifically the interfaces provided by the components. In the search process, the class type hierarchy may be examined to determine if a given class is a subclass of the search type. In one embodiment, subclasses may inherit properties of the base class, and thus the subclass-specific information may not be examined in this phase. Thus, the search may be performed generically. The identified components may be searched at the next (subclass) level. The search may become specific to the subclass and may be performed by interpreting the subclass information included in the interface description. The search may continue through one or more subclasses until one or more components is determined which may provide the nearest match to the requestor's desired interface.

In one embodiment, an interface matching mechanism may provide the ability to distinguish among two or more components that implement similar interfaces. In one embodiment, the interface matching mechanism may provide the ability to distinguish among different revisions of the same component.

In one embodiment, a component description may be provided that includes a specification of the interface to which the component conforms. The component description may also include information about the component itself. The interface description and/or the component information may be used to differentiate among different implementations of a given interface. The component descriptions may include a canonical identifier and version information. The version information may allow component revisions to be distinguished. In one embodiment, the component description may be provided as part of an advertisement (for example, a service advertisement) as described elsewhere in this document.

In one embodiment, components may be searched for a particular canonical identifier. Two or more components may be identified with matching canonical identifiers. One or more components may be selected from among the components with matching canonical identifiers. The selection procedure may use an interface specification version, a component implementation specification, a component implementation specification version, other information or a combination of information from the component description to produce a set of one or more components that best match the requestor's requirements.

Spaces

Figure 15:
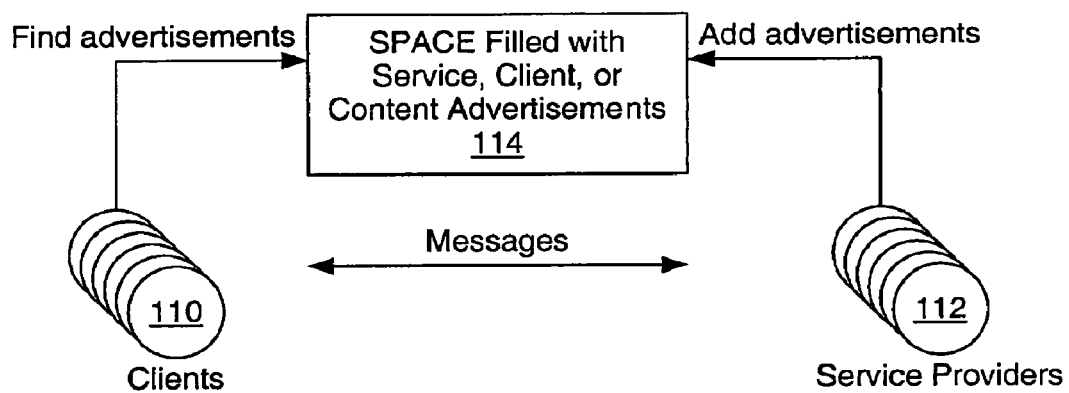
FIG. 15 is an illustration of the use of a space in a distributed computing environment according to one embodiment.

As mentioned above, the distributed computing environment relies on spaces to provide a rendezvous mechanism that brokers services or content to clients. FIG. 15 illustrates the basic use of a space 114. Service providers may advertise services in a space 114. Clients 110 may find the advertisements in a space 114 and use the information from an advertisement to access a service using the XML messaging mechanism of the distributed computing environment. Many spaces may exist, each containing XML advertisements that describe services or content. Thus, a space may be a repository of XML advertisements of services and/or XML data, which may be raw data or advertisements for data, such as results.

A space itself is a service. Like any service, a space has an advertisement, which a client of the space must first obtain in order to be able to run that space service. A space's own advertisement may include an XML schema, a credential or credentials, and a URI which indicate how to access the space. A client may construct a gate from a space service's advertisement in order to access the space. A client of a space may itself be a service provider seeking to advertise in that space or modify an existing advertisement. Or a client of a space may be an application seeking to access a service or content listed by the space. Thus, spaces may provide catalysts for the interaction between clients and services in the distributed computing environment.

A space may be a collection of named advertisements. In one embodiment, naming an advertisement is the process of associating a name string with an advertisement. The association may take place upon storing an advertisement in a space. Removing an advertisement from a space disassociates the name from the advertisement. A space may be created with a single root advertisement that describes the space itself. Additional advertisements may be added to a space. An advertisement's name may locate the advertisement within the space, including specifying any necessary graphing information such as a hierarchy of names. In a preferred embodiment, the structure of a space is not dictated by the distributed computing environment. That is, spaces may be structured as, for example, a flat un-related set of advertisements or a graph of related advertisements (e.g. commercial database). Since, in a preferred embodiment, the distributed computing environment does not dictate how a space actually stores its content, spaces may be supported by small to large devices. For example, a simple space may be tailored to fit on small devices, such as PDAs. More advanced spaces may be implemented on large severs employing large commercial databases.

As mentioned above, a space may contain advertisements for services in the distributed computing environment. An advertisement may provide a mechanism for addressing and accessing services and/or content within the distributed computing environment. An advertisement may specify a URI for a service. In some embodiments, the URI may allow for the service to be accessible over the Internet. An advertisement may also include an XML schema for the service. The XML schema may specify a set of messages that clients of the service may send to the service to invoke functionality of the service. The XML schema may define the client-service interface. Together, the URI and the XML specified in an advertisement may indicate how to address and access the service. Both the URI and schema may be provided in XML as an advertisement in a space. Thus, a mechanism for addressing and accessing a service in a distributed computing environment may be published as an advertisement in a space. Clients may discover a space and then lookup individual advertisement for services or content.

Figure 16:
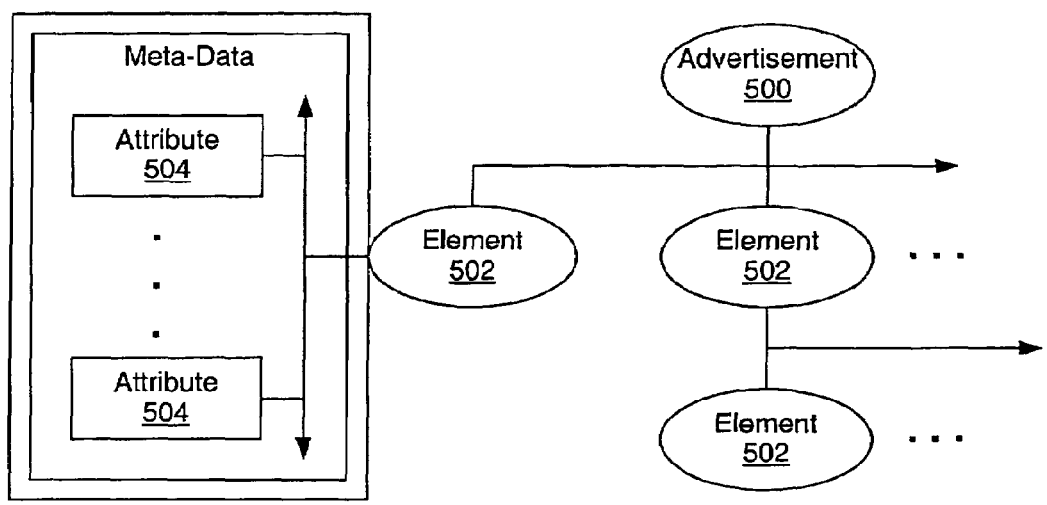
FIG. 16 illustrates advertisement structure according to one embodiment.

FIG. 16 illustrates advertisement structure according to one embodiment. An advertisement 500, like other XML documents, may include a series of hierarchically arranged elements 502. Each element 502 may include its data or additional elements. An element may also have attributes 504. Attributes may be name-value string pairs. Attributes may store meta-data, which may facilitate describing the data within the element.

In some embodiments, an advertisement may exist in different distinct states. One such state may be a drafted state. In one embodiment, advertisements may initially be constructed in a drafted state that exists outside the bounds of a space. The creator of an advertisement may construct it in a variety of ways, including using an XML editor. Access to elements and attributes in the drafted state may be at the raw data and meta-data levels using any suitable means. Typically, events are not produced for changes made to advertisements in the drafted state. Therefore, the creator of the advertisement may be free to add, change, or delete elements as well as to achieve the desired attribute set, and then publish the advertisement for the rest of the distributed computing environment to see.

In one embodiment, another possible state for advertisements is a published state. Advertisements may move to the published state when inserted into a space. Once the advertisement is in a space, interested clients, and services may locate it, e.g. using its name and/or its elements as search criteria. For example, search criteria may be specified as an XML template document that may be compared (e.g. by the space service) with the advertisements in the space. Published advertisements may represent "on-line" services ready for clients to use. The message address (URI) of the service may be stored as an element in the advertisement. Advertisements that are removed from the space may transition back to the drafted state where they may be discarded or held. Removal may generate an event so interested listeners may be made aware of the change. Message gates are typically created from published advertisements.

In one embodiment, yet another possible state for advertisements is a persistent archived state. An archival procedure may turn a live published advertisement into a stream of bytes that may be persistently stored for later reconstruction. Archived advertisements may be sent (e.g. in their raw XML form) from the space to an archival service. The URI for an advertisement's archival service may be stored as an element in the advertisement. XML may provide a format for storing and retrieving advertisements and representing the state of advertisement elements sufficient to reconstruct the advertisement object(s). Advertisements may be stored in other formats as well, depending on archival service implementation. The process of making a published advertisement persistent may prepare the advertisement for the persistent archived state. Persistent advertisements may be stored (e.g. by an archival service) for future use in a persistent storage location such as a file or a database. A space through the archival procedure may enable advertisements to be stored, however the space does not necessarily play a role in how persisted advertisement entries are actually stored. How persisted advertisements are stored may be determined by the advertisement's archival service. Typically, no events are generated on behalf of archived advertisements. Also, changes may not be allowed for advertisements in the persistent archived state.

Advertisements may be archived and removed or just archived. If an advertisement is archived without removing it from the space, the space will store a shadow version of the advertisement. Access to an archived service may cause the advertisement to "fault-in" from its persistent backing store on demand. This feature may allow advertisements to be filled, from LDAP (Lightweight Directory Access Protocol) entries for example, on demand.

Figure 17:
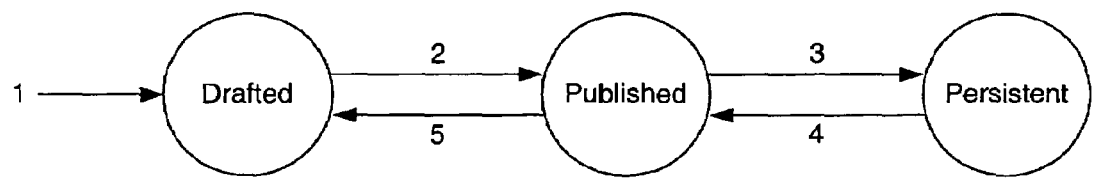
FIG. 17 illustrates one example of advertisement state transitions that an advertisement may undergo during its lifetime according to one embodiment.

FIG. 17 illustrates one example of advertisement state transitions that an advertisement may undergo during its lifetime. First, an advertisement may be constructed, as indicated at 1. During construction, the advertisement is in the drafted state. Then, the advertisement may be inserted in a space, as indicted at 2. The advertisement may be inserted as a published parent. The advertisement is in the published state after being inserted in a space. An event (e.g. AdvInsertEvent) may be generated when the advertisement is inserted in the space. Events are more fully discussed below. The advertisement may be archived and made persistent, as indicated at 3, which may transition the advertisement to the persistent archived state. An advertisement may also be published from the persistent archive state, as indicated at 4. An advertisement may be removed from a space and transition back to the drafted state, as indicated at 5. An event (e.g. AdvRemoveEvent) may be generated when the advertisement is removed.

In one embodiment, the archived, persistent state is not used. In this embodiment, state changes 3 and 4 also are not used. In this embodiment, an advertisement is either in the drafted state or in the published state.

Advertisements stored in a space may have the following standardized elements and/or attributes: version (may be an element), creation date (may be an attribute), modification date (may be an attribute), implementation service URI (may be an element), and/or persistence archival service URI (may be an element).

A space itself is typically a service. A space service may provide the ability to search for advertisements in the space, which may include searching the space by type of advertisements. A space service may also provide facilities to read advertisements, write (publish) advertisements, and take (remove) advertisements. A space may also provide the ability to subscribe for space event notification messages. Some spaces may provide extended facilities, such as facilities to navigate space relationship graph by position; read, write or take advertisement elements; read, write or take advertisement attributes; and subscribe for advertisement event notification messages. Space facilities are described in more detail below. A space's capabilities are embodied in a space advertisement's message schema. From the message schema, space address, and authentication credential, a client message gate may be created to access the space and its facilities.

Spaces and all advertisements within a space may be addressed using URIs. In one embodiment, space and advertisement names may follow URL naming conventions. The use of URIs, e.g. URLs, for addressing spaces may allow spaces to be addressable throughout the Internet, in some embodiments.

The space message recipient (a space service) may be specified using a URI which may have been received in a service advertisement for the space. The URI may include a protocol, host, port number, and name. The protocol may name the protocol that may be used to move messages between clients and the space (reliable or un-reliable sockets, for example). The host and port number may be protocol dependent IDs. The name may be the space name followed by advertisement, element and/or attribute name. In one embodiment, a pathname may be used to identify an advertisement in a space. Pathnames may be either absolute or relative. Absolute pathnames name the space as well as an advertisement. Relative pathnames are relative a designated advertisement within an assumed space. In one embodiment, the syntax rules governing the construction of pathnames is that of the URI (Uniform Resource Identifier). In that embodiment, advertisement and space names therefore may not contain any URI reserved characters or sequences of characters. Pathnames to elements and attributes may also be specified using a URI. In general, element and attribute names may be appended to the pathname of an advertisement, such as:
   http://java.sun.com/spacename/advertisement/element/attribute.

In one embodiment, the distributed computing environment may include a mechanism that allows a client to discover the URI of a space but restricts access to the service advertisement for the space. In one embodiment, rather than returning the full advertisement to the space, the URI of the space and the URI of an authentication service for the space may be returned. In order for the client to access the documents or services advertised in the space, the client first may authenticate itself to the authentication service at the URI provided in the return message. The authentication service may then return an authentication credential that may allow the client partial or full access to the space. When the client receives the authentication credential, the client may attempt to connect to the space to access the documents or service advertisements in the space.

The distributed computing environment may provide a mechanism or mechanisms that may enable a client to connect to a space. Embodiments of a connection mechanism may provide for client-space addressing, client authorization, security, leasing, client capabilities determination, and client-space connection management. A client-space connection may be referred to as a session. In one embodiment, a session may be assigned a unique session identification number (session ID). The session ID may uniquely identify a client-space connection. In one embodiment, a session lease mechanism may be used to transparently garbage collect the session if the client does not renew the lease.

The following is an example of using such a connection mechanism according to one embodiment. A client may obtain an authentication credential. In one embodiment, the space may provide an authentication service in response to a client's request for access to the space. The client may obtain the authentication credential through the authentication service. When the client receives the authentication credential, the client may initiate a connection to the space by sending a connection request message. In one embodiment, the connection request message may include the URI address of the space service, the authentication credential for the client and information about the connection lease the client is requesting. After the space receives the connection request message, the space may validate the message. In one embodiment, an XML schema may be used to validate the message. The client may then be authenticated using the authentication credential. In one embodiment, the information received in the connection request message may be used to determine the capabilities of the client to use the space. In one embodiment, each client of a space may be assigned its own set of capabilities for using the space. In one embodiment, an access control list (ACL) that may include capability information about one or more clients of the space may be used in client capabilities determination. In one embodiment, the information received in the connection request message may be used to look up the client's capabilities in the ACL.

After authenticating the client and determining the client's capabilities, the connection lease to grant the client may be determined. After the lease is determined, the structure for maintaining the client-space connection may be generated. A session ID for the connection may be generated. In one embodiment, each client-space connection may be assigned a unique session ID. In one embodiment, an activation space may be created and assigned to, or alternatively a pre-existing activation space may be assigned to, the client-space session. In one embodiment, an activation space may be used to store results of services for the client when using the space. In one embodiment, a client's capabilities may be used to determine if an activation space is to be created for the client. For example, a client may not have capabilities to access an activation space to store and retrieve results. A message or messages may be sent to the client informing the client that the connection has been established. The message or messages may include the session ID and information about the lease. The client may then use the space including, but not limited to: advertisement lookup, advertisement registering, and advertisement retrieval. In one embodiment, he connection may remain open until the allocated lease expires or until the client sends a message requesting lease cancellation to the space. In one embodiment, the client may be responsible for renewing the lease before the lease expires. If the lease expires before the client renews the lease, the connection may be dropped, causing the client to lose the connection to the space. In one embodiment, to reconnect, the client may be required to repeat the connection procedure.

Figure 18:
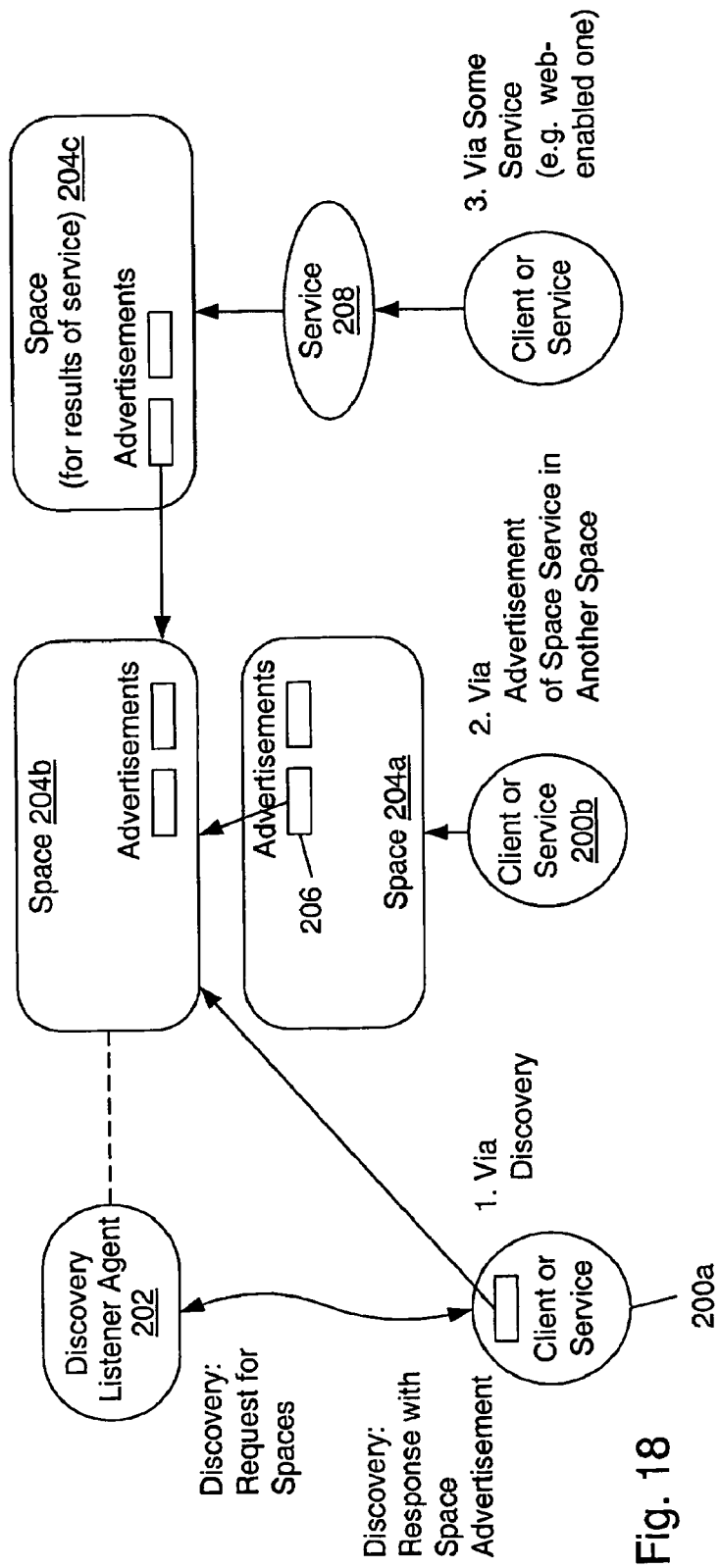
FIG. 18 is an illustration various space location mechanisms in a distributed computing environment according to one embodiment.

In one embodiment, a client of a space may obtain a space's advertisement several different ways. Some of the ways a client may obtain a space's advertisement are illustrated in FIG. 18. For example, a space discovery protocol may be provided as part of the distributed computing environment. Space discovery is a protocol a client or service may use to find a space. A listener agent 202 may be configured associated with one or more spaces to listen for discovery requests. The discovery listener agent 202 may listen on various network interfaces, and may receive either broadcast requests or unicast requests (at the URI of the agent) from clients 200a looking for a space(s). The listener agent 202 then responds with the service advertisement(s) or URIs for the service advertisements of the requested space(s). In one embodiment, the listener agent is, in general, separate from the space, because its functionality is orthogonal to the functionality of a space service. However, the listener agent may be implemented on the same device or a different device as a space service.

In one embodiment, the discovery protocol may be a service advertised in a default space. A client may instantiate the discovery protocol from the client's default space in order to discover additional spaces. The discovery protocol may be pre-registered with a client's default space. Alternatively, the discovery protocol may register itself with the default space by placing an advertisement in that space, e.g., when a client connects to a local network serviced by the discovery service.

In one embodiment, the space discovery protocol may be mapped to underlying device discovery protocols for other platforms, such as SLP, Jini, UPnP, etc. Thus, a client may use the discovery protocol of the distributed computing environment to find services in other environments. A bridge to these other environments may be provided and advertisements provided services in these other environments so that they may be accessed by clients of the distributed computing environment described herein. Refer to the Bridging section.

For each advertised discovery protocol, the distributed computing environment may create a subsequent results space to hold the results of the discovery protocol. In one embodiment, space services in the distributed computing environment may use the Multicast Announcement Protocol (multicast UDP) to announce themselves on a LAN. This information may be recorded by a listener agent. A device (either a client or service) may use the Multicast Request Protocol (multicast UDP) to initiate discovery of a space manager. In one embodiment, the space managers respond with information indicating the URI of their respective spaces. Alternatively, a listener agent may respond for multiple spaces. The discovery response may also include a short string that labels the each space (e.g. obtained from keywords of the space), and information that can be used to set up a TCP connection, for example, with each space manager to perform operations on the respective space. Since the requesting device may receive responses from more than one space manager (or multiple space listings from a listener agent), this information may help the client select which space it wishes to connect to.

In addition to the multicast discovery described above, the discovery service may also perform discovery using unicast messaging (e.g. over TCP) that can be used to discover a space manager at a known address on the network (e.g. the Internet, other WAN, LAN, etc). The unicast discovery message may include a request for a space service at a known URI to provide its service advertisement. The multicast and unicast discovery protocols are defined at the message level, and thus may be used regardless of whether the devices participating in the discovery support Java or any other particular language.

The discovery protocol may facilitate the proliferation of clients independently of the proliferation of server content that supports those clients within the distributed computing environment. For example, a mobile client may have its initial default space built into its local platform. In addition to local services advertised in the default space, the mobile client may have services that search for additional spaces, such as a service to access the discovery protocol or a service to access space search engines.

In one embodiment, the distributed computing environment space discovery protocol may define a set of XML messages and their responses that may allow clients to:

Broadcast protocol-defined space discovery messages on their network interfaces.

Receive from listeners XML messages describing candidate spaces that those listeners represent.

Select one of those discovered spaces as default, without the client needing to know the address of the selected space.

Obtain information on the selected space, such as its address, so the client may later find that same space via means outside of the discovery protocol (useful if later the client wants to access a space which is no longer local, but which still is of interest to the client).

In some embodiments, the multicast and unicast discovery protocols may require an IP network. Although these discovery protocols meet the needs of devices that are IP network capable, there are many devices that may not be directly supported by these discovery protocols. To meet the needs of such devices in discovering spaces in the distributed computing environment, a pre-discovery protocol may used to find an IP network capable agent. The pre-discovery protocol may include the device sending a message on a non-IP network interface requesting a network agent. The network agent may set up a connection between itself and the device. Once the connection between device and agent is set up, the agent participates in the discovery protocol on IP networks on behalf of the device for which it serves as agent. The network agent may also provide an interface for the device to the distributed computing environment in general. For example, gates may be constructed in the agent on behalf of the device for running services advertised in discovered spaces. See the Bridging section.

Figure 19:
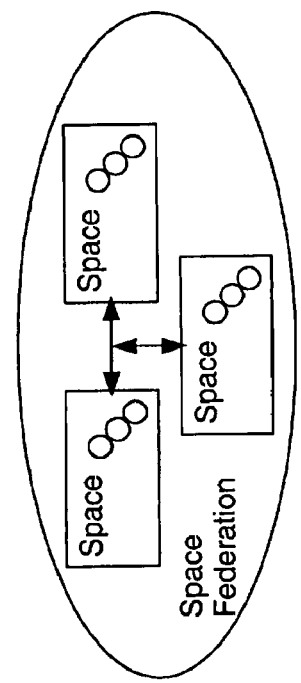
FIG. 19 is an illustration of space federations in a distributed computing environment according to one embodiment.

Another way that clients may locate spaces in the distributed computing environment is by advertisement of a space in another space. A space is a service, so like any other service, it can be advertised in another space. As shown in FIG. 18, a client 200b may find an advertisement 206 in a first space 204a for a second space 204b. Space 204b may in turn include advertisements to additional spaces. Because a service (implementing a space) may also act as a client, spaces may exchange advertisements or chain together to provide a federation of spaces, as illustrated in FIG. 19. Any number of spaces may be included in the distributed computing environment. The number and topology of spaces may be implementation dependent. For example, spaces implemented on an IP network might each correspond to a different subnet.

A third way a client may locate a space is through running a service 208, as shown in FIG. 18. A service 208 may be run which returns as its results the service advertisements of space services. Since service advertisements are XML documents and since the distributed computing environment may include the Internet, service 208 may be a Web-based search tool. An example of such a service is the space look-up service described in conjunction with FIG. 4. In one embodiment, spaces within the distributed computing environment may be implemented as Web pages. Each Web page space may include a keyword that may be searched upon to identify the Web page as a space in the distributed computing environment. The space may include other searchable keywords as well to further define the space. A client may connect to a search service 208 and supply keywords to the search service in the form of XML messages. The search service may receive the keywords from the client and feed the keywords to an Internet search engine, which may be a conventional or third-party search engine. The search service may return the results from the Internet search engine to the client, either directly as XML messages or by reference to a results space. The results may be the URIs of spaces matching the search request. Alternatively, the search service may contact spaces identified by the search, obtain the service advertisement for each such space, and return the space service advertisements to the client, either directly as XML messages or by reference to a results space. The client may then select a space from the search results and construct a gate (by itself or through a proxy) to access the selected space. Once the selected space is accessed, the client may look up service advertisements within that space, which may lead to additional spaces.

As described above, a space may be an XML-based Website, and as such may be searched via Internet Web search mechanisms. A space may include Internet searchable keywords. Some devices, such as small client devices, may not support an internet browser. However, such devices may still perform Internet searches for spaces within the distributed computing environment. A device may have a program that accepts strings of keywords, which may be sent to a proxy program on a server (e.g. a search service). The proxy may send the strings to a browser-based search facility (e.g. an internet search facility) to perform the search. The proxy may receive the output of the search and parse it into strings (e.g. XML strings) representing each URI for the search results and send the response strings back to the client. Thus, a client may locate spaces through the Internet without having to support a program such as a Web browser. More capable devices may avoid the use of a proxy and initiate an Internet-based search service directly.

In some embodiments, a search service may limit or filter spaces that may be found through the search service, or constrain clients to searching only a few supported spaces within the distributed computing environment. The extent of searching permitted may be determined according to the client authentication.

A fourth way a client may locate a space is by obtaining or receiving information about a newly created empty space or a spawned space when an existing space is spawned. An existing space may include an interface for spawning an empty space with the same functionality (e.g. same XML schema) as the space from which it is spawned. Spawning of spaces is further described below.

Figure 20:
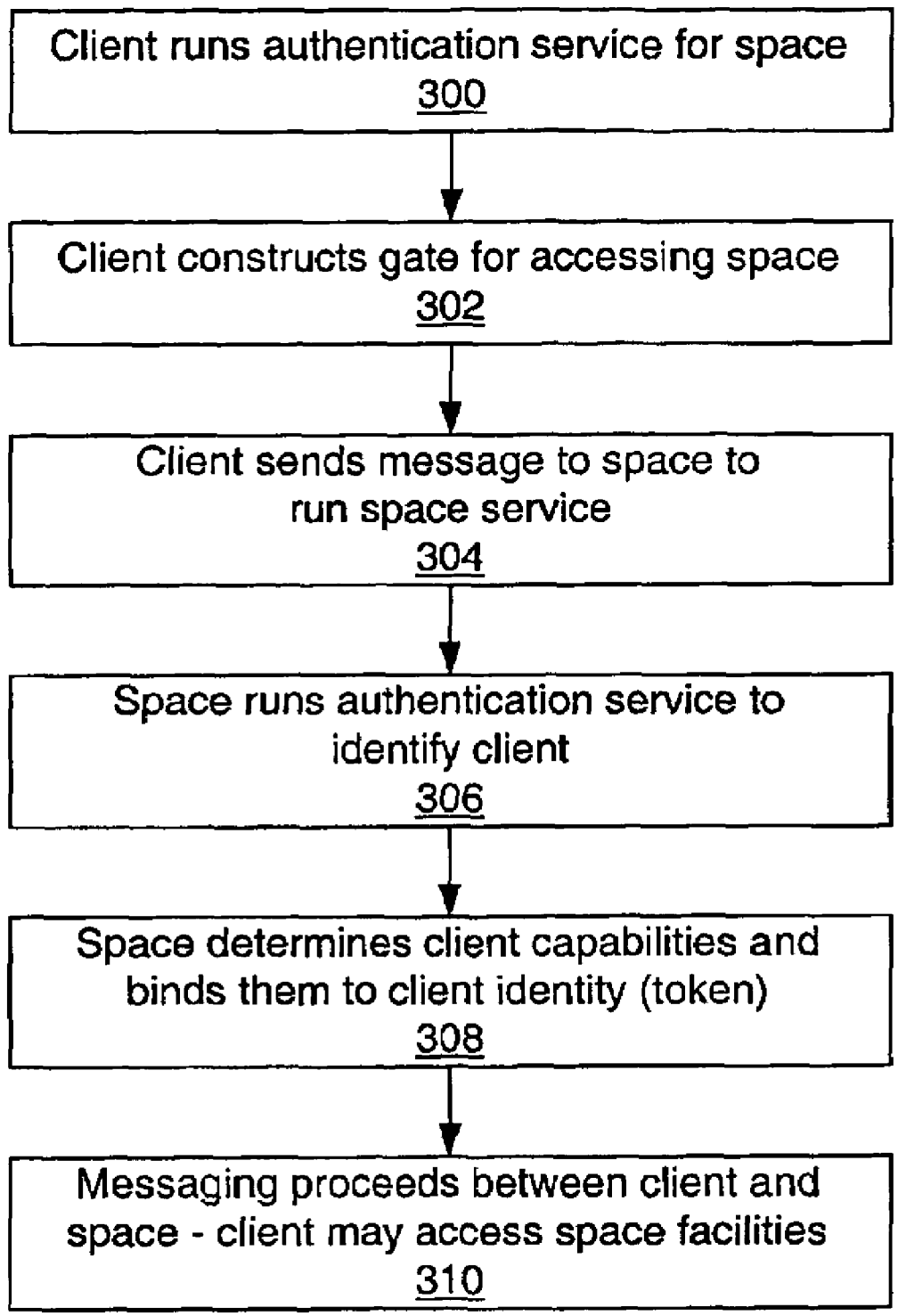
FIG. 20 is a flow diagram illustrating client formation of a session with a space service in a distributed computing environment according to one embodiment.

Once a client of a space finds the advertisement of a space service, that client of the space may run the space service, as it would any other service. Note that the client of the space service may be another service (e.g. a service seeking to advertise in the space). In one embodiment, as illustrated in FIG. 20, to run a space service, the client of the space may first run an authentication service for the space to obtain an authentication credential, as indicated at 300. The authentication service may be specified in the service advertisement of the space service. The client of the space uses the authentication credential, the XML schema of the space (from space's service advertisement), and the URI of the space (from space's service advertisement) to construct a gate for the space, as indicated at 302. The client of the space may then run the space service by using the gate to send messages to the space service. A first such message is indicated at 304.

For embodiments employing authentication, when the space service receives the first message from the client, with the authentication credential embedded, the space service uses the same authentication service (specified in the service advertisement of the space service) to authenticate the client, thus establishing its identity, as indicated at 306. The space service may determine the client's capabilities and bind them to the authentication credential, as indicated at 308.

As indicated at 310, a client of a space may run various space facilities by sending messages to the space service. In one embodiment, when a client of a space sends a request to the space service, it passes its authentication credential in that request, so the space service can check the request against the client's specific capabilities.

Each space is typically a service and may have an XML schema defining the core functionality of the space service. The XML schema may specify the client interface to the space service. In one embodiment, all space services may provide a base-level of space-related messages. The base-level space functionality may be the basic space functionality that is capable of being used by most clients, including small devices such as PDAs. It may be desirable to provide for additional functionality, e.g. for more advanced clients. Extensions to the base-level space may be accomplished by adding more messages to the XML schema that advertises the space. For example, in one embodiment, the base-level messages do not impose any relationship graph upon the advertisements. Messages, for example, to traverse a hierarchy of advertisements may be a space extension. Providing such additional functionality may be done by providing one or more extended XML space schemas or schema extensions for a space. The extended schemas may include the base schema so that clients of an extended space may still access the space as a base space.

In one embodiment, a base space service may provide a transient repository of XML documents (e.g. advertisements of services, results of running services). However, a base space service in one embodiment may not provide for advanced facilities to support persistence of space content, navigation or creation of space structure (e.g. hierarchy), and a transactional model. A mechanism for supporting persistence, hierarchy, and/or transactions is by extending the XML schema. Since extended spaces still include the base XML schema, clients may still treat extended spaces as base spaces, when just the base space functionality is all that is need or all that can be supported.

In one embodiment, the base space may be transient. The base space may be acceptable for many purposes. Service providers may register their services in various spaces. In one embodiment, services must continuously renew leases on the publishing of information in the spaces. By this nature, the services advertisements may be transient in that they may often be rebuilt and/or reconfirmed. However, it may be desirable to provide for some persistence in a space. For example, a space that has results may provide some persistence for users that want to be sure that results are not lost for some time. In one embodiment, persistence may be provided for by specifying a space interface where the client may control which objects in the space are backed by a persistent store and manage the maintenance of that persistence store. The persistence interface may be specified with extended XML schema for the space defining the interfaces for persistence.

In one embodiment, a base space may provide an interface where an XML document may be added to a space and identified by a string. The base space may not provide any hierarchy for the various so named XML documents in the space. In embodiments where hierarchy support is desired, additional interfaces may be defined (extending the XML schema) where a hierarchy can be specified by the user. Other interfaces may be specified to navigate the hierarchy or navigate a relationship graph by position. However, other users may still use the base space interfaces to access those same documents, without any hierarchy. Interfaces for other space structure may be provided for as well in extended space schemas.

Extended XML space interfaces may also be provided for space transaction models. For example, an extended space XML schema may be provided specifying an interface for ACID transactions. ACID is an acronym used to describe four properties of an enterprise-level transaction. ACID stands for Atomicity, Consistency, Isolation, and Durability. Atomicity means that a transaction should be done or undone completely. In the event of a failure, all operations and procedures should be undone, and all data should rollback to its previous state. Consistency means that a transaction should transform a system from one consistent state to another consistent state. Isolation means that each transaction should happen independently of other transactions occurring at the same time. Durability means that completed transactions should remain permanent, e.g. even during system failure. Other transaction models may also be specified in extended space schemas.

Extended space schemas may be XML documents that specify the message interface (e.g. XML messages) for using extended space features, functionality or facilities. A space may have a base schema and multiple extended schema. This may facilitate provided different levels of service to different clients depending upon the client authentication.

Besides extensions for space persistence, structure, and transactions, other space extensions may also be specified as desired. For example, extensions may be provided to manipulate advertisements at the element or attribute level: read, write or take advertisement elements; read, write or take advertisement attributes; and subscribe for advertisement event notification messages. A space may provide virtually any number of facilities and arrange them in base and extended schemas as desired. In one embodiment, all base spaces must provide for advertisement reading, writing, taking, and lookup facilities, and space event subscriptions.

Various space facilities may be provided. In some embodiments, a facility may be provided for the establishment of a session with the space. In one such embodiment, the rest of the space functionality is not available until this is done. In other embodiments, the notion of a session is not provided for, or is optional and/or implementation dependent.

Another space facility may be to add or remove a service advertisement to or from the space. A space facility may also be provided for adding or removing an XML document (not an advertisement, but perhaps a result in a space). The space service may check for uniqueness of an item before allowing the addition of the item. For example, each item added to the space may be associated with a user-specified string that identifies the item and that may be used to check for the uniqueness of the item.

In one embodiment, a client may request a listing, tree, or other representation of all services advertised in the space. The user may then scroll or maneuver through the advertisements and select the desired service. A space may also provide a look-up facility that allows a client to search for a service by providing keywords or string names. In one embodiment, a space facility may provide a mechanism to look up a space entry that has been added to the space. The look up facility may search by string to match for name, or wildcard, or even database query. The look up facility may return multiple entries from which the client may select one or perform a further narrowing search. In one embodiment, the look-up facility may provide a mechanism to locate a service advertisement matching a particular XML schema. The client may indicate a particular XML schema, or part of a particular XML, to be searched for within the space. Thus, a service may be searched for within a space according to its interface functionality.

Another space facility that may be provided in the distributed computing environment is a mechanism that allows services and clients to find transient documents based upon a typing model such as XML. The mechanism may be a general-purpose, typed document lookup mechanism. In one embodiment, the lookup mechanism may be based upon XML. The lookup mechanism may allow clients and services to find documents in general, including services through service advertisements.

In one embodiment, a space lookup and response message pair may be used to allow clients and services to find XML documents stored within a network transient document store (space). The space may be a document space used to store a variety of documents. In one embodiment, the documents are XML documents or non-XML documents encapsulated in XML. Spaces are further described elsewhere herein. The lookup messages may work on any kind of XML document stored in the space, including service advertisements and device driver advertisements. In one embodiment, a client (which may be another service) may use a discovery mechanism as described elsewhere to find one or more document spaces. Then, the client may use space lookup messages to locate documents stored in the space.

The distributed computing environment may include a mechanism that allows services and clients to subscribe to and receive events about the publication of XML documents. Events may include the publication of and removal of XML documents to and from a transient XML document repository such as a space. In one embodiment, an event may be an XML document that refers to another XML document.

In one embodiment, a space event subscription and response message pair may be used to allow clients and services to subscribe for events regarding documents that are added to or removed from a space. In one embodiment, an event subscription may be leased using the leasing mechanisms described elsewhere herein. In one embodiment, a subscription may be cancelled when the lease is cancelled or expires. In one embodiment, a subscription may be renewed by renewing the lease to the subscription.

In one embodiment, an event subscription message may include an XML schema that may be used as a document matching mechanism. Documents that match the schema may be covered by the subscription. In one embodiment, any document added to a space and that matches the XML schema may generate a space event message.

A space facility may also be provided to which a client may register (or unregister) to obtain notification when something is added to or removed from the space. A space may contain transient content, reflecting services that at added and removed from the space. A mechanism may be provided to notify a client when a service becomes available or becomes unavailable, for example. A client may register with an event service to obtain such notification. In one embodiment, a client may register to be notified when a service having a name matching a specified string or a schema matching a specified schema (or schema portion) is added or deleted from the space. Thus, a query to register with the space event notification facility may be the same as or similar to that of the service look up facility described above.

When a client of a space subscribes to be notified when an XML document(s) (e.g. service advertisement) is added or removed from the space, the client may obtain a lease on this subscription to notifications. The lease may allow the space service to know whether to continue sending notifications to a particular client. For example, a lease to the notification facility may expire after an amount of time if not renewed. Note that a lease may not be required while a client has established an active session with a space. Once, a client has discontinued an active session with a space, it may continue to receive event notifications according to its event subscriptions as long as its corresponding leases remain active. Refer to the Leases section below.

A client may subscribe to different types of events. Examples are a service advertisement being added or removed from a space, as described above. A client may also be notified when results from a service initiated by the client (or by someone else) are put in a space. For example, the client and the service may mutually select a name for referring to the results of the service. The client may register with the space service to which the results are to be posted or advertised to receive an event when a result referenced by the selected name is added to the space.

A space may generate different types of events to which a client may subscribe. As the composition of a space changes, events may be produced to those clients and services that have subscribed for such events. In one embodiment, there may be two major space event categories, those that pertain to the space (insertion and removal of advertisements), and those used that indicate changes to an advertisement (adding, removing, changing an element or attribute). Which events are supported may be indicated in the XML message schema for the space.

The following events are examples of events that may be produced by a space service to indicate an space or advertisement event:

TABLE 1

Space Events

| Event Name | Type | Meaning |
| --- | --- | --- |
| Advertisement Insertion Event | AdvInsertEvent | New advertisement has been inserted into a space |
| Advertisement Removal Event | AdvRemoveEvent | Existing advertisement has been removed from a space |
| Advertisement Element Insertion Event | AdvElementInsertEvent | A new element has been added to an advertisement |
| Advertisement Element Removal Event | AdvElementRemoveEvent | Existing element has been removed from an advertisement |
| Advertisement Element Change Event | AdvElementChangeEvent | Existing element has been changed in an advertisement |
| Advertisement Element Attribute Insertion Event | AdvElementAttributeInsertEvent | A new attribute has been added to an element |
| Advertisement Element Attribute Removal Event | AdvElementAttributeRemoveEvent | Existing attribute has been removed from an element |
| Advertisement Element Attribute Change Event | AdvElementAttributeChangeEvent | Existing attribute has been changed in an element |

Events may be typed. In some embodiments, the event facilities supported by spaces may allow for event listeners to take advantage of, e.g., Java class (or XML types) hierarchies. For example, by listening for AdvElementEvent, the listener will receive events of type AdvElementEvent and all of its sub-classes (XML types). Thus, for this example all events pertaining to element changes (though not advertisement insertion and removal) are received.

By way of further example, subscribing to or listening for a top-level event class or type, e.g. SpaceEvent, will result in the reception of all space events. Event class types may be distinguished via, for example, the Java instanceof operator or the XML typing system.

An event may include a URI to the affected advertisement or element. For example, AdvertisementEvent and all its sub-classes may contain a reference (e.g. URI or URL) to the affected advertisement. AdvElementEvent and its subclasses may be examined for the name of the affected element. The previous element value (URI or URL), may be available, for example, from AdvElementRemoveEvent and AdvElementValueChangeEvent.

Figure 21:
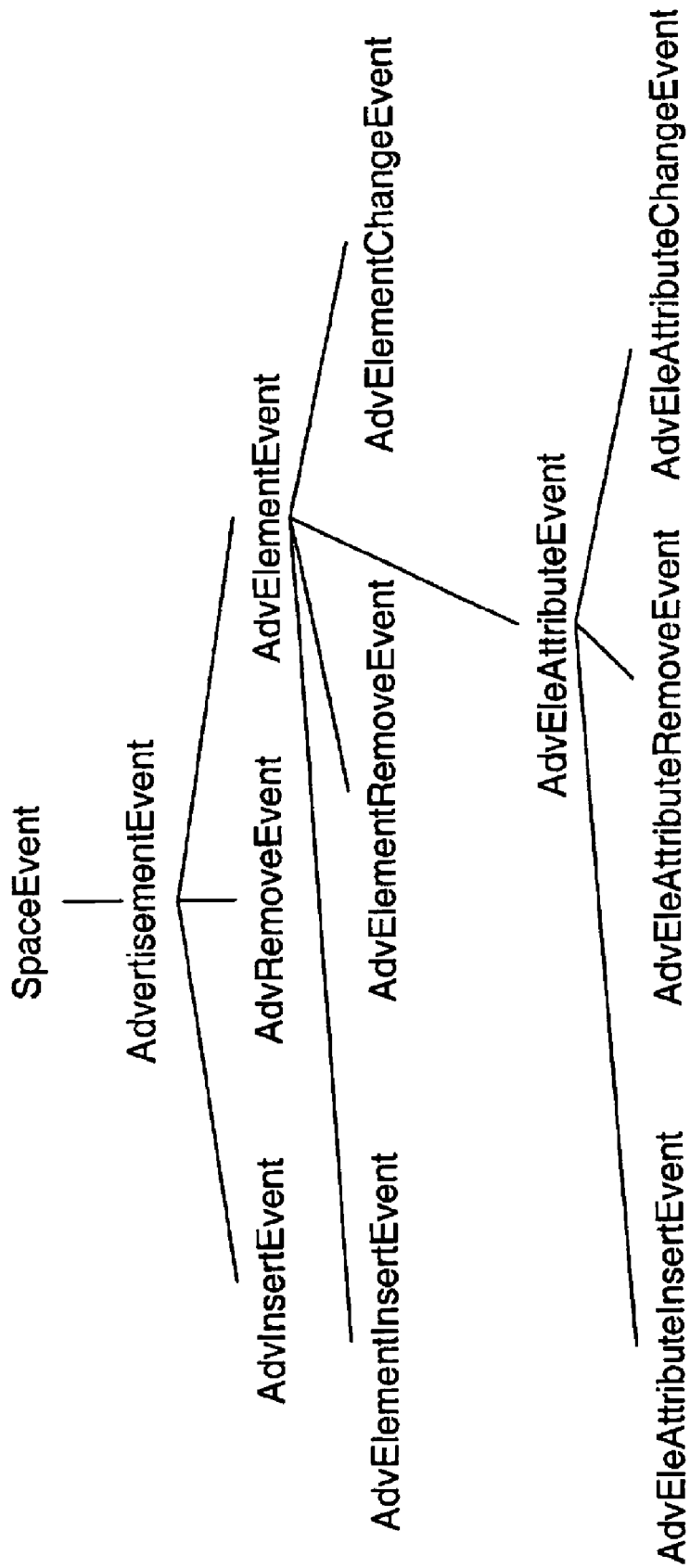
FIG. 21 is an illustration of a space event type hierarchy for one embodiment.

A space event type hierarchy for one embodiment is illustrated in FIG. 21. Types may be defined in XML and usable in Java or any other suitable object-oriented language such as C++.

Figure 22:
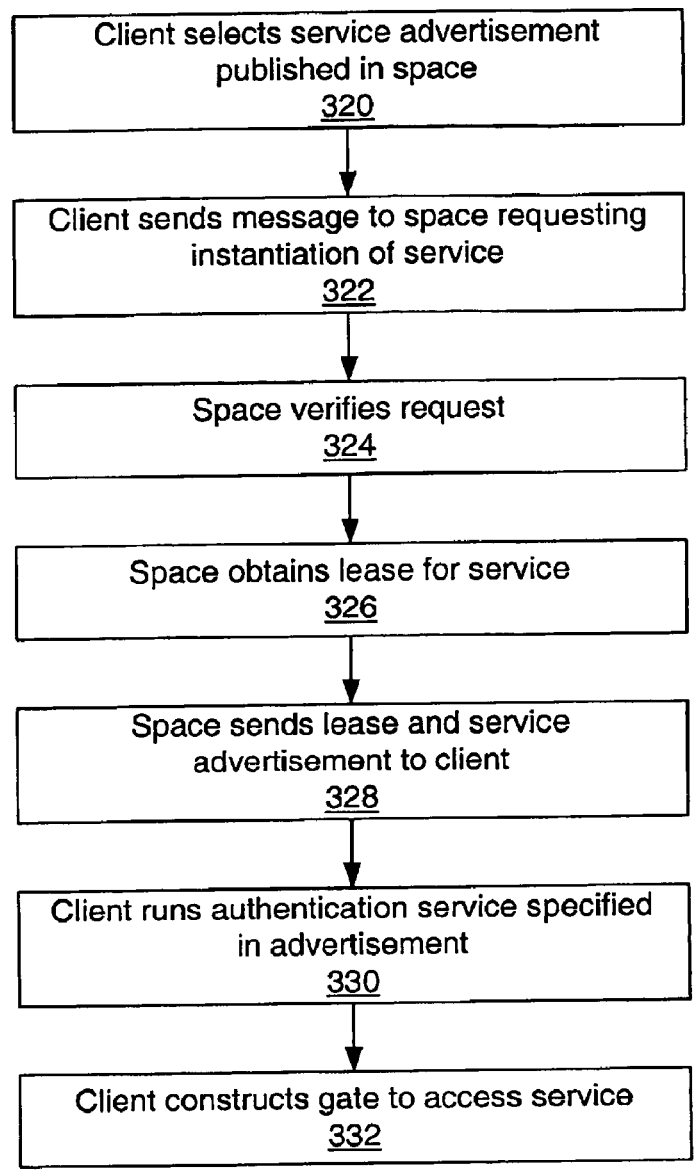
FIG. 22 is a flow diagram illustrating service instantiation in a distributed computing environment according to one embodiment.

A space may provide a facility for a client to instantiate a service advertised in the space. Service instantiation is the initialization done that allows a client to be able to run a service. On embodiment of service instantiation is illustrated in FIG. 22. To instantiate a service, a client may first select one of the service advertisements published in the space, as indicated at 320. The client may use the various facilities, such as the look up facility, provided by the space to look up the various advertisements in the space. Then the client may request the space to instantiate the service, as indicated at 322.

In one embodiment, service instantiation may include the following actions. After the client requests the space service to instantiate the selected service, as indicated at 322, the space service may then verify the client is allowed to instantiate the requested service, as indicated at 324. The space service may perform this verification by examining an authentication credential included in the clients message. The authentication credential is the credential the client received when it established a session with the space service. The space service may verify if the client is allowed to instantiate the requested service according to the client's authentication credential and capabilities indicated for that client. See the Authentication and Security section herein.

Assuming the client is authorized, the space service may also obtain a lease on the service advertisement for the client with the lease request time specified by the client, as indicated at 326. Leases are further discussed below. The space service may then send a message to the client which includes the allocated lease and the service advertisement of the service, as indicated at 328. In one embodiment, the client may run an authentication service specified in the service advertisement and obtain an authentication credential, as indicated at 330. See the Authentication and Security section herein for more information on an authentication service. Next, as indicated at 332, the client may construct a gate for the service (for example, using the authentication credential and the XML schema and service URI from the advertisement). Refer to the Gates section herein. The above described communication between the client and space service is performed using the XML messaging of the distributed computing environment. The client may then run the service using the constructed gate and XML messaging. The service may similarly construct a service gate for XML message communication with the client.

To summarize, an example use of a space is discussed as follows. A client may access (e.g., connect to) a space service. (A service may act as a client for the purpose of accessing or otherwise using a space.) The space service may store one or more service advertisements and/or other content in a space, and each of the service advertisements may include information which is usable to access and execute a corresponding service. The space service may include a schema which specifies one or more messages usable to invoke functions of the space service. For example, the schema may specify methods for reading advertisements from the space and publishing advertisements in the space. The schema and service advertisements may be expressed in an object representation language such as eXtensible Markup Language (XML). In accessing the space service, the client may send information such as an XML message (as specified in the schema) to the space service at an Internet address. In accessing the space service, the client may search the one or more service advertisements stored in the space. The client may select one of the service advertisements from the space. In one embodiment, the client may send an instantiation request to the space after selecting the desired service advertisements from the space. A lease may be obtained for the desired service, and the lease and the selected service advertisement may be sent by the space service to the client. The client may then construct a gate for access to the desired service. The desired service may be executed on behalf of the client.

Another facility provided by a space service may be the spawning or creation of an empty space. This space facility may allow a client (which may be a service to another client) to dynamically create a new space. In one embodiment, this space facility may include an interface for spawning an empty space with the same functionality (same XML schema or extended schema) as the space from which it is spawned. This facility may be useful for generating (e.g. dynamically) spaces for results. For example, a client may spawn a space a request a service to place results or advertise results in the spawned space. The client may pass the spawned space URI and/or authentication credential to the service. Or a service may spawn a space for results and pass the spawned space URI and/or authentication credential to the client. In some embodiments, once a space is spawned, it may be discovered just like other spaces using one or more of the space discovery mechanisms described herein.

Figure 41:
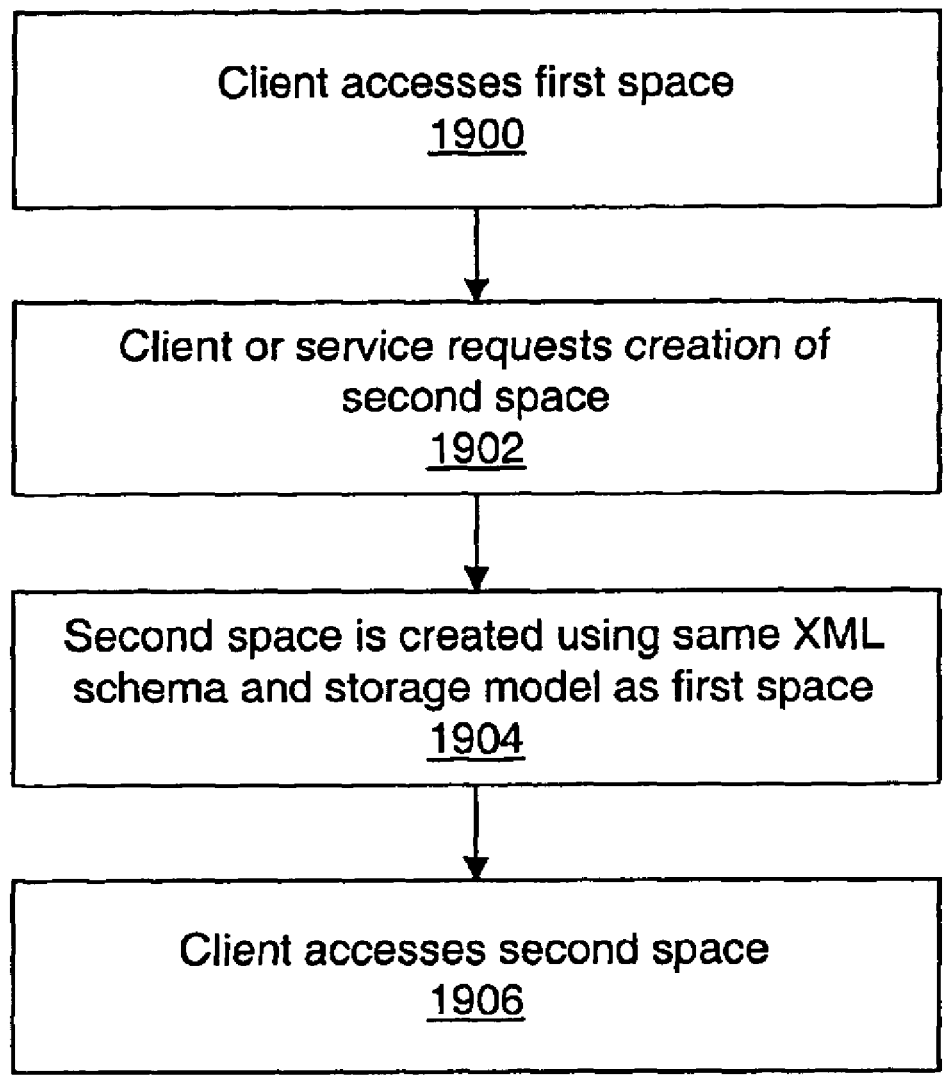
FIG. 41 is a flow diagram illustrating the spawning of a new space in a distributed computing environment according to one embodiment.

FIG. 41 is a flow diagram illustrating the spawning of a new space in a distributed computing environment according to one embodiment. As indicated at 1900, a client may access (i.e., connect to) a first space service. (A service may act as a client for the purpose of accessing or otherwise using a space.) The first space service may store one or more service advertisements and/or other content in a first space, and each of the service advertisements may include information which is usable to access and execute a corresponding service. The first space service may include a first schema which specifies one or more messages usable to invoke functions of the first space service. For example, the first schema may specify methods for reading advertisements from the first space and publishing advertisements in the first space. The first schema and service advertisements may be expressed in an object representation language such as eXtensible Markup Language (XML). In accessing the first space service, the client may send information such as an XML message (as specified in the first schema) to the first space service at a first Internet address (e.g., URI). In accessing the first space service, the client may search the one or more service advertisements stored in the first space.

In one embodiment, spaces may include a facility for spawning new spaces. As indicated at 1902, the creation of a second space may be requested, such as by the client sending an appropriate request to an interface of the first space. In one embodiment, the request may be formatted as an XML message according to the first schema for the first space. In response, a second space service with a second space may be created, such as at a second Internet address (e.g., URI), as indicated at 1904. As above, the second space service may include a second schema which specifies one or more messages usable to invoke functions of the second space service. The second schema may include at least the first schema, and the second schema may include additional functionality as well. In one embodiment, the schema of the second space may include a portion of the first schema, or the second schema may be specified at the time of creation of the second space. As indicated at 1906, the client may then access the second space by sending to the second space at least one of the messages specified in the second schema.

Spawning a space may include administration initialization, such as for security. In one embodiment, when a requestor has just spawned a space, only the requester is initially allowed to access the spawned space. Such limiting of access to the spawned space may be useful when a client and service are using that spawned space to store results. Refer to the Authentication and Security section for more information on spawned space authentication and security. Once a client has spawned a new space, it may build a gate to access the spawned space.

By using a mechanism in which a space may be created via an interface in another space (e.g. a space spawning facility), new spaces may be created efficiently. For example, in one embodiment, storage for the spawned space may be allocated using the same facility used by the original space for storage. In one embodiment, the first space may store a first set of information, such as XML advertisements or other content, according to a particular storage model. Upon its creation, the second space is operable to store a second set of information according to the same storage model. Also, a spawned space may share a common service facility with its original (or parent) space. For example, a new URI may be assigned to the new space. In one embodiment, the new URI may be a redirection to a common space facility shared with the original space. Thus, a newly spawned space may use the same or some of the same service code as that of the original space. In other words, the first space service may include a set of program instructions which are computer-executable to provide the first space. The second space service may include substantially the same set of program instructions, wherein the set of program instructions are further computer-executable to provide the second space.

Space facilities may also include security administration, for example, to update the various security policies of the space, and other administrative facilities. For example, the number and age of advertisements may be controlled and monitored by a root space service. Old advertisements may be collected and disposed. See, e.g., the Leases section herein for when an advertisement may be considered old. The service implementing the space may be under the control of an administrator. The administrator may set policy in a service dependent manner.

Space facilities may also include a facility to delete an empty space.

Certain spaces may include facilities or services to further support the proliferation of certain clients, such as mobile clients. For example, services in spaces that a mobile client may discover, e.g. via the discovery protocol, may provide support for mobile clients, such as:

Assigning and administering temporary network addresses for the client.

Proxying message passing for the client.

Providing search facilities for additional spaces. For example, a service may allow a client to specify keywords through a simple interface. The service then uses the keywords in conjunction with Web search engines to search for spaces on the Web, as further described herein. In other embodiments, a search service may constrain clients to searching only a few supported spaces within the distributed computing environment.

As mentioned earlier (see FIG. 9 and accompanying text), spaces may provide a convenient mechanism for storing results from a service run by a client. Using a space for results may allow a small client to receive in pieces the results of running a service. Some services may generate a large amount of results. By using a space to store the results from a service, clients that do not have the resources to receive the full results at once may still use the service. Moreover, by using a space to store results, a service running on a fast busy server may be freed from interacting directly with a slow client when returning large results. Thus, the service may be freed sooner for use by other clients.

A space may provide a convenient mechanism for accessing a result by different clients and/or at different times. For example, a client may not be able to use the entire result, but a user may want to access the rest of the result later using another client that can access it. For example, the result could be stock quote information, showing the current price of a stock (accessible by a PDA), and showing a chart of stock prices (accessible by a laptop later). Also, using a space in the distributed computing environment for results may allow a client to feed the result of one service into another service, without the necessity of downloading the result first. For example, in the case of the stock quote information above, the PDA could feed the chart into another service, which prints the chart, without the PDA having to download the chart itself. Thus, a results space may provide a mechanism for a client to pass to another client or service without the client having to handle or receive the results.

In different embodiments, the decision to use a space for results may be mandated by the service, mandated by the client, and/or requested by the client. A service may suggest the use of a space for its results, e.g., in its advertisement. In one embodiment, either the client or the service may spawn a new space for results or use an existing space for results. See the description herein regarding spawning spaces.

In one embodiment, the use of a space for results does not necessarily mean that the service must put all results in that space. There may be alternatives for any result a service generates. For example, part or all of the result may be sent in-line in a message to the client. Alternatively, the result may be put in the space, and then a notification message may be sent to client, referencing the result (e.g. including a URI to the result or to an advertisement for the result). Another option may be to put the result in the space, with notification via an event from the space. For example, the client and the service may agree to call the result some particular name, and then the client may register with the space (using a space facility such as described above) to receive an event when a result so named is added to the space. See the description above on event notification.

Thus, several different mechanisms may be employed within the distributed computing environment for a service to return results to a client. The actual results may be returned to the client by value in an XML message, or results may be returned to the client by reference with the actual results (or advertisement for the actual results) put in a space and the client receiving a message referencing the results in the space. Moreover, results, or results advertisements, may be placed in a space and the client notified by event.

Another mechanism for handling results may be for the client to specify another service for the results to be fed to. For example, when a client runs a service that will produce results, the client may instruct that service (e.g. through XML messaging) to send the results to another service for further processing. This may involve the client indicating the URI of an advertisement for the other service so that the result-producing service may generate a gate to the other service in order to run the other service and pass it the results. In this example, the result-producing service may be a client of the other service. In some embodiments, the client may send the schema or a pre-constructed gate to the result-producing service to access the service for further processing. An example of a service for further processing is a display service that may display the results for the original client. This display service may be on or associated with the same device as the client.

Result spaces and method gates may allow the distributed computing environment to provide a simple remote method invocation that is practical for thin clients with minimal memory footprints and minimal bandwidth, because it need not have the adverse side effects of huge program objects (along with needed classes) being returned (necessarily) across the network to the client as in conventional remote method invocation techniques. Instead, results may be returned to a result space, and only if desired (and if they can reside on the client) are the actual objects downloaded to the client.

The mechanism by which the distributed computing environment may provide for remote method invocation is as follows (refer also to the description of method gates in the Gates section herein). An object may be advertised (e.g. as a service or as part of a service) in a space. The advertisement includes a reference that contains the URI (e.g. URL) of the object, along with other access parameters, such as security credentials and XML schema. A client may have or may construct a client method gate for the object, which for every method of the object (or service) itself may have a wrapper method that takes the method parameters and creates a request XML message to invoke a method of the object. The XML message is sent to a service gate which invokes the actual method on the service object. When that method returns a result object, the service gate may post the result object in a results space, and may return a message to the client with a reference to the result object.

Thus, for a client to invoke a remote method, the client first sends a message to instantiate an object (e.g. service), such as described above. In one embodiment, instantiation of an object may include the creation or spawning of a result space. In another embodiment, result space creation may be independent from the object instantiation. Instantiation may return the object URI to the client, and the client and service gates may be dynamically created when a client requests instantiation. In some embodiments, a result space may already exist and be advertised by the object (service). Some part or all of the gates may also have been pre-constructed or reused.

Once a client has initiated an object, a local call of the appropriate client method gate will affect a remote call to the actual remote object, as described above. The remote method invocation approach of the distributed computing environment may be recursive, with object references returned to the client, instead of the objects itself, when the client gate is called. Note that such returned objects may already be instantiated. In some embodiments, the client may make a decision to download an entire object itself, rather than just remotely invoke it.

A method or service invoked as described above may generate a child gate that is associated with the results document. The method may return a child gate (or the schema, URI and credentials for the client to construct a child gate) for the references instead of the references themselves. The client may then access the references through the child gate. The child gate may also be a method gate.

As described above, this remote method invocation provided by the distributed computing environment allows the real result object(s) to be stored in a service results space (which also may be created dynamically, by a servlet for example). The results space may be temporary. The results space may act as a query results cache. The results cache may be patrolled by server software (garbage collector) that cleans-up old result areas. Distributed garbage collection may be employed, as result spaces may fill up until they are destroyed by a client indicating it no longer needs the space, or by an administrator on a server setting appropriate limits.

Figure 23:
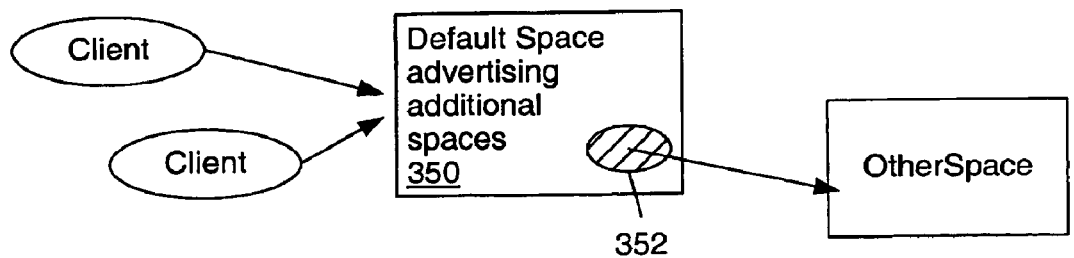
FIG. 23 is an illustration of a default space in a distributed computing environment according to one embodiment.

Turning now to FIG. 23, an illustration of a default space 350 is provided. The distributed computing environment may provide at least one default space so clients can find an initial set of advertisements. A device may have a default space that exists locally, with a built-in pre-constructed gate. The services advertised in that default space may exist locally on that device, and they may provide system software that enables or facilitates the device's participation in the distributed computing environment.

The default space 350 may include one or more mechanisms 352 to locate external spaces, as shown in FIG. 23. One service in the default space may run the space discovery protocol described above to find external spaces. Also, external spaces may be advertised in the default space. Additionally, a service (e.g. a search engine or a proxy service to a search engine) may be advertised in the default space that determines or finds external spaces. Each space may be analogous to a file system mount point. Thus, the distributed computing environment may provide searchable, dynamic mount points to services. A default space may be a client's initial mount point to the distributed computing environment.

A default space or access to a default space may be built in to a device. Through the default space and local services that may exist on the device, a client execution environment for the distributed computing environment may be provided. A device's local services and default space service may have built-in pre-constructed gates. One of the built-in services listed in the default space may be a service to run the discovery protocol so that the client may locate additional (e.g. external) spaces. A default space may include a built-in service that provides an execution environment for clients that allows the client user to browse spaces, select, and then instantiate services. Such a service may provide a simple user interface that allows a client to entire strings (e.g. keyword for space searches), view or browse result references (e.g. space listings, or service listings within a space), select items (e.g. to chose and instantiate a service), etc.

Devices that primarily provide a service may also include a default space and may include a built-in service in the default space that allows a service to manage advertising itself in various spaces. For example, a device, such as a printer, may have a built-in default service that finds (perhaps through the discovery protocol) a space on a local area network and adds an advertisement for the printer service to that space. This service may also maintain the printer service advertisement within the LAN space, for example, by renewing its lease or updating the printer's XML schema, etc.

For some devices that provide a service, the overhead of finding a space to advertise its service and maintain that advertisement is undesirable. In one embodiment, rather than searching for and maintaining a space or spaces to publish service advertisements, services on some devices may transmit their advertisements in response to connection requests. For example, a printer device with a printer service that is available on a proximity basis may not maintain an advertisement in a space (on the device or external to the device). Instead, when another device establishes a connection with the printer device (for example, a user with a laptop running a client desires to print a document), the printer service may transmit the service advertisement to provide the XML service schema for connecting to and running the service that provides printing functionality on the printer device. Also, some devices may only maintain advertisements for their services in a certain vicinity or local network. Such a device may not desire to support or may not have access to transports for broader accessibility.

One example of a service device in which it may be desirable for the device to avoid or limit maintaining service advertisements in a space is a device whose functionality is available on a proximity basis. Proximity-based services may provide advertisements of their functionality upon request. These advertisements may not be broadly accessible. For example, proximity-based services may be provided in a wireless communications system. The term "wireless" may refer to a communications, monitoring, or control system in which electromagnetic or acoustic waves carry a signal through atmospheric space rather than along a wire. In most wireless systems, radio-frequency (RF) or infrared (IR) waves are used. Typically, in proximity-based wireless systems, a device comprising a transceiver must be within range (proximity) of another device to establish and maintain a communications channel. A device may be a hub to connect other devices to a wireless Local Area Network (LAN).

As mentioned, embodiments of the distributed computing environment may provide a mechanism using a lookup space that allows clients to rendezvous with services. In a proximity computing environment, one embodiment of the distributed computing environment may provide a service discovery mechanism that clients may use to discover services without using lookup spaces as rendezvous points. An example of a proximity computing environment is an IrDA point-to-point communications environment. In a proximity computing environment, the proximity mechanism may find the "physical" location of the service for the client. For example, in an IrDA environment, the client device may be physically pointed at the device including the service(s) that the client desires to use.

The proximity service discovery mechanism may enable the client to directly look for service advertisements rather than sending a lookup request to a lookup space to look for service advertisements. Since the client device may have established a proximity connection to the service device, the client may directly request the desired service. For example, a PDA client device may establish a proximity connection to a printer device; the client may "know" to request a printer service connection on the printer device.

In one embodiment, the client may send a proximity service discovery message to the service device. The message may include information that may specify a desired service on the service device to which the client device has a proximity connection. In one embodiment, a service on the service device may respond to the proximity service discovery message, and may send to the client the service advertisement that the client may use to connect to the desired service. The proximity service discovery message may also include information that may be used to authenticate the client and to establish the client's capabilities on the service. Using the received service advertisement, the client may establish a gate to establish communication with the desired service.

Nevertheless, it may still be desirable to publish advertisements for services that do not desire to or cannot maintain their advertisements in a space that is broadly accessible. In one embodiment of a distributed computing environment, a device that establishes a connection with a device that does not publish its service advertisement(s), such as a proximity-based device, may publish service advertisements received from the non-publishing device. For example, a device that establishes a connection with a proximity-based device and that has an alternate transport connection(s) may publish (or republish) service advertisements received from the proximity-based device in the alternate transport environment, thus allowing the proximity-based device service(s) to be used by other devices (through the (re)published service advertisements) which are outside the normal proximity range of the device.

The publishing device may locate a locally published service advertisement for the proximity-based device through a discovery and/or lookup service, or alternatively the service advertisement may not be published by the local service device, but instead may be sent to the publishing device by the local device upon the establishment of a connection, as described above. In one embodiment, the republished service advertisement may be made available as long as the device maintaining the advertisement is connected to or able to connect to the local device. For example, if the publishing device is disconnected from the local device (for example, moves out of proximity range of the device), the service advertisement may be made stale or removed. A lease mechanism may be provided to allow the space containing the advertisement to send lease renewal messages to the publishing device. The publishing device may verify its connection to the local device, thus allowing the space to detect when the local device is no longer available. Rules for how the service advertisements are republished may be provided by the local device or by an administrative policy for the local vicinity (e.g. proximity area) or local network.

Figure 24:
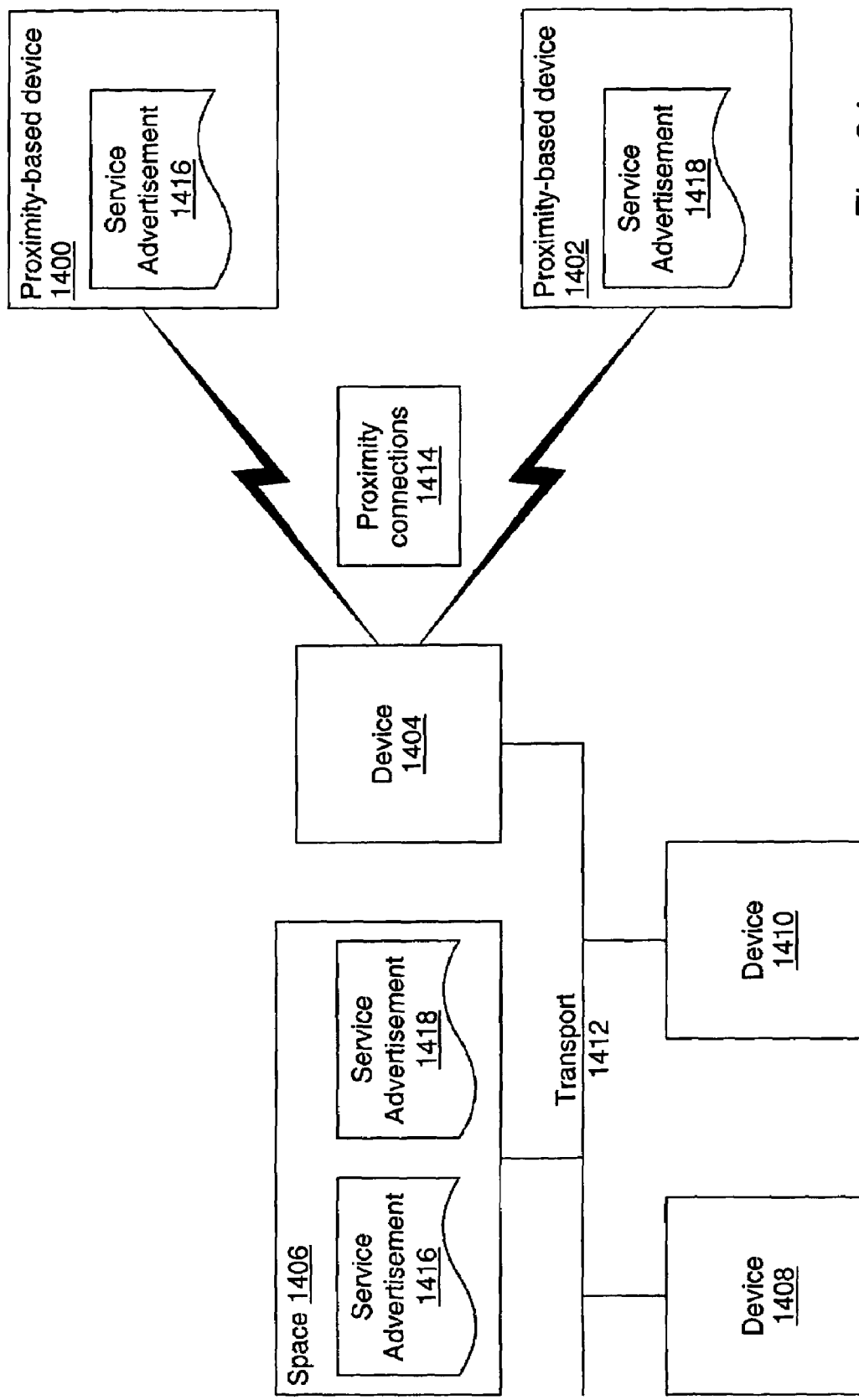
FIG. 24 illustrates an example of a device bridging proximity-based devices onto another transport mechanism to allow the services provided by the proximity-based devices to be accessed by devices outside the proximity range of the devices, according to one embodiment.

FIG. 24 illustrates an example of a device bridging proximity-based devices onto another transport mechanism to allow the services provided by the proximity-based devices to be accessed by devices outside the proximity range of the devices, according to one embodiment. A publishing device 1404 may be connected to a network 1412, such as an Ethernet LAN or the Internet, etc., and may establish and maintain proximity connections 1414 with proximity devices 1400 and 1404. Proximity connections may be wireless connections or wired LAN connections, for example. Proximity devices 1400 and 1402 may each send a service advertisement to the publishing device 1404 upon connection, or, alternatively, the publishing device may locate the service advertisements using a discovery and/or lookup service for the proximity connections. The publishing device 1404 may then make the services provided by the proximity devices available to other devices 1408 and 1410 on the network 1412 by republishing the service advertisements 1416 and 1418 in space 1406. Space 1406 may be stored on the publishing device or on other devices connected to the LAN (including devices 1408 and 1410).

Other devices on the LAN including devices 1408 and 1410 may then discover space 1406 and look up the republished service advertisements 1416 and 1418 for the proximity-based devices, establish gates to communicate to those services (device 1404 may act as a proxy or bridge) on the proximity-based devices 1400 and 1402 using the XML message passing methods described previously, and send requests and receive results to the proximity devices. Publishing device 1404 may act as a bridge between the network 1412 and the proximity connections 1414 to the proximity-based devices.

Leases

Leases may be used in the distributed computing environment to deal with partial failure, resource synchronization (scheduling), and to provide an orderly resource cleanup process. Leases may help the overall distributed system manage independent clients and services that may come and go. The various resources that clients obtain from services (including space services) may be leased from those services. In general, not every resource can or needs to be leased. In one embodiment, it is up to the implementation of each particular service to determine which of its resources need to be leased. In particular, resources used by a large amount of clients simultaneously may not need leasing or instead may require custom leasing protocols. This class of leasing may be left to the service provider. Custom protocols, such as those to implement transactions for example, may be built upon the base leasing scheme. In one embodiment, the base leasing model is a relative time-based model.

Services may issue leases to clients and provide operations on those leases. In one embodiment, all such lease functionality of a service is part of that service's XML schema. Thus, a client may use its gate (corresponding to the service and constructed for the service's XML schema) to perform lease operations. In one embodiment, all services that issue leases provide the following lease operations (only allowed by the owner of the lease): (i) renewing a lease (parameters specified: lease (e.g. lease ID, lease credential), new lease time requested), and (ii) canceling a lease (parameter specified: lease (e.g. lease ID, lease credential)). In one embodiment, all leases are granted for a particular amount of relative time (duration of lease) that may be negotiated. The requestor may specify a certain amount of time (e.g. in seconds), and the grantor may grant the lease for any amount up to that time. In one embodiment, a −1 value may be used to specify an indefinite lease.

The leasing mechanism may provide a mechanism to detect service and client failure. Leases may also provide a mechanism to provide shared and exclusive resource access. In one embodiment, all service resources either have no lease (resource is not leased and therefore available), a shared lease (resource accessed by multiple clients), or an exclusive lease (resource is accessed by exactly one client at a time). In one embodiment, all resources begin in the no lease state. A no lease state signifies there is no current access to the underlying resource, and indicates that there is an interest in the resource remaining in existence and thus available for leasing. The leasing level may be increased from none to shared, none to exclusive, or shared to exclusive. Lease isolation levels may also be decreased from exclusive to shared, exclusive to none, and shared to none. In one embodiment, clients may voluntarily increase or decrease the lease isolation level, or may be requested by the service to do so. A response message from the service may indicate if the isolation level change was accepted.

Request-response message pairs may be employed to claim, release, and renew a lease. Each message may be tagged using a reserved XML tag to indicate that the message is a leasing message. The complete composition of the message isn't necessarily defined by the distributed computing environment. In such an embodiment, service developers may append custom message content, as long as, the message is tagged as a leasing message.

Figure 25:
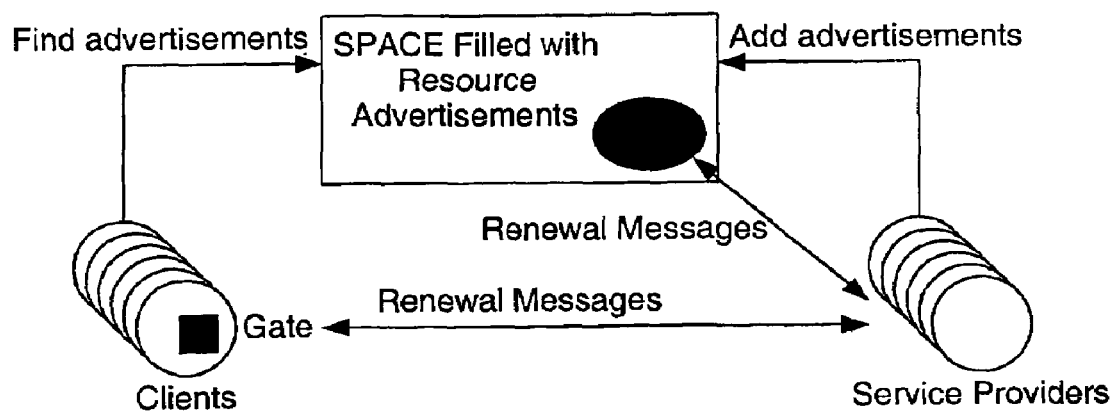
FIG. 25 is an illustration of the use of lease renewal messages in a distributed computing environment according to one embodiment.

In one embodiment, clients that use leased resources may be expected to: (i) claim the resource as shared or exclusive, (ii) release the resource claim (if requested or if finished with resource), and (iii) respond to renewal messages (with another claim at same or different isolation level). Renewal messages may be sent (e.g. in regular intervals) by services to detect client failure cases. The interval (at which the renewal message is sent) may be service specific. If a response to the renewal message isn't issued after a specific amount of time (e.g. based on a time noted in the service advertisement), a resource reclamation process may begin within the service, revoking the lease completely. In such an embodiment, renewal messages sent to clients should be handled in a timely fashion. FIG. 25 illustrates the use of renewal messages both between a client and an instantiated service and between a service provider and a space service. Note that both cases may be considered as the use of renewal messages between a client and a service, since a service provider may be a client to a space's advertisement service.

Renewal messages may arrive in an "out of band" fashion that may be inconvenient for the client to handle. That is, the client cannot predict when a renewal message will be sent from the service. Out of band message handling may complicate the client's logic and increate its complexity. To solve this problem, an automatic lease renewal mechanism may be implemented to relieve the client of the responsibility of handling the out of band messages, and thus reduce client complexity. In the automatic lease renewal mechanism, each gate (message, method, and/or event gate) may receive renewal messages and automatically respond to them without help from the client. The default response to a renewal request is to claim the lease at its current level. Each message gate may contain a single, set-aside renewal response message that is automatically sent to the advertisement space service when the gate receives the renewal message. This "out of band" message is handled on behalf of the client, yielding a cleaner client programming model. In one embodiment, the gate may allow clients to register lease event handlers to specify different isolation levels in the response message.

The leasing mechanism may also provide a mechanism to detect stale advertisements. When a service publishes its advertisement in a space, that service obtains a lease on this publishing of its advertisement. Each advertisement may contain a time by which the service promises to renew the advertisement. In one embodiment, all time-out values are specified in seconds. If the service continues to renew its lease, the space is provided some assurance that the service advertised is still being offered. The renewal time may be counted down towards zero by the space service. If the service does not renew its lease, the service may have failed, or it may no longer wish to, or be able to provide the service. When the lease is not renewed, the space service marks the service advertisement stale, so it does not make it available to clients. Services renew advertisements by sending a renewal message to the space. The space service receives these messages and re-sets the advertisement renewal time back to its initial value.

In one embodiment, stale advertisements are not automatically deleted. Depending upon the policies of the space, it may choose to delete stale service advertisements that have expired for a reasonably long period of time. The deletion policy may be set by the space service. The space service may search for stale advertisements and either delete them or bring them to the attention of an administrator, for example.

In addition to detecting stale advertisements, the space service may use leases to manage the resources its facilities provide to clients (including other services) of the space. For example, when a client desires to use a service, the space service may request a lease for the client as part of service instantiation. Service instantiation may be performed to allow a client to run a service. To instantiate a service, a client may first select one of the service advertisements published in a space. The client may use the various facilities provided by the space to look up advertisements in the space. Then the client may request the space to instantiate the service. The lease acquired during service instantiation is on use of the service advertisement (not the same as the lease on publishing of the service advertisement). It should be noted that the space service may allow multiple clients to have a lease on use of a service advertisement if the advertisement has an indication it is shared. Otherwise, the space service only allows one client at a time to have a lease on the service advertisement (exclusive).

Another example of how a space service may uses leases to manage the resources its facilities provide to clients is when a client of the space registers to be notified when XML documents (e.g. service advertisements) are added or removed from a space. The registering client of the space may obtain a lease on this subscription to notifications. This lease enables the space service to know whether to continue sending notifications. Such a lease may not be necessary when a client has established an active session with the space. Also, note that when a client of a space (could be a service) establishes a session with the space, the client may obtain a lease on the session. This allows the space to manage any resources associate with the session.

In another embodiment, the distributed computing environment may employ a leasing mechanism that is not time-based. The lease may be generated when an object is claimed for use. Instead of a time-based mechanism, the claim method may accept a callback that notifies the current leaseholder that some other party wishes access the same object (e.g. service). Thus, as an alternative embodiment to time-based leases, instead clients may make claims on space objects (e.g. services).When another client desires a lease that is incompatible with the current leaseholder's, the service may send a "callback message" to the client. Upon receiving the callback message, the client (i.e. client gate) may invoke a callback method to decide on a response to the callback message (keep the lease, cancel the lease, change the access level to shared, etc.). Once a response has been determined, the client gate sends a response message to the service. This distributed mechanism for managing leases may be implemented using the XML message-passing layer.

Authentication and Security

The distributed computing environment provides for spontaneous and heterogeneous distributed systems based upon an asynchronous message passing model, where data and/or objects may be represented in a representation language such as XML. In the distributed computing environment, clients may connect to services throughout the Internet, for example. The distributed computing environment may enable large numbers of network devices to work together in a reliable, dynamic, and secure fashion. The distributed computing environment may define a protocol that substantially enables interoperability between compliant software components (clients and services).

In the context of the distributed computing environment, a device may be a networking transport addressable unit. Clients and services may be implemented as Universal Resource Identifier (URI) addressable instances of software or firmware that run on devices.

Internet space is inhabited by many points of content. A URI is a method used to identify any of those points of content, whether it be a page of text, a video or sound clip, an image, software, firmware or other Internet content. The most common form of URI is the Web page address, which is a particular form or subset of URI called a Uniform Resource Locator (URL). A URI typically describes the mechanism used to access the resource, the specific computer that the resource is housed in and the specific name of the resource (typically a file name) on the computer.

Clients and services (both may be implemented on devices as software and/or firmware) may be connected over the Internet, a corporate intranet, a dynamic proximity network, within a single computer, or by other network connection models. The size and complexity of the devices supporting clients and services may range, for example, from a simple light switch to a complex, highly available server. Example devices include, but are not limited to: PDAs; cellular phones; notebook, laptop, and more powerful PCs; and more powerful computer systems, up to and including supercomputers. In some embodiments, the distance, latency, and implementation of clients and services may be abstracted, with a common discovery and communication methodology, creating a "black box" effect. This definition approach allows software implementation issues to be dealt with by the underlying platform, yielding a loosely coupled system that may be scaled to Internet proportions.

The distributed computing environment may provide an Internet-centric programming model including WEB and XML content representation, dynamic device discovery, and secure device communication that is accessible from a wide range of network devices. The distributed computing environment may include a network programming model abstracted above the CPU level. The programming model may include the following properties:

URI addresses

Strongly typed data called content (addressed with URIs)

Substantially unlimited amount of persistent content storage (e.g. stores), (containing XML and non-XML content, such as that identified by MIME types)

Substantially unlimited amount of transient content memory called spaces (containing L content)

Descriptive XML metadata (data about data) content advertisements that may be stored in a space to notify interested clients.

A substantially unlimited number of instructions (embodied as messages)

Secure message endpoints (gates) addressed by URIs

Data flow support (event messages) to coordinate work flow between distributed software programs Services and clients may run as programs within the distributed computing environment. Services may advertise their capabilities to clients wishing to use the service. Clients may or may not reside within the same network device, and that device's code execution environment may or may not support the Java platform.

Using URIs to address content and message endpoints gives the distributed computing environment a powerful addressing scheme. The address may specify the location of the content or endpoint, and may specify the route (or transport protocol) to be used. Items addressed using URIs also may have an associated security credential. The security credential may be used to control what clients are allowed access to the item, as well as which operations authorized clients are allowed to perform on that item.

The high degree of access provided by the distributed computing environment may be controlled by appropriate authorization and security systems and methods. Authentication and security in the distributed computing environment may include, but are not limited to: verifying the typing correctness of XML content in a message; securely identifying the sender to the receiver; a mechanism to check the integrity of messages sent from a client to a service and vice versa; and a mechanism of describing a service's set of accepted messages to a client and enforcing the message requirements on messages received at the service. The above listed security and authorization features may be leveraged in a single, atomic unit of code and data. The atomic unit of code and data may be dynamically created. In one embodiment, once created, the atomic unit of code and data may represent a message endpoint (gate), and may not be altered as to the security and authorization policies implemented during creation.

A gate may represent the authority to use some or all of a service's capabilities. Each capability may be expressed in terms of a message that may be sent to a service. Gates may also be used for failure case detection when a client leases resources.

Authorization and security may also include a mechanism for verifying that a client attempting to use a service is authorized to use the service; that the space from which the client receives the service advertisement from is authorized to provide the service advertisement; and/or that the service advertisement itself is authorized.

Message passing may be implemented in a messaging layer as the means of communicating requests from clients to services and of the services responding with results to the clients. The messaging layer of the distributed computing environment may substantially guarantee that valid XML messages are sent, and may provide mechanisms enabling a language-independent security model. In the messaging layer, a sending message endpoint may be linked to a receiving message endpoint. The two associated message endpoints may provide a secure, atomic, bi-directional message channel suitable for request-response message passing between a client and a service.

In embodiments of a distributed computing environment, an advertisement may be published in a space for a service. An advertisement may be an XML document that includes the XML schema and URI of the service. The service may also include a service ID token or credential in the advertisement, and may specify in the advertisement an authentication service to be used by both the client and the service. A client may then locate the service advertisement on the space, and use the advertisement to instantiate a message gate on the client. The client may use the authentication service specified in the advertisement to obtain an authentication credential for sending in messages to the client. In one embodiment, the client may pass the service ID token or credential from the service advertisement to the authentication service, and the authentication service may then use the service token or credential to generate the authentication credential for the client. In one embodiment, the client may include a gate factory that receives the necessary information to create the message gate, and the gate factory may construct the message gate and communicate with the authentication service to obtain the authentication credential for the client. A corresponding service message gate may be instantiated at the service.

The client, at some point, sends a first message to the service. In one embodiment, the client message gate may embed the client's authentication credential constructed by the authentication service in the message. When the service receives the message, it may use the same authentication service to verify the authentication credential received in the message. By sharing the same authentication service, any of a variety of authentication protocols may be employed, with the details of generating the authentication credentials separated from the client and the service. Thus, a client may use different authentication credential protocols with different services.

In one embodiment, the authentication service may determine the capabilities of the client (e.g. what the client is allowed to do on the service) upon first receiving the client authentication credential from the service. The capabilities of the client may be bound to the client's identity. Then, the client's message gate may embed the authentication credential in every message sent from the client to the service. The messages may be received by the service message gate and then checked by the authentication service to ensure that the message is from the client and that the message request is within the capabilities of the client. In another embodiment, capability determination and message checking for capabilities may be handled by the service message gate without using the authentication service.

The client and service message gates may work together to provide a secure and reliable message channel. The gates may serve as secure message endpoints that allow the client to run the service by sending and receiving secured, authorized XML messages to and from the service.

Operations in the distributed computing environment may be embodied as XML messages sent between clients and services. The protocol used to connect clients with services, and to address content in spaces and stores, may be defined by the messages that can be sent between the clients and services. The use of messages to define a protocol may enable many different kinds of devices to participate in the protocol. Each device may be free to implement the protocol in a manner best suited to its abilities and role.

A service's capabilities may be expressed in terms of the messages the service accepts. A service's message set may be defined using an XML schema. A XML message schema may define each message format using XML typed tags. The tag usage rules may also be defined in the schema. The message schema may be a component of an XML advertisement along with the service's message endpoint (gate) used to receive messages. Extensions (more capabilities) may be added to services by adding messages to the XML message schema.

In the distributed computing environment, authorized clients may be able to use all of a service's capabilities, or may be limited to using a subset of the service's capabilities. In one embodiment, once a set of capabilities has been given to a client, the client may not change that set without proper authorization. This model of capability definition may allow for services levels that run from a base set of capabilities to an extended set.

Service instantiation may be performed to allow a client to run a service. To instantiate a service, a client may first select one of the service advertisements published in a space. The client may use the various facilities provided by the space to look up advertisements in the space. Then the client may request the space to instantiate the service. Service instantiation may include, but is not limited to, the following steps:

1. Client requests space service to instantiate a service.
2. Space service verifies client is allowed to instantiate the service.
3. Space service obtains a lease on the service advertisement for the client with the lease request time specified by the client. Alternatively, the service advertisement may be provided to the client without using the leasing mechanism.
4. Space service sends a message to the client that includes the lease allocated in steps 3, and the service advertisement of the service.
5. Client runs the authentication service specified in the service advertisement, and obtains an authentication credential.
6. Client constructs a client message gate for communicating with the service.

In order to provide trust between clients and services in the distributed computing environment, a series of dynamically generated numbers (keys, or tokens) may be used as security or authentication credentials for clients. One or more credentials may be used to verify the right of a client to use a service and to verify messages between the client and the service. Each client and service may have a unique credential.

The type of authentication credential needed to use a service may be returned to the client conducting a service search. In one embodiment, an authentication credential is an opaque object that must be presented each time a client uses a service. In one embodiment, the authentication credential may be presented by a message gate on behalf of a client in every message sent to a service. No matter what kind of authentication credential is required by a service, by using an authentication service external to the client and the service, the client and the service may not need to be aware of the authentication credential structure or of the authentication process.

An authentication credential may also include a transport-specific ticket in addition to the service ticket. When running a service, depending upon the networking transport specified in the service advertisement, the transport may provide a secure connection. In some cases, if the data link layer is already secure, it may not be necessary to use a secure transport over the already secure data link layer.

The concept of an authentication credential is abstract enough to allow various levels of security based upon credential implementation. Levels of security may include, but are not limited to:

1. None (no message security—credential is empty or no credential)

Messages with empty credentials or no credentials may be sufficient when security is enforced by the physical connectivity properties of the transport. For instance, a smart light switch connected to just one light switch controller is secure because the switches are wired in a secure manner.

2. Signed messages (digital signatures)

Signed messages may include a digital signature that enables the service (receiving the message) to verify the origin (client) of the message.

3. Encrypted messages (transport may handle this)

Encrypted messages add another level of security by scrambling the message contents so that another credential is required to unscramble it.

4. Capability messages (service functionality and user aware)

This level of security may provide for security capabilities on a user-by-user basis (e.g. what the user is allowed to do), and may allow for fine-grained access control to services and individual service functions.

Multiple levels of security zones may be used, due to the heavyweight implementation necessary to enforce the higher levels of security (capabilities & encryption). If the message transport supports (or helps support) these security levels, the support may be leveraged to provide security level bridge services that bridge one level of security to another.

As mentioned above, services without any security model may accept empty authentication credentials. For services that do not restrict access, a gate may be built without an authentication credential or with an "empty" authentication credential. The gates for such services may not send an authentication credential with each message, or may send an empty credential. The authentication service is one example of a service that may not restrict access. Other services may require a user and password pair.

In some embodiments, a mechanism for verifying that a client attempting to run a service, for verifying that the service advertisement received by the client is an authorized service advertisement, and for verifying that the space from which the client received the service advertisement is authorized may be based upon a public key/private key asymmetric cryptographic mechanism. In this mechanism, an authorized sending entity may embed a public key in a message and encrypt the message including the public key with its private key. An entity receiving the encrypted message may decrypt the message using the public key and find the same public key embedded in the decrypted message, and thus verify that the message is from the authorized entity, since only that entity has the private key necessary to encrypt the message. Thus, an entity may issue a credential that is substantially unforgeable, and that other entities may decrypt (with the appropriate public key) to verify messages sent by the entity.

A Kerberos ticket is one example of a security credential that may be used in the distributed computing environment. Kerberos is a secure method for authenticating a request for a service in a computer network. Kerberos lets a user request an encrypted "ticket" from an authentication process that can then be used to request a particular service. The user's password does not have to pass through the network.

Mechanisms may be provided by the distributed computing environment to substantially guarantee that messages sent between clients and services are not compromised. In one embodiment, a sender may embed a token containing information that may be used by the receiver to verify that the message has not been altered. There are several methods for generating the information to embed in the message. In one embodiment, a hash of the message may be computed and sent with the message. Hashing may include the transformation of a string of characters into a usually shorter fixed-length value or key that represents the original string. Upon receiving the message, the receiver may recompute the hash and check it against the sent hash. If the message has been altered, it is highly unlikely that the same hash will be generated. The sender may encrypt the hash and send the corresponding public key in the encrypted message to substantially ensure that the hash is not compromised.

In other embodiments, an error detection scheme such as cyclic redundancy checking may be used. Cyclic redundancy checking is a method of checking for errors in data that is transmitted on a communications link. In an embodiment using cyclic redundancy checking, the sender applies an n-bit polynomial to the message and appends the resulting cyclic redundancy code (CRC) to the message. The receiver applies the same polynomial (which may also be passed in the message) to the message and compares its result with the result appended by the sender. If they agree, the message has been received successfully. If not, the sender may be notified to resend the message.

Gate factories may also play a role in security, since a gate factory may be "trusted" code. Using a trusted gate factory to generate gates may help to ensure that gates are trusted code, and that the code is correct with respect to the service advertisement. Clients may be required to present a client ID token or credential to the gate factory as a means of authentication. Services may present a service ID token or credential to clients (e.g. through an advertisement) when a client wishes to create a gate. As discussed herein, a client and service token pair may be used to create a third credential that may be used to allow the client to send messages to the service. This third credential may be referred to as an authentication credential. An authentication credential may be created by an authentication service during the authentication process. In one embodiment, the service may use any authentication policy at its disposal. In one embodiment, the authentication service administers the authentication policy on behalf of the service, and thus the service does not have to be aware of the particular authentication policy being used.

The client may construct its gate using an authentication credential that the client receives by running an authentication service specified in the service advertisement. This may allow the constructed gate to send the authentication credential with each message to the service. When the service receives the first authentication credential in a first message from the client, the service may use the authentication service specified in the service advertisement to authenticate the client, and thus may establish a binding of the authentication credential to the identity of the client.

As previously discussed, some results produced by a service may be advertised in a space and ultimately accessed using a results gate. The results gate may or may not contain the same security credential as the input gate used to generate the results. Because input to a service may be asynchronous from its output (the results), the results may have a different set of access rights associated with it. For example, a payroll service may allow a different set of clients to initiate payroll than to read the payroll service's results (paychecks). Thus, a client may have to go through a separate authentication process to obtain access rights to the results, which may include receiving an authentication credential for the results from an authentication service specified in an advertisement for the results.

Message gates may offload most security checks from services. Services may focus on providing capability and authenticating clients. A principle of least privilege may be supported by giving clients access to only those capabilities that are requested (or assigned).

Security checks may occur when a gate is created and/or when a gate is used (when messages are sent and/or received). When a client requests access to an advertised item (service), the process of gate creation may begin. During this process, the client gate factory may work with the service to mutually authenticate each other. The checks performed at gate creation time may be extensive, and may minimize the number of checks performed during gate usage. After the service has authenticated the client, the service may determine specific capabilities for the client (e.g. what the client is allowed to do on the service), and associate the capabilities with the client's authentication credential. These specific capabilities may specify what operations the client is allowed to perform on the service. Since the gates may ensure that every message contains the authentication credential, the service can then check each request when it is received against the capabilities of the authenticated client.

Gate creation checks may ensure that a client has permission to use some or all of the service capabilities designated by the XML message schema. In one embodiment, these checks may be implemented using access control lists (ACLs) in conjunction with an authentication service such as Kerberos. A challenge-response sequence (such as a password) may also be used to authenticate a client.

In one embodiment, whatever means is used to authenticate the client, the authentication may be invisible to both the client and service, the gate factory may be aware of which authentication service to use, and the authentication service handles the authentication mechanism and policies. Gate factories may be product and environment dependent, or may even be controlled by a configuration management system. In one embodiment, the degree and method of client isolation may be platform dependent, but is known to the gate factory.

Message gates in the distributed computing environment are typically associated with a single client. The means of association may be determined by the gate factory. The checks performed at message send time may ensure that the proper client is using the gate. In one embodiment, gates may be passed in messages, and may be cloned if a new client wishes to use the gate. The cloning process may perform a new set of creation checks.

Once a client of a space (the client may be another service) finds the advertisement of a space service, the client of the space may run the space service, as it would any other service. Running a space service may involve using an authentication mechanism. Running a space service may include, but is not limited to:

1. The client of the space may first run an authentication service that may be specified in the service advertisement of the space service to obtain an authentication credential.
2. The client of the space may use the authentication credential, the XML schema of the space (from space's service advertisement), and the URI of the space (from space's service advertisement) to construct a gate for the space. In one embodiment, the client may pass the information to a gate factory to construct the gate.
3. The client of the space may run the space service by using the gate to send messages to the service.
4. When the space service receives the first message from the client, with the authentication credential embedded, the space service may use the same authentication service used by the client to obtain the authentication credential to authenticate the client, thus establishing the client's identity.
5. The space service may then determine the client's capabilities (e.g. what the client is allowed to do on the space service) and bind the capabilities to the authentication credential.

As discussed in the Spaces section, a space's facilities may include an interface for spawning an empty space with substantially the same functionality (same XML schema) as the space from which it is spawned. The spawning facility may be useful, among other things, for dynamically generating spaces for results.

Figure 42:
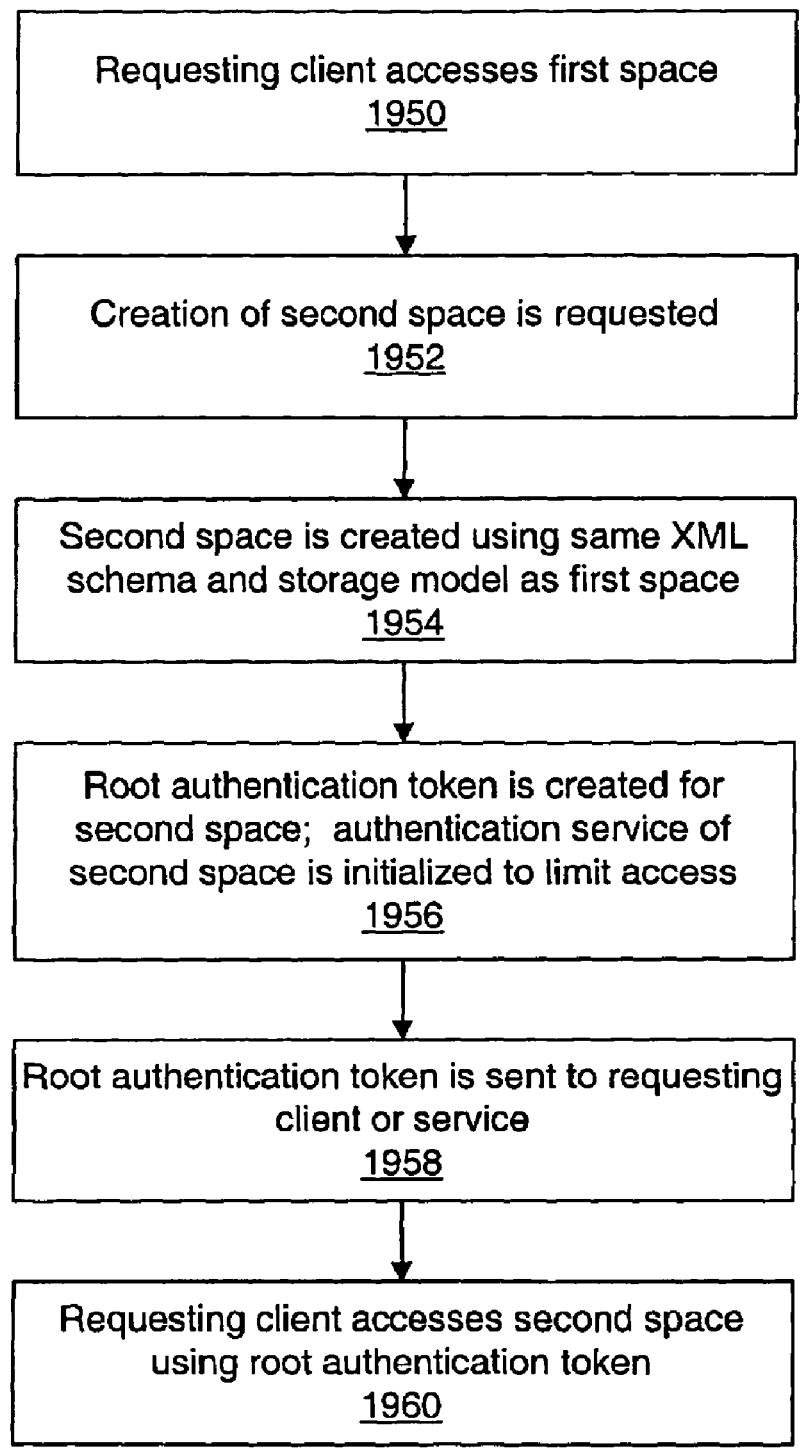
FIG. 42 is a flow diagram illustrating the secure spawning of a new space in a distributed computing environment according to one embodiment.

FIG. 42 is a flow diagram illustrating the secure spawning of a new space in a distributed computing environment according to one embodiment. As indicated at 1950, a client may access (e.g., connect to) a first space service. (A service may act as a client for the purpose of accessing or otherwise using a space.) As indicated at 1952, the creation of a second space may be requested, such as by the client sending an appropriate request to an interface of the first space. A client (including a service acting as a client of a space service) which requests creation of the space may be referred to as the requesting client. In response, a second space service with a second space may be created at a second Internet address, as indicated at 1954. As above, the second space service may include a second schema which specifies one or more messages usable to invoke functions of the second space service. The second schema may include at least the first schema, and the second schema may include additional functionality as well.

The second space may initially be configured to permit access only to the requesting client. In one embodiment, as indicated at 1956, a root authentication token is created for the second space. Also as indicated at 1956, an authentication service associated with the second space may be initialized, whereby the second space is configured to permit access only to a client holding the root authentication token. As indicated at 1958, the root authentication token may be sent to the requesting client or service. As indicated at 1960, the requesting client may then access the second space by sending to the second space at least one of the messages specified in the second schema and by using the root authentication token.

In one embodiment, therefore, when a requestor has spawned a space, only the requestor may be allowed to access the spawned space. For example, the spawned space may be for storing results from a service that the client needs to keep secured. In one embodiment, this security may be ensured by:

As indicated at 1956, creating an initial root authentication token, and initializing the authentication service of the spawned space, so that the authentication service only authenticates the root authentication token, and so that it returns no other authentication tokens (no other clients of the spawned space allowed initially).

Initializing the security policies of the spawned space so that the root identity associated with the root authentication token has access to all facilities of the space, including the security administration facilities.

As indicated at 1958, returning the root authentication token and the service advertisement of the spawned space to the requestor of the spawned space.

The requestor may build a gate to access the spawned space, since it is returned the authentication credential and the service advertisement of the spawned space. In one embodiment, only the requestor and clients or services that the requester passes the authentication credential and the spawned space's service advertisement may access the spawned space. Such limiting of access to the spawned space may be useful when a client and service are using that spawned space to store results, for example, if the client and service desire to keep the results private.

In one embodiment, the requesting client may send the root authentication token to a second client (including a service acting as a client of the space service). The second client may then access the second space by sending to the second space at least one of the messages specified in the second schema along with the root authentication token.

After running a service, the client may change the authentication policies of the spawned space using a security administration space facility, and other clients or services may then access the spawned space. The other clients may then have access to the second space service, so that, for example, the other clients may read service advertisements from the second space. In addition, the spawned space's service advertisement may be made available to other clients of the spawned space (the other clients may be services) using the discovery protocol or other means.

The message transport layer in a distributed computing environment may include mechanisms for protecting the security and integrity of communications among clients and services during transport. This security may be referred to as "wire security" or "transport security" to distinguish it from the authentication security implemented by the messaging system including gates. Encryption of messages may be provided at the message transport layer of the distributed computing environment. Services that request an encrypted transport may do so by tagging the XML advertisement. The gate factory may then create a gate (or gates) that uses a secure message transport such as those provided by Bluetooth and HTTPS.

HTTPS (Secure Hypertext Transfer Protocol) is a Web protocol that encrypts and decrypts user page requests as well as the pages that are returned by the Web server. HTTPS uses a 40-bit key size for the RC4 stream encryption algorithm, which is considered an adequate degree of encryption for commercial exchange. HTTPS may be used as a transport in the distributed computing environment.

Bluetooth is an emerging peer-to-peer wireless communications standard. The Bluetooth key generation algorithms may be used in the distributed computing environment. Bluetooth may support encryption keys. Encryption keys are transport dependent, while client, service, and combination keys may be transport independent.

Figure 26A:
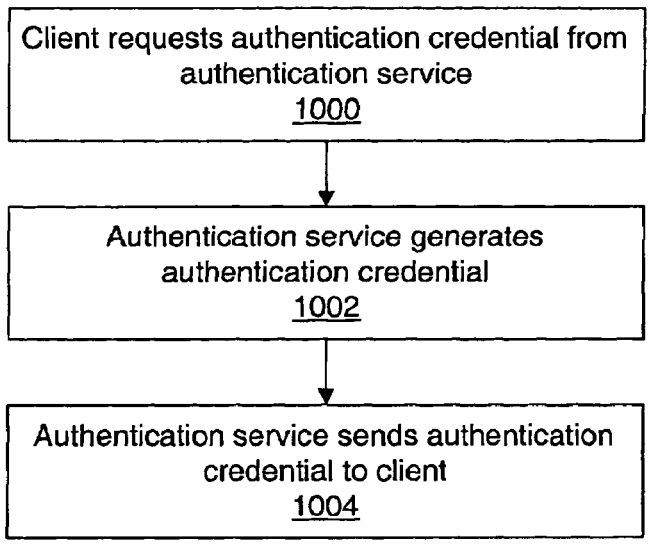
FIG. 26a is a flow diagram illustrating an authentication service providing an authentication credential to a client according to one embodiment.

FIG. 26a—An Authentication Service Providing an Authentication Credential to a Client FIG. 26a is a flow diagram illustrating an authentication service providing an authentication credential to a client according to one embodiment. A client in the distributed computing environment may desire a service to perform one or more functions on behalf of the client. In one embodiment, an authentication service may be provided for use by the client and the service when setting up a secure messaging channel. An authentication service may perform functions for the client and/or service including authenticating the client and/or service and negotiating the desired level of security and the set of messages that may be passed between the client and service. The authentication service may be a process that is executing within the distributed computing environment. The authentication service may be executing on the same device as the service and/or the client, or alternatively the authentication service may be executing on a separate device such as an authentication server. In one embodiment, the authentication service may be an Internet-based service. The authentication service may have its own address, for example, a Universal Resource Identifier (URI), through which the client and/or service may communicate with the authentication service. In one embodiment, the address of the authentication service may be provided to the client in the service advertisement for the service. The client and service sharing an authentication service may help insure that a secure messaging channel may be established between the client and the service, as any of several security and authentication protocols may be used in the messaging channel.

In one embodiment, a client may present a client identification token or credential to an authentication service. The client token or credential may be sufficiently unforgeable to be used as proof of the client's identity. The authentication service may then check the client identification token or credential, and issue to the client an authentication credential that only the authentication service can create. The authentication credential that is returned to the client is then sent in every message by the client to the service. In one embodiment, the client message gate is created by a gate factory, which includes the authentication credential in the message gate, and thus the message gate includes the authentication credential in every message that it sends to the service on behalf of the client. When receiving a message, the service may then check the authentication credential. Since only the authentication service can create the authentication credential, the service knows that the client did not forge the authentication credential. In one embodiment, the service may pass the authentication credential to the same authentication service used by the client to ensure the authentication credential is valid, to verify that the client is an authorized client, and to find out the identity of the client.

All services, including space services and authentication services, may authenticate their clients. Once a service authenticates a client, the client may access the service. For example, in the case of a space service, a client may then obtain XML advertisements from the space.

In one embodiment, a service may have a prearranged credential that all clients of the service are to use. In this embodiment, the authentication may provide the prearranged credential to a requesting client. Any client presenting the prearranged credential to the service may be approved by the service.

In step 1000, the client may request an authentication credential from the authentication service. In one embodiment, the client may search for and locate a service advertisement for the desired service. In one embodiment, the service advertisement may include an advertisement for the authentication service to be used to obtain an authentication credential to be used in accessing the service. In one embodiment, the service advertisement may include an address such as a URI for the authentication service. In one embodiment, the client may send information to the authentication service requesting the authentication credential. In one embodiment, the client may send information to a gate creation process, for example, a gate factory, and the gate creation process may access the authentication service to obtain the authentication credential.

In step 1002, the authentication service may generate an authentication credential for the client. The authentication credential may be a data element or data structure that may be embedded in messages in a messaging system and that may allow receivers of the messages to authenticate the sender of the message, to verify the message is from an authorized sender, and to verify that the message is a message the sender is allowed to send to the receiver. In one embodiment of a distributed computing environment, an authentication credential may be unique to the messaging channel set up between a particular client and a particular service. Step 1002 is further illustrated and described in FIG. 26b. In step 1004 of FIG. 26a, the authentication service may return the authentication credential to the client. In one embodiment, the authentication credential may be returned directly to the client. In one embodiment, the authentication credential may be returned to a gate creation process, for example, a gate factory, which may then use the authentication credential in generating a gate.

Figure 26B:
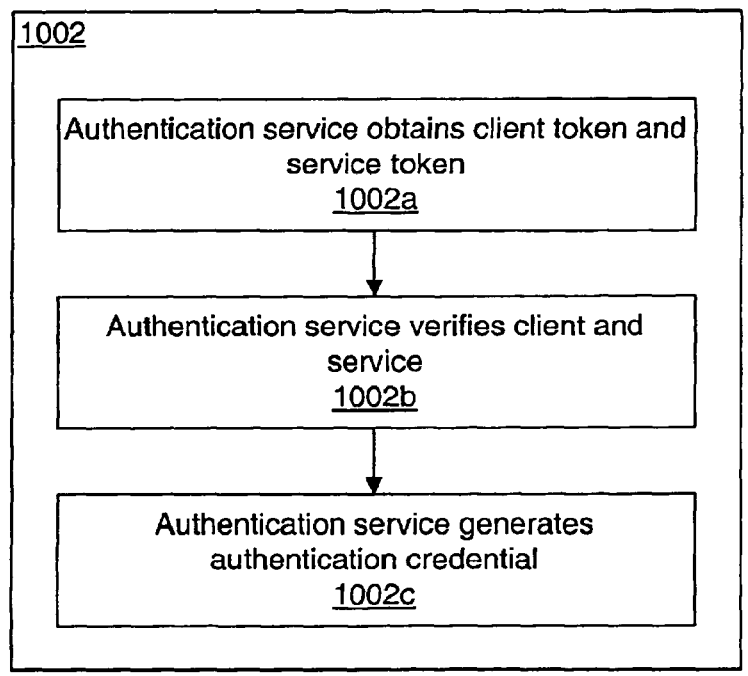
FIG. 26b is a flow diagram expanding on step 1002 of FIG. 26a and illustrating an authentication service generating an authentication credential according to one embodiment.

FIG. 26b—An Authentication Service Generating an Authentication Credential

FIG. 26b is a flow diagram expanding on step 1002 of FIG. 26a and illustrating an authentication service generating an authentication credential according to one embodiment. In step 1002a, in one embodiment, the authentication service may obtain a client token and a service token. In another embodiment, the authentication service may obtain only a client token. In one embodiment, the client token may be a unique identifier for the client in the distributed computing environment. In one embodiment, the service token may be a unique identifier for the service in the distributed computing environment. For example, the public keys from a public/private key encryption mechanism may be used as unique identifiers for the client and the service. In one embodiment, the client may receive the service token in the service advertisement, and the client may provide the client token and the service token to the authentication service. In another embodiment, the client may provide the client token and the service advertisement URI to the authentication service, and the authentication service may retrieve the service token from the service advertisement.

In step 1002b, the authentication service may verify the client and/or the service. In one embodiment, the authentication service may use the client token and the service token obtained in step 1002a to verify the client and/or service. In another embodiment, only a client token was obtained in step 1002a, and thus only the client token is used to verify the client in step 1002b. In one embodiment, the client may have previously registered its client token with the authentication service, and the authentication service may compare the received client token to the registered client token to verify the client as a valid client. In one embodiment, the client may access the authentication service using a challenge/response mechanism such as a logon account with password and thus may be verified as a valid client. In one embodiment, the service may have previously registered with the authentication service, and may have provided its service token to the authentication service. The authentication service may then verify that the client is attempting to access a valid service by comparing the received service token to the previously registered service token. Other types of client and service authentication may also be used. For example, the client may provide a digital signature or digital certificate that the authentication service may use to authenticate the client and/or to authenticate the service the client is trying to access.

In step 1002c, the authentication service may generate an authentication credential. In one embodiment, the authentication credential may generate an authentication token that only the authentication service can create. In one embodiment, the authentication service may use the client token and the service token in generating the authentication credential. In another embodiment, the authentication service may use just the client token to generate the authentication credential. In yet another embodiment, the authentication service may not use an obtained token in the generation of the authentication credential, but may instead use an authentication credential generation algorithm to generate a substantially unforgeable authentication credential. In one embodiment, the authentication service may combine the service token and client token to create a unique authentication credential. For example, the service token and client token may be 64-bit values, and the two tokens may be combined to generate a 128-bit authentication credential. Other embodiments may use other methods to generate an authentication credential.

Bridging Devices to the Distributed Network Environment

There may be devices, external to the distributed computing environment, which do not support the message passing model implemented by the distributed computing environment. These devices may provide services that may be useful to clients in the distributed computing environment. The distributed computing environment may include a mechanism to bridge such external devices to the distributed computing environment so that the services offered on such devices may be accessed by clients in the distributed computing environment. The distributed computing environment may also leverage existing device discovery protocols for discovering such external devices for use in the distributed computing environment.

Many technologies define discovery protocols for publishing and monitoring a network's device composition. These technologies include, but are not limited to: Jini, SLP, Bluetooth, and UPnP. Furthermore, many I/O buses such as LonWorks, USB and 1394 also support dynamic discovery protocols. The distributed computing environment may leverage device discovery technologies by wrapping their implementations in an API. Leveraging other device discovery protocols and providing a method to bridge to other discovery protocols may allow the distributed computing environment to discover devices or services on a wide variety of network and I/O buses. Device discovery in the distributed computing environment may thus be applicable to a wide range of devices including small devices such as PDAs, even if they do not participate directly in the distributed computing environment. Discovery protocols may be defined at the message level.

A bridging mechanism may be provided for "wrapping" one or more specific device discovery protocols, such as Bluetooth's, in a messaging API for the distributed computing environment. Wrapping may include framing the device discovery protocol with code and/or data (the API) so that the protocol can be run by clients and/or services in the distributed computing environment that would not otherwise be able to run it. When run, the bridging mechanism may allow for a discovery agent that discovers devices by a specific device discovery protocol to publish services for those devices in a space in the distributed computing environment. The services present an XML message schema interface to clients in the distributed network environment, and are capable of operating the various devices discovered by the specific device discovery protocol. Thus, service advertisements may be published for the services that operate the various devices discovered by the underlying wrapped device discovery protocols. The advertised services thus bridge devices (or services) external to the distributed network environment to clients on the distributed network environment.

FIG. 27 illustrates one embodiment of a distributed computing environment with a space 1200. One or more discovery agents 1204 may participate in an external discovery protocol and bridge to the distributed computing environment through bridging mechanism 1202. When the wrapped device discovery protocols are run, discovery agents 1204 through bridging mechanism 1202 may publish service advertisements 1206a–1206c in space 1200, wherein each one of advertisements 1206a–1206c corresponds to a device or service discovered by one of discovery protocols 1204 outside the distributed computing environment. Clients may then access the external devices using the service advertisements 1206a–1206c in space 1200 to instantiate services on one of the agents 1204 that operates the corresponding external device or service.

Thus, clients of the distributed computing environment may use discovery agents wrapping device discovery protocols to find devices. A service acting as a bridge to these devices may be published in a space and advertised, so clients of the distributed computing environment may access the services provided by the external devices. The advertised service is a service within the distributed computing environment that is able to invoke a device outside the distributed computing environment via another protocol or environment, thus bridging the outside device/service to the distributed computing environment. A client within the distributed computing environment "sees" only the advertised service within the distributed computing environment and may not even be aware of the outside device/service.

In one embodiment, the distributed computing environment may provide a version of a space discovery message protocol, such as the discovery protocol described in the Spaces section, that may be mapped to an underlying external device discovery protocol, including the wrapped device discovery protocols described above. The mapped discovery protocol may register itself or be registered with a space, e.g. a default space, by placing an advertisement in that space. For each advertised discovery protocol, a subsequent results space to hold the results of the discovery protocol may be provided.

Figure 28:
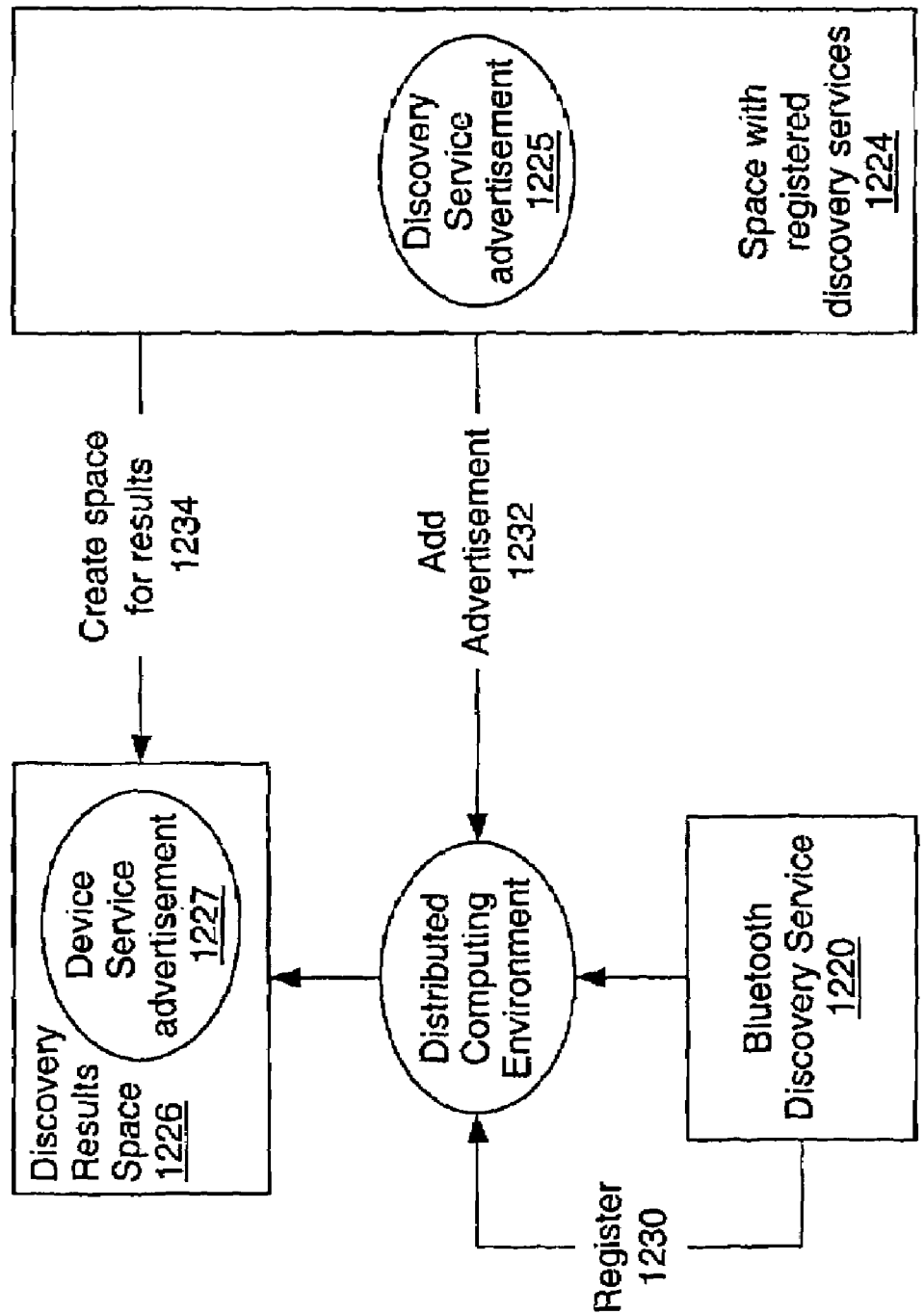
FIG. 28 illustrates an example of a space discovery protocol mapped to an external discovery service according to one embodiment.

FIG. 28 illustrates an example of the space discovery protocol mapped to a Bluetooth discovery service 1220 according to one embodiment. The Bluetooth discovery service 1220 may first register 1230 with the distributed computing environment. The Bluetooth discovery service 1220 may be wrapped in a bridging API, and an advertisement 1225 for the discovery service 1220 may be added 1232 in space 1224. A client or service may locate the discovery service advertisement 1225 on space 1224. When the discovery service 1220 is executed (utilizing the API wrapper as a bridge between the discovery protocol 1220 and the distributed computing environment 1222), a new space 1226 may be created 1234 to store the results of the discovery process. The discovery service 1220 may store the results (again through the API wrapper) to discovery results space 1226 as one or more advertisements 1227. Alternatively, results of executing discovery service 1220 may be stored to space 1224 or other pre-existing spaces in the distributed computing environment. A similar method as illustrated in FIG. 28 may be used to discover devices and other services using other underlying discovery protocols.

As mentioned above, there may be devices, external to the distributed network environment, which do not support the message passing model implemented by the distributed network environment. These devices may have clients that may want to use services provided in the distributed computing environment. The distributed computing environment may provide a mechanism to bridge the external clients or client devices to the distributed computing environment so that the clients on the external devices may access services in the distributed computing environment.

Agents may be provided that serve as clients in the distributed computing environment to bridge external clients to the distributed computing environment, allowing the external clients to access services published in the distributed computing environment. In one embodiment, an agent may have an XML-enabled back end capable of communicating with services in the distributed computing environment using the message passing model, and a proprietary protocol (e.g. a protocol supported by the external device) on the front end to interface to the external device, and thus to the external client. Thus, a client external to the distributed computing environment may locate and access services in the distributed computing environment through the bridging agent, and may send requests to the services and receive responses from the services, including results data. For example, an external client may use the bridging agent to run space discovery in the distributed computing environment, look up advertised services, and invoke services in the distributed computing environment.

In one embodiment, the distributed computing environment may provide a bridging mechanism for accessing Jini services from a distributed computing environment client. Since Jini services may require Remote Method Invocation (RMI), and since clients in the distributed computing environment may communicate to services using messages such as XML messages, a protocol bridging mechanism may be provided to enable the access of a Jini Service by a distributed computing environment client. In one embodiment, a connector mechanism may be defined that enables the dynamic advertisement of Jini services in distributed computing environment spaces, and that also may enable the accessing of a Jini service proxy from clients in the distributed computing environment. In one embodiment, there may be Jini services that may not be bridged to the distributed computing environment.

FIG. 29 illustrates bridging a client 1250 external to the distributed computing environment to a space 1254 in the distributed computing environment. Bridging agent 1252 may serve as the go-between between client 1250 and space 1254. Bridging agent 1252 may communicate with client 1250 in a communications protocol understandable by the client 1250. Bridging agent 1252 may map the client's communications protocol into the XML messaging protocol necessary to communicate with space 1254 perform the facilities provided by space 1254. Bridging agent 1252, at client 1250's request, may locate and run services on space 1254. For example, client 1250 may request a list of all services of a particular type from space 1254. Bridging agent 1252 may locate service advertisements 1256a–c and return the results to client 1250. Alternatively, the results may be posted in a results space, and the location of the results may be returned to the client 1250. Client 1250 may then choose to execute service advertisement 1256a, and may send a message (in the client 1250's communications protocol) to bridging agent 1252. Bridging agent 1252 may then send the XML request message(s) necessary to execute the service represented by service advertisement 1256a, and may return the results of the service to client 1250. Methods of handling the results of the service other than directly returning the results to the client 1250 may be used as described above in the section titled Spaces. Bridging agent 1252 thus may act as a service of the external client 1250 (via the external client's protocol) and as a client within the distributed computing environment to bridge a service within the distributed computing environment to the external client.

Sometimes, even within the distributed computing environment, clients and services cannot directly communicate with each other, only to a common space. In this case, the space service will automatically create a service proxy that bridges client to service. The proxy's main job is to route messages between client and service through the space. The service proxy may be created dynamically. The creation mechanism may be dependent upon space implementation.

Refer to FIG. 30 for an illustration of a proxy mechanism. A client 554 and a service 556 may not be able to communicate directly within the distributed computing environment, e.g., because they support different transport or network protocols. However, they both may be able to communicate with a space 552 that supports both protocols. The space service may create a proxy 550 to bridge the client 554 to the service 556. A common form of proxy is a browser proxy. A browser proxy (most commonly implemented as a servlet) may translate conventional Web page requests into messages. Refer also to the description of space search services (and proxies therefore) in the Spaces section herein.

In the computer industry, an enterprise may be a corporation, small business, non-profit institution, government entity, or other kinds of organization. An enterprise may utilize a enterprise computing environment for conducting a portion of its business. The enterprise computing environment may include various enterprise services. Clients in the distributed computing environment may desire to use services in the enterprise computing environment.

The distributed computing environment may provide a mechanism for bridging clients in the distributed computing environment to enterprise services. In one embodiment of a distributed computing environment, a method for bridging clients to enterprise services may include a client within the distributed computing environment, a bridge service within the distributed computing environment, and an enterprise service within the enterprise environment. The distributed computing environment bridge service serves as a bridge service between the client and the enterprise service.

The bridge service interacts with the client via XML message passing to gather input parameters necessary to make requests to the enterprise service outside of the distributed network environment. For example, the bridge service may be looked up and instantiated by the client just as any other service in the distributed computing environment. The bridge service then may interact with the enterprise service to run the enterprise service. This interaction may use an interprocess communications architecture that the enterprise service can understand. As an example, if an enterprise service is implemented with Enterprise JavaBeans (EJB), a bridge service may communicate with the enterprise service using EJB. The bridge service may then receive results from the enterprise service and may return the results directly to the client (in XML messages) or may place the results in a space in the distributed network environment (e.g. a results space). To the client, the bridge service appears to be the only service (the enterprise service is hidden to the client), so the client does not have to support the architecture of the enterprise service. Multiple distributed network environment clients may use the same bridge service (each using a unique gate pair) to interact with the enterprise service.

Client Displays

There are several methods in which results from a service run by a client may be displayed in a distributed computing environment. Devices that may display results may include, but are not limited to: CRTs on computers; LCDs on laptops, notebooks displays, etc; printers; speakers; and any other device capable of displaying results of the service in visual, audio, or other perceptible format. The methods for displaying results may include, but are not limited to:

The service may return results to a client directly or by reference, and the client may handle the display of the results.

The service may return results to a client directly or by reference, and the client may pass the results to a display service directly or by reference, and the display service may display the results.

The service may directly handle the displaying of the results.

The service may pass the results to a display service directly or by reference, and the display service may display the results.

In the last method of displaying results, the display service may be specified by the client. For example, there may be a display service on or associated with the device on which the client resides that the client wishes to use to display the results of the service. When the client runs the service, the client may send a message to the service specifying the service advertisement of the client's display service. The service may then build a gate that allows it to send messages to the client's display service. Thus, when displaying results, the service invoked by the client becomes a client of the client's display service and send its results (directly or by reference) for display to that display service. More detail on the client-service relationship, gates, and messaging is included in other sections of this document.

Figure 31:
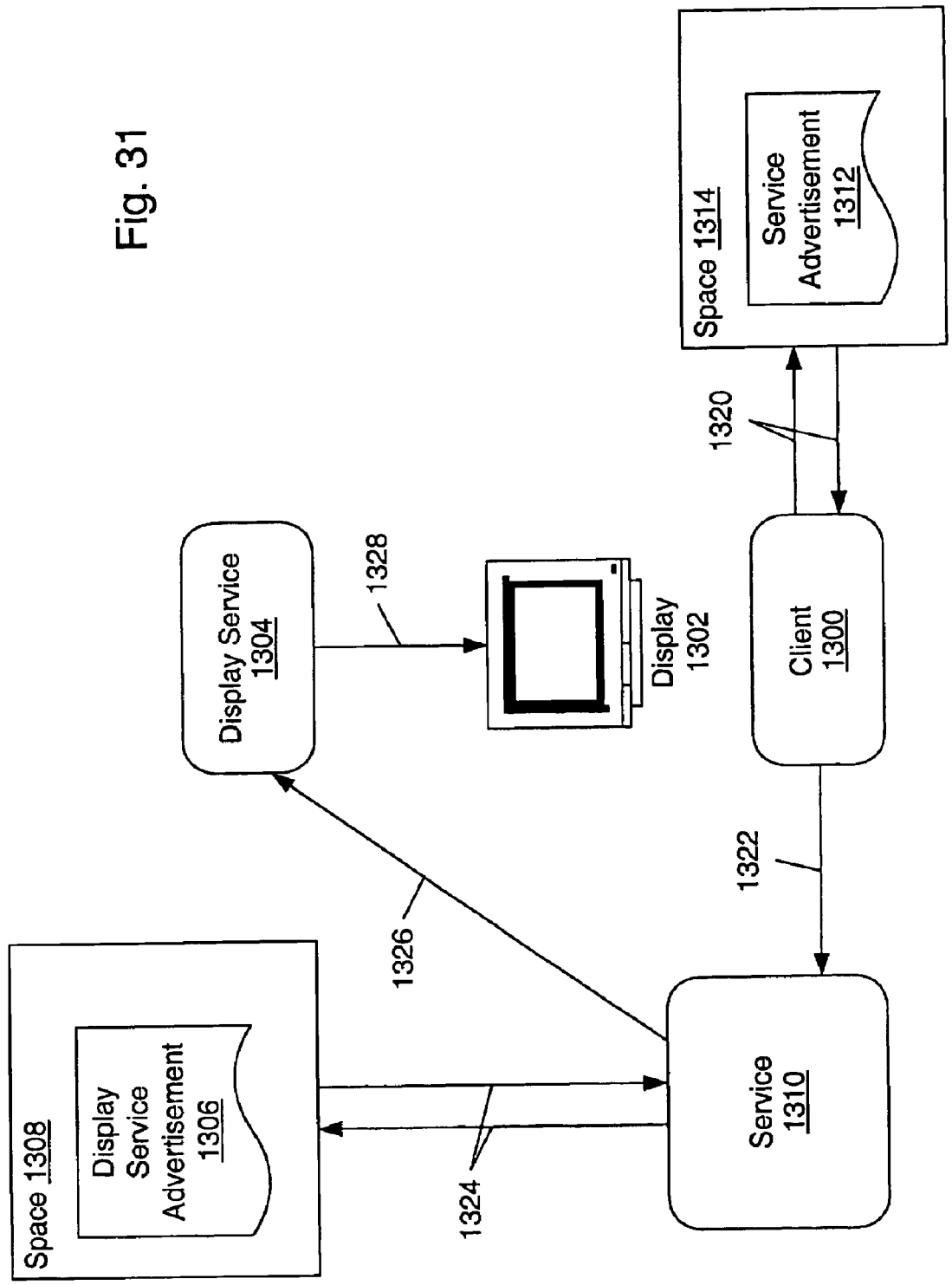
FIG. 31 illustrates one embodiment of a client with an associated display and display service according to one embodiment.

FIG. 31 illustrates one embodiment of a client 1300 with associated display 1302 and display service 1304 according to one embodiment.

Conventional application models are typically based on predetermined, largely static user interface and/or data characteristics. Changes to conventional applications may require code modification and recompilation. The mechanisms described for advertising services and for specifying XML message schemas for communicating with services in the distributed computing environment may be used to provide a mechanism for applications (clients, services, etc) to describe dynamic display objects. Using the dynamic display objects, application behavior may be altered without having to download new code, recompile, or relink the application.

FIGS. 32A and 32B illustrate examples of using schemas of dynamic display objects according to one embodiment.

Display schemas may be provided for displaying the same results in different formats, for extracting portions of the results for display, and for displaying the results on different display devices.

String Management

String handling in conventional systems is generally not very efficient, especially for variable sized strings, and may be wasteful of memory space, e.g. as the string is copied and/or moved in memory. This inefficiency in string handling may be particularly problematic in small memory footprint systems such as embedded systems. Thus, a more efficient method of handling strings in programs executing within small footprint systems such as embedded systems is desirable.

Figure 33A:
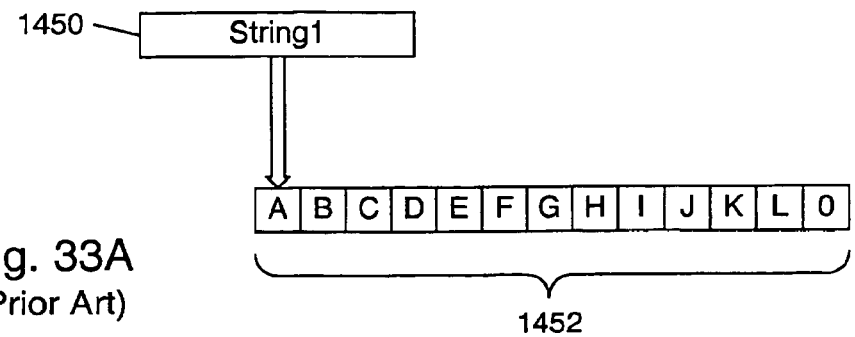
FIG. 33A illustrates a typical string representation in the C programming language.

FIG. 33A illustrates a typical string representation in the C programming language.

Figure 33B:
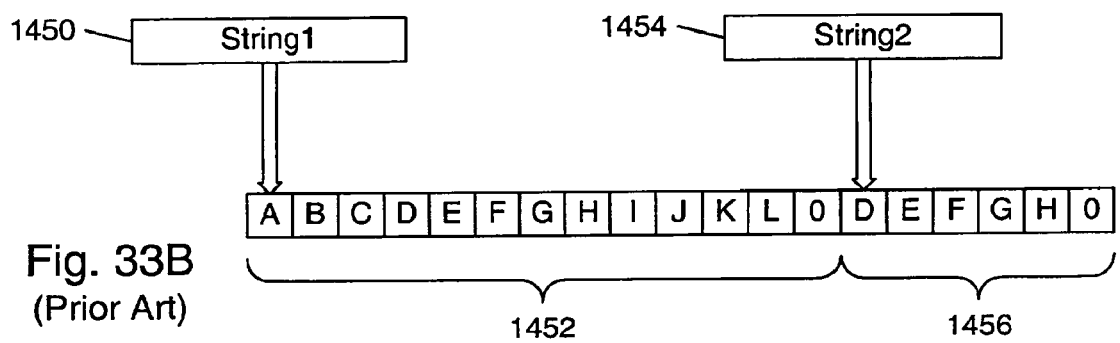
FIG. 33B illustrates an example of a conventional string function.

FIG. 33B illustrates an example of the results of the strncpy( ) function on string 1452, when strncpy( ) is called with the following parameters:

strncpy(string2, string1+3, 5);

where string2 is character pointer 1454 pointing to the first byte after the terminating character of string 1452, string1+3 is character pointer 1450 incremented by 3 bytes, and 5 is the number of characters (bytes) to be copied from the source location string1+3 to string2.

Figure 33C:
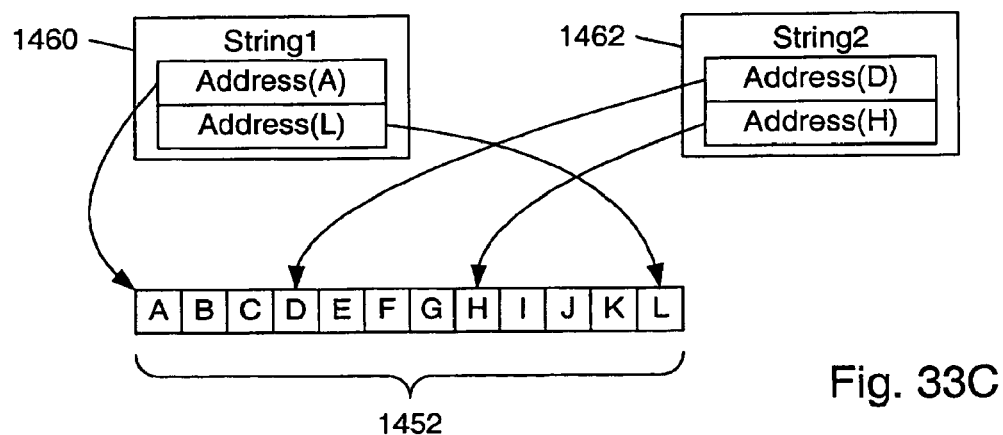
FIG. 33C illustrates an efficient method for representing and managing strings in general, and in small footprint systems such as embedded systems in particular according to one embodiment.

FIG. 33C illustrates an efficient method for representing and managing strings in general, and in small footprint systems such as embedded systems in particular.

The string handling structures and methods as described in FIG. 33C may be used, along with the hierarchical structure of XML documents, to provide more efficient handling of XML text (such as XML messages) in systems with small memory footprints such as embedded systems.

The hierarchical structure of XML documents may allow them to be processed in a recursive fashion with successively smaller portions of the document processed at each level of recursion. References to various portions are recorded and processed recursively. String structures as described in regard to FIG. 33C may be used to record the various portions. In this manner, the content of specific XML tags, in one embodiment the smallest unit of the XML document processed recursively, may be determined efficiently. Documents with repeated tags in the same scope may also be handled efficiently, as tags within a given scope may be enumerated and processed efficiently.

Using the string structures with the recursive processing allows the processing to be done without creating copies of the subsections for processing. Copying of subsections may be particularly costly in recursive processing, because as the recursion goes deeper, more and more copies of the same data are made. Using the string structures, only the string structure containing the pointers to the first and last bytes in the subsection needs to be created and passed down to the next level. Other operations, such as determining the length of a subsection, may be performed efficiently using the address information stored in the string structures. Also, by using the string structures, terminating characters such as those used to terminate C strings are not necessary, conserving memory in small footprint devices such as embedded devices.

XML Representation of Objects

As previously mentioned, Jini RMI may not be practical for some clients, such as thin clients with minimal memory footprints and minimal bandwidth. The serialization associated with the Jini RMI is slow, big, requires the JVM reflection API, and is a Java specific object representation. Java deserialization is also slow, big and requires a serialized-object parser. Even Java based thin clients may not be able to accept huge Java objects (along with needed classes) being returned (necessarily) across the network to the client, as required in Jini.

A more scalable distributed computing mechanism may be provided by embodiments of a distributed computing environment. A distributed computing environment may include an API layer for facilitating distributed computing. The API layer provides send message and receive message capabilities between clients and services. This messaging API may provide an interface for simple messages in a representation data or meta-data format, such as in the eXtensible Mark-up Language (XML). Note that while embodiments are described herein employing XML, other meta-data type languages or formats may be used in alternate embodiments. In some embodiments, the API layer may also provide an interface for messages to communicate between objects or to pass objects, such as Java objects. Objects accessible through API layer 102 are represented by a representation data format, such as XML. Thus, an XML representation of an object may be manipulated, as opposed to the object itself.

The API layer may sit on top of a messaging layer. The messaging layer may be based on a representation data format, such as XML. In one embodiment, XML messages are generated by the messaging layer according to calls to the API layer. The messaging layer may provide defined static messages that may be sent between clients and services. Messaging layer may also provide for dynamically generated messages. In one embodiment, an object, such as a Java object, may be dynamically converted (compiled) into an XML representation. The object may include code and/or data portions. The object's code and/or data portions may be compiled into code and data segments identified by XML tags in the XML representation. The messaging layer may then send the XML object representation as a message. Conversely, the messaging layer may receive an XML representation of an object. The object may then be reconstituted (decompiled) from that message. The reconstitution may examine the XML representation for tags identifying code and/or data segments of the XML representation, and use information stored in the tags to identify and decompile the code and/or data portions of the object.

Creating and Sending an XML Representation of an Object

Figure 34:
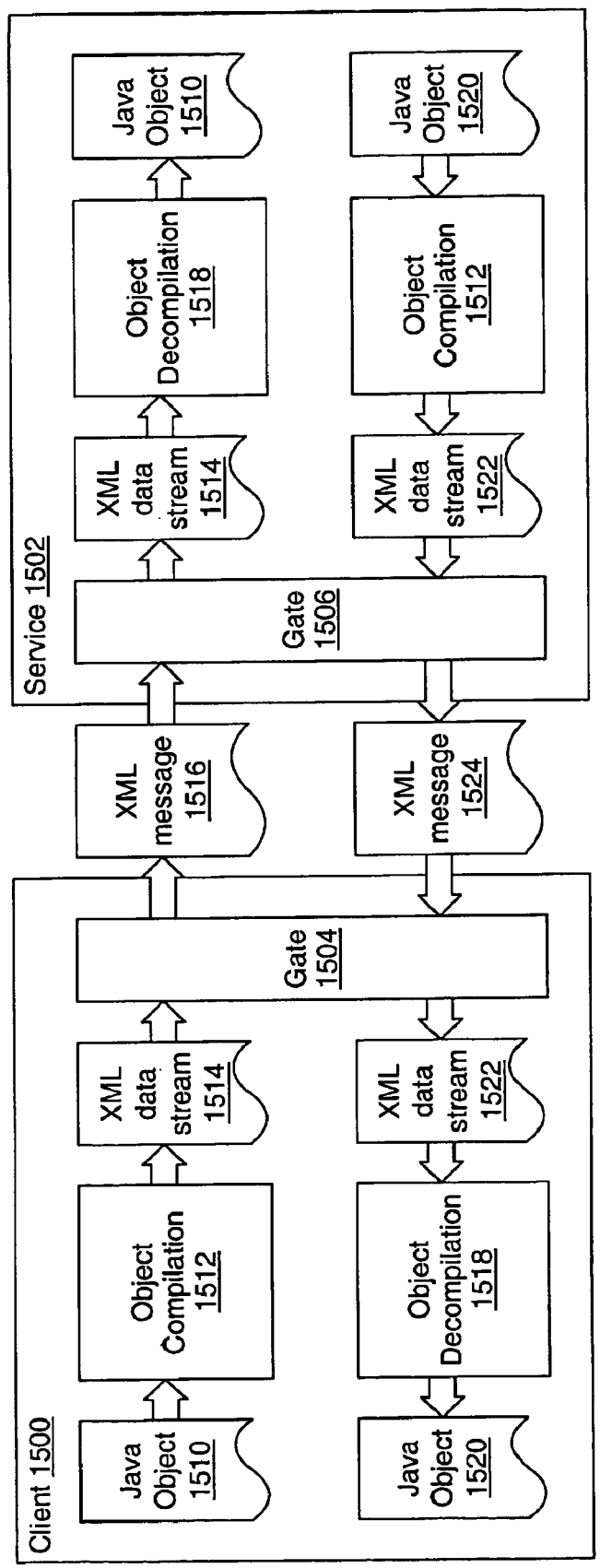
FIG. 34 illustrates a process of moving objects between a client and a service according to one embodiment.

FIG. 34 illustrates a process of moving Java objects between a client 1500 and a service 1502 according to one embodiment of the invention. Service 1502 may be any service supported in the distributed computing environment, including space services. Client 1500 employs a gate 1504, which may have been created using an XML schema received from a service advertisement for service 1502, to communicate with a corresponding gate 1506 for service 1502. At some point, client 1500 may need to send Java object 1510 to service 1502. Java object 1510 may reference other objects, which may reference other objects, and so on. Java object 1510 and its referenced objects, the objects they reference, and so on, may be referred to as an object graph.

Java object 1510 may be passed to a Java object compilation process 1512 to be compiled to produce an XML representation of the object graph. The XML representation of the object graph may be passed as an XML data stream 1514 to gate 1504. The XML data stream 1514 may include an XML representation of all the objects in the object graph. In one embodiment, the objects in the object graph may be stored recursively in the XML data stream 1514.

Gate 1504 may then package the XML data stream 1514 in a message 1516 and send the message 1516 to gate 1506 of service 1502. Gate 1506 may extract the XML data stream 1514 from XML message 1516 and send the XML data stream 1514 to an XML data stream decompilation process 1518 to be decompiled to produce the object(s) comprising the object graph, including Java object 1510. In one embodiment, the objects in the object graph may be stored recursively in the XML data stream 1514, and thus a recursive decompilation process may be used.

When service 1502 needs to send a Java object to client 1500, a substantially similar process may be used. Java object 1520 may be passed to a Java object compilation process 1512 to be compiled to produce an XML representation of the object graph. The XML representation of the object graph may be passed as an XML data stream 1522 to gate 1506. Gate 1506 may then package the XML data stream 1522 in a message 1524 and send the message 1524 to gate 1504 of client 1500. Gate 1504 may extract the XML data stream 1522 from XML message 1524 and send the XML data stream 1522 to an XML data stream decompilation process 1518 to be decompiled to produce the object(s) comprising the object graph, including Java object 1520.

In another embodiment, the gates may be responsible for the compilation and decompilation of Java objects. In this embodiment, Java object 1510 may be passed to gate 1504. Gate 1504 may then pass object 1510 to a Java object compilation process 1512 to be compiled to produce an XML representation of the object graph in an XML data stream 1514. Gate 1504 may then package the XML data stream 1514 in a message 1516 and send the message 1516 to gate 1506 of service 1502. Gate 1506 may extract the XML data stream 1514 from XML message 1516 and send the XML data stream 1514 to an XML data stream decompilation process 1518 to be decompiled to produce the object(s) comprising the object graph, including Java object 1510. Sending a Java object from service 1502 to client 1500 may be substantially similar.

In one embodiment, object compilation process 1512 and object decompilation process 1518 may both exist on the client 1500 and the service 1502, and may be programmed to perform compilation and decompilation substantially similarly on the two devices, thus ensuring the object(s) output on one end are substantially identical to the object(s) input on the other end. In one embodiment, XML schemas including descriptions of Java objects may be used on both the client and/or the service in the compilation and decompilation processes. In one embodiment, XML schema(s) to be used in the compilation and decompilation of Java objects may be passed by the service to the client in the service advertisement.

XML provides a language- and platform-independent object representation format. Thus, the process as illustrated in FIG. 34 where an object is compiled into an XML representation of the object and decompiled to reproduce the object may not be limited to moving Java objects, but in some embodiments may be applied to moving objects of other types between entities in a network.

JVM Compilation/Decompilation API

FIGS. 35*a* and 35*b* are data flow diagrams illustrating embodiments where a virtual machine (e.g. JVM) includes extensions for compiling objects (e.g. Java Objects) into XML representations of the objects, and for decompiling XML representations of (Java) objects into (Java) objects. The JVM may supply an Applications Programming Interface (API) to the compilation/decompilation extensions. The client 1500 and service 1502 may be executing within JVMs. The JVMs may be on the same device or on different devices.

In both FIG. 35*a* and FIG. 35*b*, the JVM XML compiler/decompiler API 1530 may accept a Java object 1510 as input, and output an XML representation of the object 1510 and all its referenced objects (the object graph of object 1510) in an XML data stream 1514. In addition, the JVM XML compiler/decompiler API 1530 may accept an XML data stream 1522, which includes an XML representation of object 1520 and all its referenced objects (the object graph of object 1520), and output Java object 1520 (and all the objects in its object graph).

FIG. 35*a* illustrates one embodiment where, when sending Java object 1510, the JVM XML compiler/decompiler API 1530 is called by the client. The client 1510 passes Java object 1510 to the API 1530, which compiles the object to produce its XML representation, stores the XML representation in XML data stream 1514, and outputs XML data stream 1514. XML data stream 1514 may then be passed to gate 1504 by the client. Gate 1504 may then package the XML data stream 1514 in an XML message 1516 and send message 1516 to service 1502.

Upon receiving XML message 1524 from service 1502, gate 1522 may extract XML data stream 1522 from message 1524 and pass data stream 1522 to client 1500. Client 1500 may then call the JVM XML compiler/decompiler API 1530, passing API 1530 the XML data stream 1522. The API 1530 may then decompile the XML data stream 1522 to produce Java object 1520 and other objects in its object graph, returning the objects to client 1500.

FIG. 35*b* illustrates another embodiment where, when sending Java object 1510, the JVM XML compiler/decompiler API 1530 is called by the gate. The client 1510 passes Java object 1510 to gate 1504. Gate 1504 then passes object 1510 to API 1530, which compiles the object to produce its XML representation, stores the XML representation in XML data stream 1514, and outputs XML data stream 1514. Gate 1504 may then package the XML data stream 1514 in an XML message 1516 and send message 1516 to service 1502.

Upon receiving XML message 1524 from service 1502, gate 1522 may extract XML data stream 1522 from message 1524 and pass data stream 1522 to the JVM XML compiler/decompiler API 1530. The API 1530 may then decompile the XML data stream 1522 to produce Java object 1520 and other objects in its object graph. The gate may then send Java object 1520 and the other objects to client 1500.

In one embodiment, the JVM XML compiler and decompiler may be implemented as integrated functions of the JVM. In another embodiment, the XML compiler and decompiler may be embodied in API method invocations in standard extensions to the JVM; thus, the core JVM does not have to be modified. The JVM may supply the JVM XML compiler/decompiler API 1530 to processes (clients and/or services) executing within the JVM to allow the processes to access the Java object compilation/decompilation functionality provided by the JVM. In one embodiment, for a process to utilize the object compilation/decompilation, the JVM within which the process is executing must have the JVM XML compiler/decompiler functionality and API 1530.

Methods using reflection and serialization to transform and send objects are typically implemented in applications separate from the JVM. The application must repeatedly access the JVM to pick apart an object one field at a time as the transitive closure of the object is dynamically analyzed. This tends to be a slow and cumbersome process, while also requiring large amounts of application and JVM code.

Implementing the Java object compilation/decompilation functionality within the JVM is advantageous because the JVM already understands the concept of, and contents of, an object graph. Thus, the compilation/decompilation functions may leverage the knowledge (and reuse code) of the JVM in parsing the object graph to produce the XML representation, and in parsing the XML representation to produce the object graph. Thus, the compilation/decompilation functions may not have to duplicate functionality that is provided by the JVM, as do object sending methods using reflection and serialization. This may allow the code footprint of the compilation/decompilation functions to be smaller than that of object sending methods using reflection and serialization. Also, an object may be complied or decompiled by a single call to the JVM XML compiler/decompiler API.

In addition, integrating the compilation/decompilation of objects with the JVM may allow the compilation and decompilation of objects to be performed faster than methods using reflection and serialization because, in the object traversal model implemented with reflection and serialization, the code outside the JVM does not know the structure or graph of the Java object, and thus must traverse the object graph, pulling it apart, and ultimately must repeatedly call upon the JVM to do the compilation (and the reverse process for decompilation). This process may be slowed by the necessity of making repeated calls to the JVM, outside the code. Having the compilation and decompilation functionality integrated with the JVM, as described herein, avoids having to make repeated calls from code outside the JVM to the JVM. In one embodiment, an object may be complied or decompiled by a single call to the JVM XML compiler/decompiler API.

In one embodiment, the compilation/decompilation functionality may be implemented as a service in the distributed computing environment. The service may publish a service advertisement in a space. A process in the distributed computing environment may use a search or discovery service to locate the compilation/decompilation service. The process (a client of the service) may then use the service by passing Java objects to be compiled into XML representations and/or XML representations to be decompiled into Java objects to the service.

Java objects may include code (the object's methods) and data. An object's code may be non-transient; the code does not change once the object is created. An object's data, however, may be transient. Two objects created from the same Java class may include identical code, but the data in the two objects may be different. In one embodiment, the compilation function may compile a Java object's data into an XML representation of the object, but may not include the object's actual code in the XML representation. In one embodiment, information about the object may be included in the compiled XML representation to indicate to the receiver how to recreate the code for the object. The XML representation may then be stored in an XML data stream and sent (e.g., in a message) to a receiving process (client or service). The receiving process may then pass the XML data stream to the decompilation function. The decompilation function may then decompile the XML data stream to produce the Java object including its data. In one embodiment, the code for the object may be reproduced by the decompilation function using information about the object in the XML representation, as the code for an object may be statically defined and the JVM receiving the object may be able to reproduce the code (if necessary) using its knowledge of the object.

In one embodiment, the XML representation of the object produced by the compilation function may include the Java object's data and information about the Java object. The information may include class information for the Java object. An object signature may be included in the information and may be used to identify the object's class, etc. The decompilation function may recreate the code for the Java object using the information about the Java object and may decompile the data from the XML data stream into the Java object. Thus, a complete object including its code and data may be reproduced on the JVM executing the receiving client or service from the decompiled data and the information describing the object. In one embodiment, the information describing the object may be stored in one or more XML tags. In one embodiment, the client or service receiving the XML data stream may include an XML schema that describes the object, and the XML schema may be used to reconstruct the Java object from the decompiled data and from the information about the Java object. The decompilation process may proceed recursively through the object graph, reconstructing the objects referenced by the object by decompiling the referenced objects' data from the XML data stream and recreating the referenced objects' code from information about the referenced objects in the XML data stream.

In one embodiment, the XML representation of the object produced by the compilation function may include the object's data and information that identifies the code of an object. In one embodiment, the information identifying the code of the object may be stored in one or more XML tags in the XML data stream. When received, the decompilation function may recreate the code for the Java object using the information about the code from the XML data stream and decompile the data for the object from the XML data stream. Thus, a complete object including its code and data may be reproduced on the JVM executing the receiving client or service from the decompiled data and the information describing the code of the object.

Several scenarios of using XML representations of objects to transfer objects between entities (typically clients and services) in a distributed computing environment are included for clarification. These scenarios are exemplary and are not intended to be limiting.

In a first scenario, a service may use the XML compiler/decompiler to compile a Java object into an XML representation of the object and send the XML representation to a client. The client may the use the XML compiler/decompiler to decompile the XML representation and perform operations on the data within the object, and later may use the XML compiler/decompiler to compile the object into an XML representation of the object and return the XML representation of the object to the service.

In a second scenario, a service may use the XML compiler/decompiler to compile a Java object into an XML representation of the object and send the XML representation to a client. The client may then send the XML representation to another service, which may use the XML compiler/decompiler to decompile the XML representation to reproduce the object, perform operations on the object at the request of the client (possibly modifying the data), use the XML compiler/decompiler to recompile the modified object into its XML representation, and send the XML representation of the object to the client.

In a third scenario, a service may use the XML compiler/decompiler to compile a Java object into an XML representation of the object and send the XML representation to an object repository or store space. The service may then send a message to a client informing the client of the location of the XML representation. The message may include a Universal Resource Identifier (URI) for the XML representation. The client may then retrieve the XML representation of the object from the store space, and may use the XML compiler/decompiler to decompile the representation to reproduce the object. Alternatively, the client may send the location of the XML representation of the object to another service, along with a request for operations to be performed on the object. The other service may then retrieve the XML representation from the store space, use the XML compiler/decompiler to decompile the XML representation to reproduce the object, and perform the requested operations on the object.

In a fourth scenario, a process (could be a client or service) may locate an object repository or store space in the distributed computing environment by searching for and finding a service advertisement for the store space. The process may, during execution, create or obtain a plurality of Java objects. The process may use the XML compiler/decompiler to compile one or more of the objects into XML representations of the objects, and may send, as a client of the store space service, the XML representations of the objects to the store space to be stored for possible later access, or for access by other processes.

Security Issues in the Decompilation of XML Representations of Objects

Spaces, as described herein, may serve as a file system in the distributed computing environment. Security may be provided for files in the system in the form of access rights. Access rights may be checked each time a file is accessed (opened, read, or written to). Thus, a method for providing file access security in the distributed computing environment may be desirable. This method may also be applied to the XML representations of Java objects that may be stored in spaces and transmitted between clients and services in the distributed computing environment.

In one embodiment, a user of a client on a device in the distributed computing environment may be identified and authenticated when first accessing the client. In one embodiment, the user may supply a physical identification such as a smart card for identification and authorization. In another embodiment, a challenge-response mechanism (such as user ID and password) may be used for identification and authorization. Yet another embodiment may use electronic identification such as a digital signature for identification and authorization. Any other method of identification and authorization may be used.

Once identified and authorized, the user may then perform various operations on the client, including accessing one or more services in the distributed computing environment. During these operations, as described above, one or more objects may be created or acquired elsewhere. The objects may be modified and may be compiled into XML representations of the objects and stored locally by the client or sent to a space service for (transitive or persistent) store. Some of the objects may be received from services (store services or other services) in the form of XML representations of the objects, which may be decompiled by the XML compiler/decompiler to recreate the objects on the client.

In one embodiment, during the decompilation of the XML representation of objects, each XML message may be checked to verify that the user has access rights to the object. If the user does not have the proper access rights, the XML compiler/decompiler may not decompile the object for the user. In one embodiment, a security exception may be thrown by the XML compiler/decompiler. In one embodiment, the user may be informed of the access violation.

Access right information, such as the creator and access levels allowed (creator-only access, read only, read/write, delete, copy, etc.) for the object may be embedded in the XML message(s) containing the XML representation of the object. Access authorization may be determined during the identification and authorization of the user. For example, the object may allow "read only" access for most users, and "read/write" access for the creator of the object. If the user tries to access an object using read/write access rights, and the object was not created by the user, the decompilation process may detect this as an access violation, and may disallow the access and notify the user.

In one embodiment, when the user is done using the client, the user may log off or otherwise signal the user is finished with the client (e.g. remove a smart card). Objects created on the client by decompilation may be automatically deleted when the client detects that the user is finished. This may prohibit future users from intentionally or accidentally accessing the user's objects. In one embodiment, all objects created by decompilation may be deleted upon detecting that the user is finished. In another embodiment, a method may be provided to store at least some of the objects created on the client persistently (e.g. with access rights information), so that the client may later access the objects, or provide the objects to other users for access.

In one embodiment, the user may have a "smart card" or other physical device to gain access to the client. The user may insert the smart card into the client device to begin the session. When the client is finished, the client may remove the smart card. The client may detect the removal of the smart card, and thus detect that the client is finished, and may then proceed to delete objects created by decompilation of XML representations.

XML-Based Object Repositories

In the distributed computing environment, processes (services and/or clients) may desire transient and/or persistent storage of objects such as XML schemas, service advertisements, results generated by services, XML representations of Java objects and/or objects implemented in other languages, etc. Existing object storage technologies tend to be language and/or operating system specific. These storage systems also tend to be too complicated to be used with small footprint systems such as embedded systems.

JavaSpaces in Jini is an existing object repository mechanism. A JavaSpace may be only capable of storing Java objects and may be too large to be implemented in small devices with limited amounts of memory. Each object in a JavaSpace may be serialized as previously described, and thus has the same limitations as previously described for the reflection and serialization techniques.

A store mechanism may be provided for the distributed computing environment that may be heterogeneous (not language or operating system dependent), that may scale from small to large devices, and that may provide transient or persistent storage of objects. In one embodiment, the store mechanism in the distributed computing environment may be implemented as an Internet Web page or set of pages defined in the XML markup language. XML provides a language- and platform-independent object representation format enabling Java and non-Java software to store and retrieve language-independent objects. Since the store mechanism is on the Web, devices of all types and sizes (small to large) may access the store mechanisms. Web browsers may be used to view the store mechanism implemented as Web pages. Web search engines may be used to search for contents in the store mechanism implemented as Web pages. Internet administration mechanisms (existing and future) and XML tools may be used to administer the XML-based store mechanisms.

In one embodiment, the store mechanisms may be used to store objects created, represented or encapsulated in XML. Examples of objects that may be stored in the store mechanisms may include, but are not limited to: XML schemas, XML representations of objects (for example, Java objects compiled into XML representations as described above), service advertisements, and service results (data) encapsulated in XML. In one embodiment, to prevent unauthorized access of an XML object, an authorization credential such as a digital signature or certificate may be included with the XML object, and a client wishing to access the XML object may be required to have the proper authorization credential to access the XML object. In one embodiment, the store mechanism may be a space as described in the Spaces section herein.

Store mechanisms may be services in the distributed computing environment. A store mechanism implemented as a service may be referred to as a "store service". A store service may publish an advertisement in a space. The space itself is an example of a store service. Some store services may be transient. For example, a space service that stores service advertisements may be a transient store. Other store services may be persistent. For example, a store service that stores results from services may be a persistent store.

Figure 36:
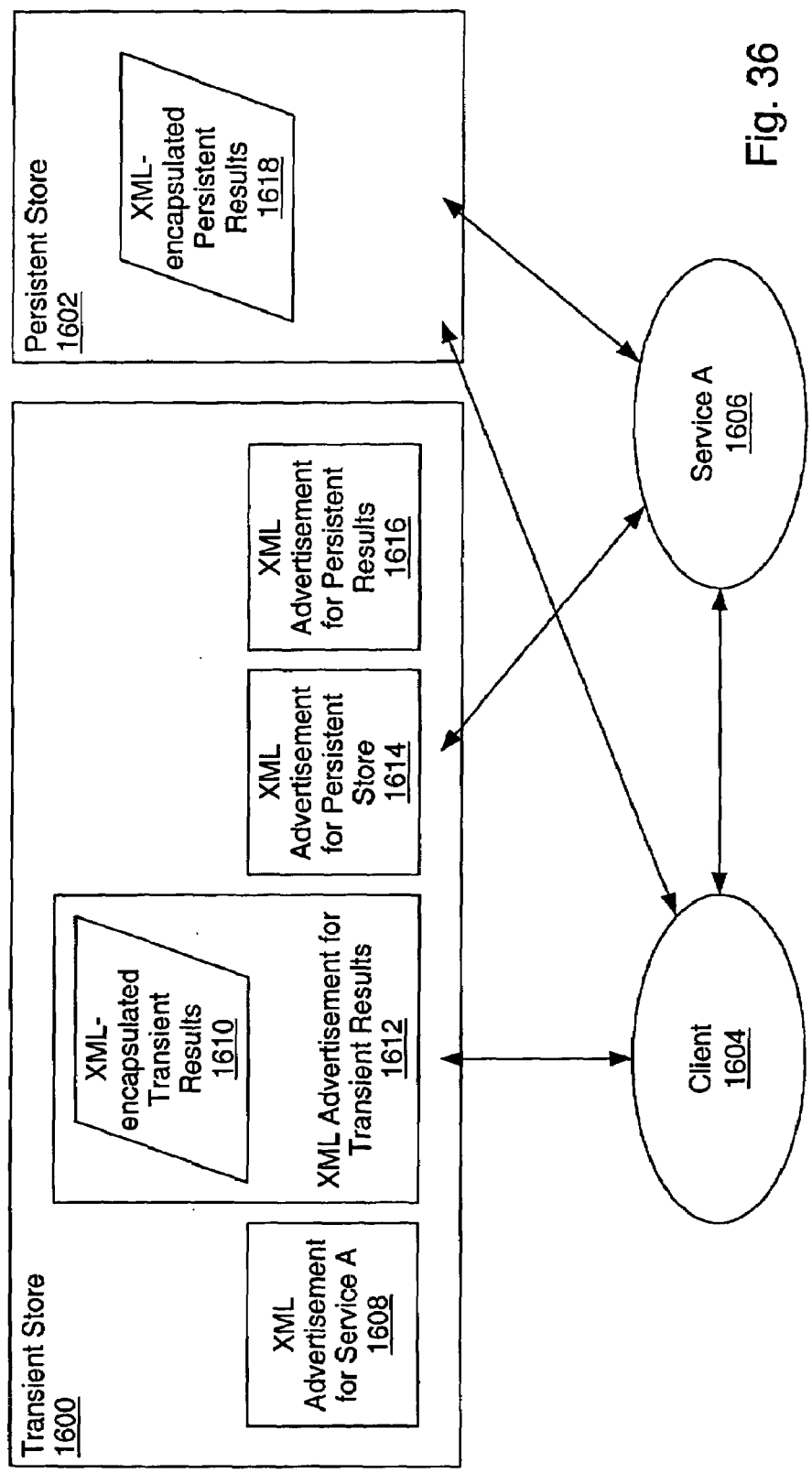
FIG. 36 illustrates a client and a service accessing store mechanisms in the distributed computing environment, according to one embodiment.

FIG. 36 illustrates a client 1604 and a service A 1606 accessing store mechanisms 1600 and 1602 in the distributed computing environment according to one embodiment. This illustration is intended to be exemplary and is not intended to be limiting to the scope of this invention. In one embodiment, store mechanisms 1600 and 1602 may each be an Internet Web page or set of Web pages defined in XML and accessible by a Web browser and other Internet tools. Store mechanism 1600 is a transient store capable of storing objects implemented using XML. Store mechanism 1602 is a persistent store also capable of storing objects implemented using XML. Service A 1606 may publish an XML service advertisement 1608 in transient store 1600. Persistent store may also publish an XML service advertisement in transient store 1600 (or on another transient store in the distributed computing environment). At some point, client 1604 may require functionality provided by Service A 1606. Client 1604 may use a discovery and/or lookup service to locate service advertisement 1608. Client 1604 may then construct a message gate, as described herein, and begin communications with Service A 1606. Client 1604 may send one or more XML request messages to Service A 1606. Service A 1606 may perform one or more functions in response to the one or more request messages. One or more of the functions performed by Service A 1606 may produce results to be provided to client 1604.

For transient results 1610, Service A 1606 may encapsulate the results in an XML advertisement 1612 and publish the advertisement 1612 in transient store 1600 (or on another transient store in the distributed computing environment). Service A 1606 may then notify client 1604 that the results 1610 are stored in advertisement 1612 on transient store 1600, or client 1604 may be notified by other mechanisms as described herein. Client 1604 may then retrieve transient results 1610 from advertisement 1612. The advertisement 1612 may include an XML schema describing the formatting, contents, type, etc. of the transient results 1610. The results may be encapsulated in XML. For example, XML tags may be used to describe portions of the data:

<XML tag1><data1>
<XML tag2><data2>

For persistent results 1618, Service A 1606 may use a service or other mechanism as described herein to locate XML service advertisement 1616 for persistent store 1602, and thus locate persistent store 1602 for storing persistent results. Alternatively, client 1604 may have previously located persistent store 1602 by locating its service advertisement 1616, and then may send a Universal Resource Identifier (URI) for a storage location for persistent results 1618 to Service A in an XML message. In one embodiment, persistent results 1618 may be stored in an Internet Web page or set of Web pages defined in XML and accessible by a Web browser. Service A 1606 may then store persistent results 1618 in persistent store 1602. Service A 1606 may then publish an XML advertisement 1616 for the persistent results 1618 in transient store 1600 (or on another transient store in the distributed computing environment) and return the location of the advertisement 1616 to client 1604. The advertisement 1616 may include an XML schema describing the formatting, contents, type, etc. of the persistent results 1618. The results may be encapsulated in XML as previously described. The advertisement may also include the URI of the persistent results 1618. The client 1604 may then retrieve the advertisement 1616 and use it to locate and retrieve persistent results 1618. Alternatively, Service A 1606 may not publish an advertisement for persistent results 1618, but instead may return a URI for the persistent results 1618 to client 1604 so client 1604 may access the results without looking up an advertisement. Note in some embodiments, the various advertisements shown in transient store 1600 may each be stored in different transient stores or spaces.

Thus, store mechanisms may be implemented as XML-based Internet Web pages in the distributed computing environment. These store mechanisms may be implemented on a variety of devices in the environment, and may provide service advertisements to allow clients (which may be other services) to locate and use the store mechanisms. Existing and future Web and XML tools may be used to manage the store mechanisms. The store mechanisms may store objects of various types implemented or encapsulated in XML. Clients on devices of substantially any size, from small footprint devices to supercomputers, may access the store mechanisms to store and retrieve the various objects on the Internet. The clients may be Java or non-Java applications, as XML provides a language-independent storage format. The transient or persistent object repositories may provide for a file system in the distributed computing environment and may include access checks and other security mechanism as described herein.

Dynamically Converting an XML Document into a Java Object

In one embodiment, the distributed computing environment may provide a mechanism to convert and represent an object class instance into an XML document. In order to send representation of a class instance to another service, the object may be converted and represented as a XML document. In one embodiment, when receiving an XML document, a program may instantiate a class instance corresponding to the object represented by the document. In one embodiment, the objects may be Java objects, and the program may be a Java program.

XML-Based Process Migration

The distributed computing environment may enable the distribution and management of distributed applications. For example, the distributed computing environment may include mobile clients that are dockable with stations that provide monitors, printers, keyboards, and various other input/output devices that are typically not provided on mobile devices such as PDAs, cell phones, etc. These mobile clients may run one or more applications, and may migrate from one station to another in the distributed computing environment. Thus, one embodiment of the distributed computing environment may provide a method for migrating an executing application (process) with its entire current state from a mobile client on one node to the same mobile client or another mobile client at another node within the distributed computing environment.

Figure 37:
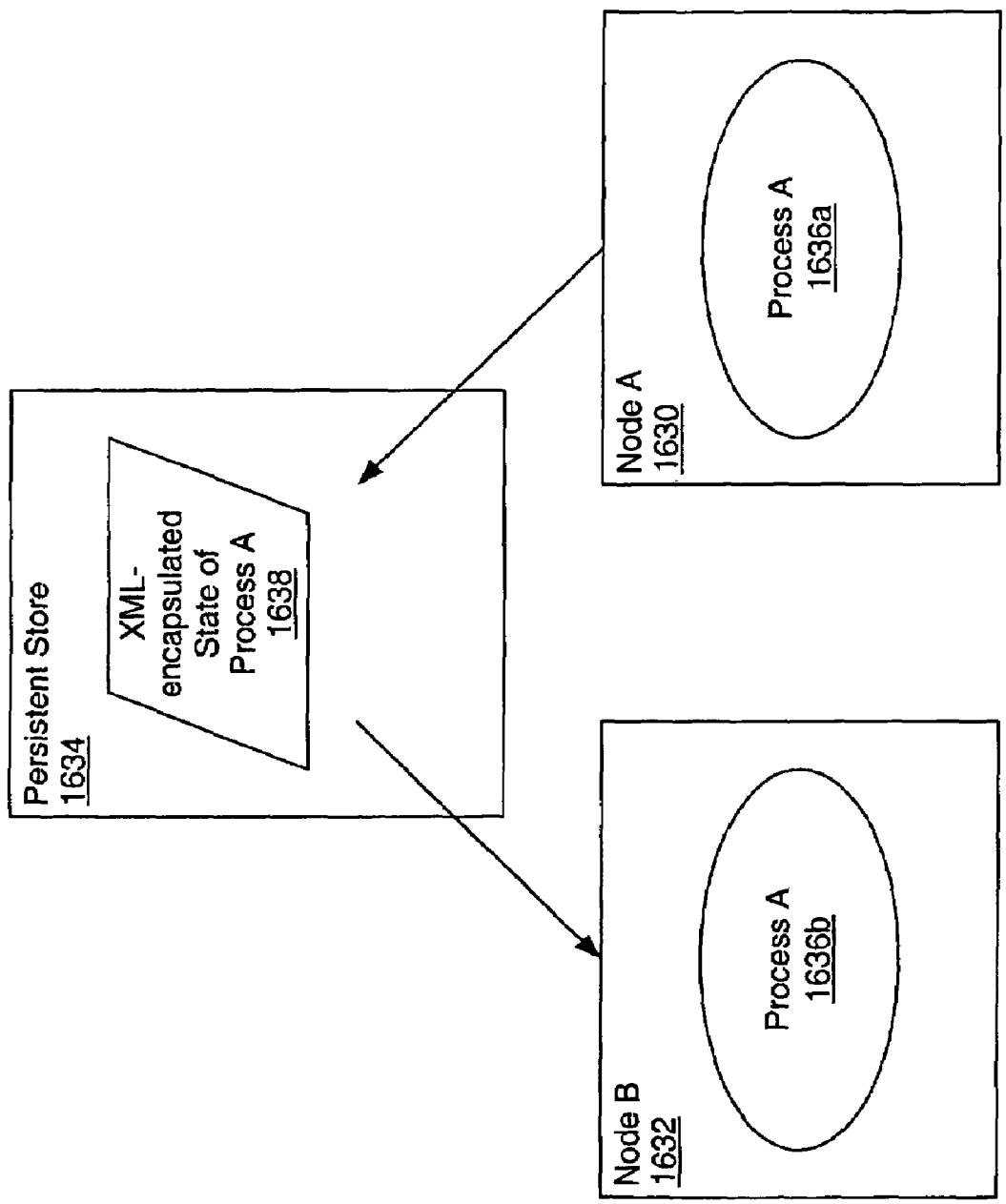
FIG. 37 illustrates process migration using an XML representation of the state of a process, according to one embodiment.

FIG. 37 illustrates process migration using an XML representation of the state of a process according to one embodiment. Process A 1636*a* may be executing on node 1630. Process A 1636*a* may be a client or service. At some point during the execution of Process A 1636*a*, the state of execution of Process A 1636*a* may be captured and stored in an XML-encapsulated state of Process A 1638. The execution of Process A 1636*a* on node 1630 may then be stopped. Later, node 1632 may locate the XML-encapsulated state of Process A 1638 and use it to resume Process A 1636*b* on the node 1632. Resuming Process A may include using the stored state 1638 to resume thread execution, recalculate transient variables, re-establish leased resources, and perform any other functions necessary to resume execution as recorded in the stored XML state of the process 1638.

Applications

Technologies exist that allow a user to access network data from remote locations, making the remote data appear as local data to the user, provided the user has access to a browser. However, such technologies do not provide an automatic infrastructure to query networks near a client device's location. A mechanism for discovering information about networks and services near a client device may be desirable. For example, such a mechanism may be used to locate information about restaurants, weather, maps, traffic, movie information, etc within a certain distance (radius) of the client device, and to display desired information on the client device. An example of using this mechanism may be a cell phone that can be used to automatically locate services in a local environment, for example, in a movie theater to display the titles and show times of current features in the movie theater or in a restaurant to view menu selections and prices. In the distributed computing environment as described herein, such a mechanism may be used to discover spaces including local information and/or services proximate to the client device. The mechanism may also be applied in other distributed computing environments, for example, the Jini system from Sun Microsystems, Inc.

In one embodiment, a mobile client device may include Global Positioning System (GPS) capability and wireless connection technology. Local distributed computing networks may be provided. For example, a city may provide a citywide distributed computing environment. Another example may be a shopping mall with a local distributed computing environment. A local distributed computing network may include a discovery mechanism to allow client devices to connect to the distributed computing environment and to discover services and data in the local environment. For example, one or more devices in the environment may include wireless connection technology to allow mobile client devices to connect to the network and to access the discovery mechanism via the XML messaging system as described previously. A local distributed computing environment may include one or more spaces with advertisements for services and/or data to be made available to mobile clients. For example, a citywide distributed computing environment may include spaces that represent entities such as malls, movie theaters, local news, local weather, traffic, etc. A space may include individual service and/or data advertisements for accessing services of and information about the entity the space represents. The discovery mechanism may include a GPS location or locations of the local distributed computing environment, entities represented by space services within the environment, and/or the various services advertised in the spaces in the environment.

In one embodiment, wired connections may be provided to a local distributed computing network. In this environment, a user with a mobile client device may "plug in" directly to the network using a wired connection "docking station". Examples of wired connections include, but are not limited to: Universal Serial Bus (USB), FireWire, and twisted-pair Internet. In one embodiment, a docking station may also provide input/output capabilities such as a keyboard, mouse, and display for the mobile client device. In this embodiment, the location of the mobile client device may be provided to the lookup or discovery mechanism by the docking station.

In one embodiment, a mobile client device may connect to a distributed computing network. As the user of the mobile client device navigates within wireless communications range of the distributed computing network, the mobile client device may constantly, or at various intervals, provide a location vector as input to the local lookup or discovery mechanism. The mobile client device may obtain the location vector from a GPS system built into or associated with the mobile client. In one embodiment, the client may send its location information (e.g. via XML messaging) to a local service discovery mechanism, such as one of the space location mechanisms described herein. For example, the client may run the space discovery protocol specifying discovery for spaces offering services within a certain range of the clients location, or the client may instantiate a space search service to search for spaces advertising services provided for the client's vicinity.

As the mobile client device moves into a specified range of a space within the distributed computing environment, the services and/or data stored in the space may be made available to the mobile client device. In embodiments where the client device regularly provides its location to a discovery mechanism, local services and/or data may automatically be made available to the client's user. In one embodiment, the specified range of a space may be determined by the user of the mobile client device. For example, the user may choose to display all restaurants within one mile of a current location. Alternatively, the range may be specified in the configuration of the local distributed computing network. For example, a citywide distributed computing network may be configured to provide its services to all users within three miles of the city limits. In one embodiment, visual indicators, for example icons, representing the various services and/or data offered by the space may be displayed on the mobile client device. The client may then access one or more of the displayed services and/or data. In one embodiment, information from two or more spaces may be displayed simultaneously on the mobile client device. In one embodiment, the user may select what services and/or data are to be detected. For example, in a shopping mall, a user with a mobile client device may choose to display all shoe stores in the mall.

In one embodiment, executable code and/or data used in the execution of the code may be downloaded to the mobile client device to allow the user to execute an application provided by a service in the space. For example, moviegoers with mobile client devices may download interactive movie reviews from services in a space for the movie theater, and may thus perform real-time feedback about the movie they are watching. In one embodiment, an XML object compilation/decompilation mechanism, e.g. as described elsewhere herein, may be used to compile the code and/or data to produce XML representations of the code and/or data, and to decompile the XML representations to reproduce the code and/or data on the mobile client device. In one embodiment, an executable version of a process may previously exist on the mobile client device, and a stored state of the process may be downloaded to the mobile client device to allow the user to execute the process using the stored state. In one embodiment, an executable version of a process may previously exist on the mobile client device, and data for the process may be downloaded to the mobile client device. For example, data may be downloaded for viewing with a viewer program on the mobile client device. In one embodiment, an executable version of a process, including the code and data for executing the process, may be downloaded for execution on the mobile client device. In one embodiment, the service may execute the application remotely on behalf of the mobile client device, and the service and client may pass to each other XML messages including data and optionally XML schemas describing the data. In one embodiment, some code may be executed on the service and some on the client. For example, the service may execute code to perform operations on a set of data such as numerical calculations. The mobile client device may execute code that may display portions of the data passed to the client from the service in XML messages and allow the user of the mobile client device to enter and/or select data and send the data to the service for performing one or more operations on the data.

In one embodiment, a mobile client device may be connected to two or more services in the distributed computing network simultaneously. The services may be used independently or in conjunction for performing a series of tasks. For example, one service may be used by a remote client device to locate and/or perform operations on a set of data, and a second service may be used to print the set of data.

Figure 38:
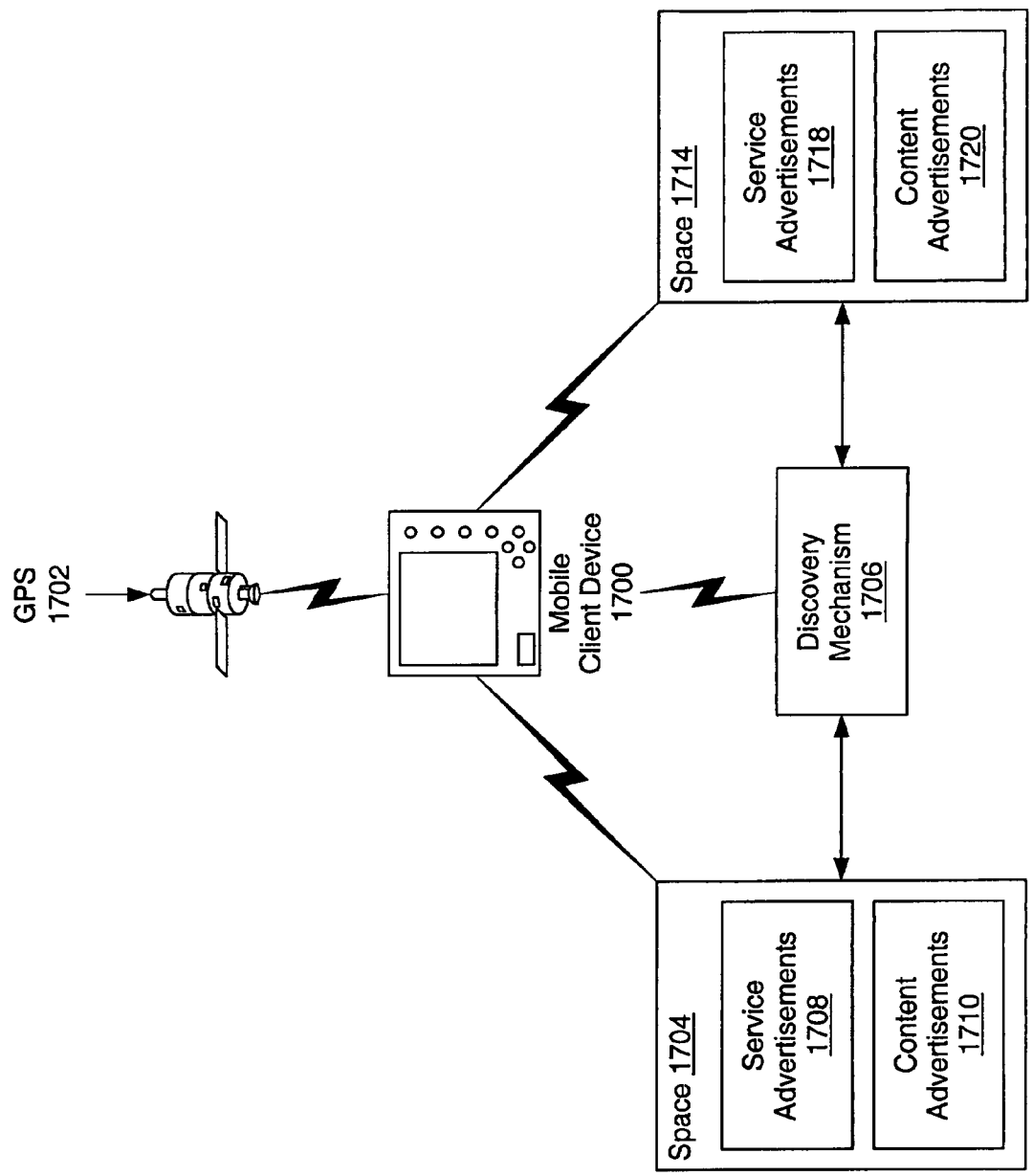
FIG. 38 illustrates a mobile client device accessing spaces in a local distributed computing network, according to one embodiment.

FIG. 38 illustrates a mobile client device accessing spaces in a local distributed computing network, according to one embodiment. A user of GPS-enabled mobile computing device 1700 may move into proximity of a local distributed computing environment. The mobile client device 1700 may provide its location provided by GPS 1702 to one or more discovery mechanisms 1706 in the local distributed computing network. The discovery mechanism 1706 may use the provided GPS location of the mobile client device and predetermined locations of spaces within the environment to determine when the user moves within a specified range of one or more spaces or a vicinity served by one or more spaces within the environment. For example, discovery mechanism 1706 may determine that mobile client device 1700 has moved within range of space 1704. Discovery mechanism 1706 may then provide one or more advertisements 1710 from space 1704 to the mobile client device 1700. Alternatively, discovery mechanism 1706 may provide a Universal Resource Identifier (URI) for space 1704, or for one or more advertisements in space 1704, to mobile client device 1700. Icons representing the various services advertised by service advertisements 1708 and/or data represented by content advertisements 1710 may then be displayed on mobile client device 1700. The user may then select one or more of the advertised services and/or data for execution and/or display on the mobile client device. The mobile computing device 1700 may establish a wireless connection with the device offering the service and communicate with the device to execute the service using the XML-based messaging system as previously described herein. Alternatively, the user of the mobile computing device 1700 may connect the device at a docking station. The location of the docking station may have been discovered by the user using the lookup or discovery mechanism 1706, and spaces containing advertisements for the docking stations to discover the location and availability of docking stations within a specified range of the user.

Discovery mechanism 1706 may also detect when mobile client device 1700 moves into a selected range of space 1714. The various service advertisements 1718 and content advertisements 1720 may then be made available to the user of the mobile client device 1700. When the mobile client device moves out of the specified range of one of the spaces, the advertisements offered by that space may be removed from the mobile client device 1700's display.

In one embodiment, advertisements on a space may include location information for the services or data that they provide. Thus, discovery mechanism 1706 may determine when mobile client device 1700 moves within a specified range of a particular service advertised on space 1718, and may provide (or remove) the service advertisement based upon the location of the mobile client device 1700.

Computing devices are shrinking while at the same time gaining power and functionality. Storage devices, CPUs, RAM, I/O ASICS, power supplies, etc. have been reduced in size to where small, mobile client devices may include much of the functionality of a full-sized personal computer. However, some components of a computer system are not easily shrinkable because of the human factor and other factors. These components include, but are not limited to: keyboards, monitors, scanners, and printers. The limits on reducing the size of some components may prevent mobile client devices from truly assuming the role of personal computers.

In one embodiment, docking stations may be provided that allow users with mobile client devices to connect to and use components that are not available on the mobile client device because of human or other factors. For example, docking stations may be provided in public places such as airports or libraries. The docking stations may provide monitors, keyboards, printers or other devices for users with mobile client devices. In one embodiment, the docking stations may not fully function without help from a real computing device such as a mobile client device connected by a user. The docking station may provide services such as various input/output functions to the client using the computing power of the mobile client device.

A docking station may provide one or more connection options to a mobile client device. The connection options may include wireless connections and wired connections. Examples of wireless connections include, but are not limited to: infrared such as IrDA and wireless network connections similar to those provided by a network interface card (NIC) in a notebook computer. Examples of wired connections include, but are not limited to: USB, FireWire, and twisted-pair Ethernet.

A mobile client device may discover the location of docking stations using a method substantially similar to that described above for mobile client devices. The location of one or more docking stations in a local distributed computing network may be discovered using a discovery mechanism to discover spaces with advertisements for docking stations. The mobile client device may provide a location to the discovery mechanism. In one embodiment, the discovery mechanism or a lookup mechanism may return the location of one or more docking stations closest to the location of the mobile client device. Alternatively, the discovery mechanism or lookup mechanism may return a URI of the space containing the advertisements for the docking stations, and the mobile client device may then connect with the space to provide the location of the one or more docking stations near the device. In one embodiment, the mobile client device may supply information to the lookup or discovery mechanism to specify requirements such as monitor resolution, screen size, graphics capabilities, available devices such as printers and scanners, etc. In one embodiment, information about the one or more docking stations may be supplied to the user on the mobile client device including availability (is another user using the docking station), components and capabilities of the various docking stations.

When a user approaches a docking station, a claiming protocol may be initiated. When the claim is accepted by the docking station, secure input and output connections may be established between the mobile client device and the docking station. Alternatively, the user may select the docking station from one or more docking stations discovered using the lookup or discovery mechanism displayed on the mobile client device. When the user selects the docking station, the claiming protocol may be initiated to give the user secure, exclusive connection to the docking station for the duration of the claim. A docking station release method may also be provided to allow the user to terminate the session on the docking station and release the docking station for use by other users. In one embodiment, the claiming protocol may be a lease on the docking station service as described previously herein.

Figure 39B:
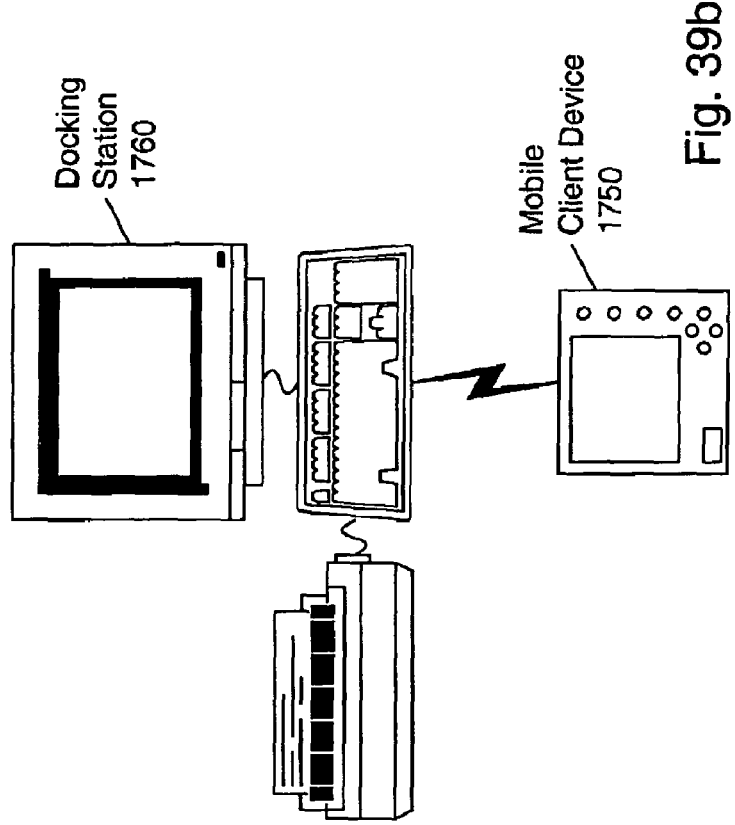
FIG. 39b illustrates a mobile client device connecting to a docking station, according to one embodiment.
Figure 39A:
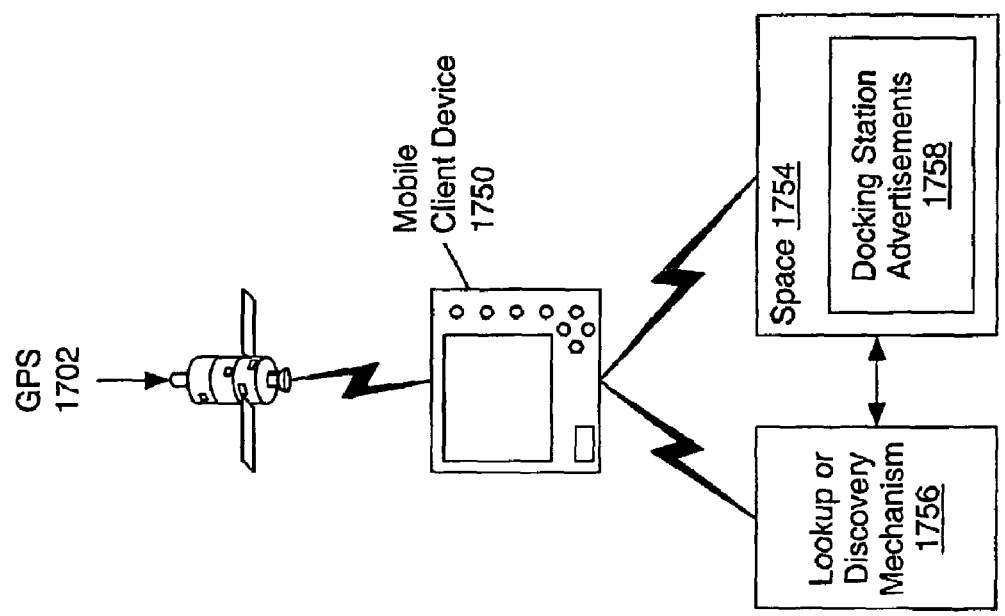
FIG. 39a illustrates a user of a mobile device discovering the location of docking stations, according to one embodiment.

FIG. 39a illustrates a user of a mobile device discovering the location of docking stations according to one embodiment.

FIG. 39b illustrates a mobile client device 1750 connecting to a docking station 1760, according to one embodiment.

In one embodiment, a user may connect a mobile client device to a docking station without using the discovery mechanism. For example, a user in an airport may visually detect a docking station and connect a mobile client device to it. Another example may be a library providing a docking station room with a plurality of docking stations for use, where users may access any of the docking stations that are available.

Small Footprint and/or Embedded Devices

Simple embedded or small footprint devices may have limited amounts of memory for storing and executing program instructions. A simple embedded device may need to understand a limited set of control inputs for initiating functionality of the device and outputs for reporting the status of the device. An example of a simple embedded device is a "smart" switch (such as a light switch) with embedded circuitry for controlling the switch and thus the device controlled by the switch. The smart switch may only need to understand two control requests (change the state of the device, request the state of the device) and to send one status message (the state of the device). The smart switch may manage the device to which it is connected by receiving its control requests from one or more control systems and reporting status messages to the one or more control systems.

In one embodiment, the distributed computing environment may provide a framework (protocol) for including small devices that may not have the resource footprint (such as memory) necessary to implement the full protocol of the distributed computing environment. In one embodiment, an agent may be provided as a bridge between the small device-capable protocol and the full protocol. The agent may perform the full protocol discovery for the small device, so the device may not be required to implement the full discovery protocol and service activation. In one embodiment, the small device may only need to send service-specific messages. In one embodiment, these messages may be pre-cooked on the small device, so the small device may only have to send messages that are part of the service activation to the agent. The agent may perform the service activation via the full protocol to the service and forward incoming message from the device to the service, and/or may forward replies from the service to the client. Thus, the agent may act as a service connector for the small client.

In one embodiment of the distributed computing environment, an embedded device may be configured to receive a specific set of control requests in the form of XML messages and to send a specific set of XML messages to make requests, report status, etc. In one embodiment, a control system may be configured to manage a variety of devices by sending XML request messages specific to each device or category of device that it controls and by receiving XML messages from the devices. In one embodiment, one or more XML schemas may be used to define an embedded device's specific set of XML messages; the schema may be used by the embedded device and/or the control system in sending and receiving XML messages.

An embedded device may include a "thin" implementation of the XML messaging system as previously described herein that supports the specific set of messages for controlling and monitoring the simple embedded device. The implementation of the XML messaging system may be tailored for use with small footprint, simple embedded devices, and thus may fit in the limited memory of the small footprint devices. In one embodiment, the XML messaging system may be implemented in a small footprint with a virtual machine targeted at small footprint embedded devices (e.g. KVM). A networking stack (to support the transport protocol for communications with one or more control systems) may be associated with the virtual machine and the XML messaging layer may "sit on top" of the networking stack. It is noted that this implementation of the messaging system may be used in other devices than small footprint or embedded devices.

In one embodiment, static or pre-generated messages may be used for requests from control systems to embedded devices. The static messages may be precompiled and stored in the embedded devices. An incoming message may be compared with the stored static messages to find a match for the message and thus to perform the function requested by the message, thus reducing or eliminating the need for code to parse incoming messages. Outgoing messages may be read directly from the stored static messages, thus reducing or eliminating the need to dynamically compile outgoing messages. Thus, static messages may be used to reduce the code footprint of the messaging layer in embedded systems. For example, static Java objects (Java op codes) may be used for request and status messages.

Figure 40B:
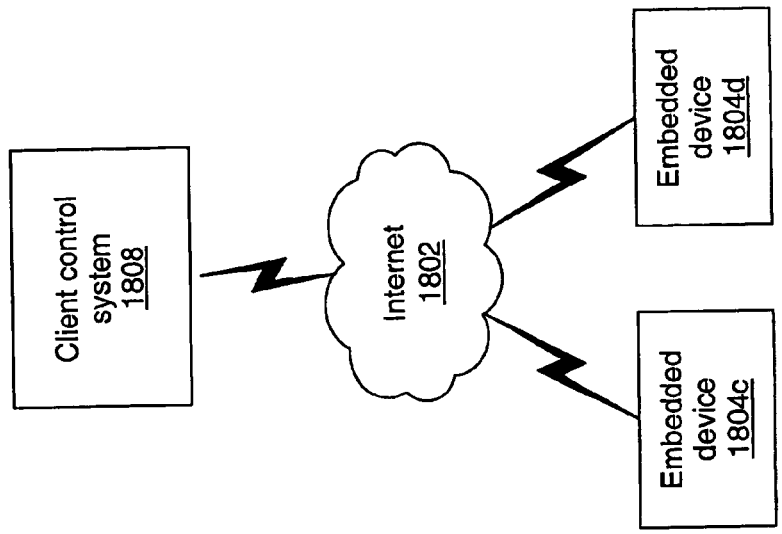
FIG. 40b illustrates a device control system connected via a network (e.g. the Internet) to embedded devices accessible within the distributed computing environment, according to one embodiment.
Figure 40A:
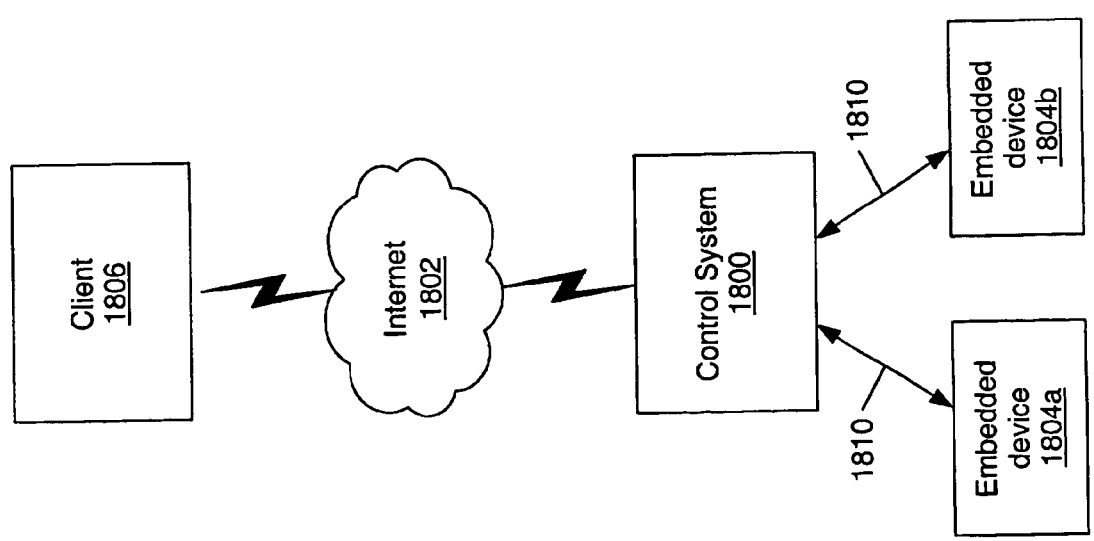
FIG. 40a illustrates an embodiment of embedded devices controlled by a control system and accessible within the distributed computing environment, according to one embodiment.

FIG. 40a illustrates an embodiment of embedded devices 1804a and 1804b controlled by a control system 1800, according to one embodiment. Control system 1800 may be networked with the devices 1804a and 1804b it controls in any of a variety of ways. The network 1810 may be wired (Ethernet, coaxial, twisted pair, power grid, etc.) and/or wireless (IRDA, microwave, etc.). In one embodiment, embedded devices 1804a and 1804b may include a thin implementation of the XML messaging system for communicating with control system 1800 over network 1810. Control system 1800 may have an implementation of the XML messaging system for sending requests to and receiving responses from embedded devices 1804a and 1804b. In one embodiment, control system 1800 may include software and hardware configured to present an interface to allow a user to display the status of and remotely control the embedded devices 1804a and 1804b. In one embodiment, control system 1800 may include software and/or hardware for automatic control of embedded devices 1804a and 1804b.

In one embodiment, embedded devices 1804a and 1804b may be part of another environment. The devices may not support the message passing model implemented by the distributed network environment. For example, the devices may be nodes in a networked automation and control system such as a LonWorks network. Control system 1800 may include a control system hardware and/or software for controlling devices in the other environment. Control system 1800 may serve as a bridge between the distributed computing environment and the other environment. The distributed computing environment may also provide a method or methods to wrap existing device discovery protocols for discovering the devices for access from the distributed network environment. Bridging and wrapping protocols are further described herein in the Bridging section.

Control system 1800 may be connected remotely or locally to one or more other systems in the distributed computing environment. FIG. 40a shows control system 1800 connected to client 1806 via the Internet 1802. Client 1806 may indirectly request the status of, and send control requests to, embedded devices 1804a and 1804b through control system 1800. Thus, control system 1800 may serve as a proxy or bridge for embedded devices 1804a and 1804b. See the Bridging section herein. To enable sophisticated communication between the client 1806 and the control system 1800, the client and the control system may have different implementations of the XML messaging system than the thin implementation on the embedded devices 1804a and 1804b. In one embodiment, client 1806 may include software and hardware configured to present an interface to allow a user of client 1806 to display the status of and remotely control the embedded devices 1804a and 1804b. In one embodiment, client 1806 must present the correct authorization credentials to control system 1800 to enable the client 1806 to access embedded devices 1804a and 1804b. In one embodiment, client 1806 may be granted access at different levels. For example, client 1806 may only be able to view the status of embedded devices 1804a and 1804b but not be allowed to remotely control the devices. In one embodiment, control system 1800 may be a service, may have a service advertisement published in the distributed computing environment, and thus may be accessed by client 1806 using the client-service method as described previously in this document. In one embodiment, client 1806 may be able to view the status of, and to remotely control, control system 1800.

FIG. 40b illustrates client control system 1808 connected via the Internet 1802 to embedded devices 1804c and 1804d, according to one embodiment. In one embodiment, embedded devices 1804c and 1804d may include a thin implementation of the XML messaging system for communicating with client control system 1808 over the Internet 1802. Client control system 1808 may have an implementation of the XML messaging system for sending requests to and receiving responses from embedded devices 1804c and 1804d. In one embodiment, client control system 1808 may include software and hardware configured to present an interface to allow a user to display the status of and remotely control the embedded devices 1804c and 1804d. In one embodiment, client control system 1800 may include software and/or hardware for automatic control of embedded devices 1804c and 1804d.

A difference between FIG. 40a and FIG. 40b is that, in the embodiment illustrated in FIG. 40b, the embedded devices 1804c and 1804d may be accessed by one or more clients in the distributed computing environment without requiring a proxy (e.g. control system). Embedded devices 1804c and 1804d may include services for accessing the functionality of the devices, may have published service advertisements in the distributed computing environment, and thus may be accessed via the client-service method as described previously in this document.

The distributed computing environment may include a mechanism for a resource-limited client to retrieve Universal Resource Identifier (URI) addressed resources. For example, a client that is only capable of sending and receiving messages via an IrDA connection may not be able to establish a URI connection to retrieve results from a results space. In one embodiment, a service may be provided as a bridge between the client and the URI resource. The bridge service may interact with the client via XML messages to gather input parameters. The following is included as an example of an XML input message syntax and is not intended to be limiting in any way:

<type name="HttpGet">
  <element name="urlstring" type="string"/>
</type>

Then, outside the distributed computing environment, the bridge service may establish a URI connection and retrieve the resource. The resource may then be encapsulated as a payload in one or more XML messages and sent to the client by the bridge service.

The following illustration of one possible use of embedded devices with thin implementations of the XML messaging system is included for exemplary purposes and is not intended to be limiting. A building may include a plurality of electronic devices that consume energy (e.g. lights, air conditioners, office equipment), and thus may require a system for maintaining an optimum energy consumption level. The plurality of devices may each include an embedded device for controlling the electronic devices. The embedded devices may include the thin implementation of the XML messaging system. One or more control systems may be coupled to the devices in a network, for example, a building LAN or even the Internet. A control system may store and execute a building management software package and an implementation of the XML messaging system configured to be used by the software package for monitoring and controlling the devices. The control system may accept input from users, and may display and otherwise output status information for the building energy consumption system, including status information for each of the plurality of devices. Energy consumption may be monitored by receiving XML status messages from each of the plurality of devices. When energy consumption levels need to be adjusted, XML control messages may be sent to one or more of the devices to cause the energy consumption to change.

Implementing Services

In one embodiment, the distributed computing environment may provide a mechanism for implementing services as servlets. The mechanism may provide functionality for developing services for the distributed computing environment.

In one embodiment, an Application Programming Interface (API) may be provided that provides the functionality to allow the service to be initialized and registered in a space. In one embodiment, the API may be used to invoke the initialization of the service and to generate an initialization status page, for example, an HTML page, that may define the status of the service. A user may access the status of the service by accessing the status page from a browser. In one embodiment, the API may be used to process incoming messages and to generate documents in response to the messages.

An embodiment of the servlet mechanism may provide several functions including, but not limited to:
Management of the client connection to the service (unique session ID)
Management of an activation space that may be used to store results advertisements
Management of leases on connections sessions and results in activation spaces
Garbage collection of sessions and results
Authentication of clients
Generation of client capabilities on a per session basis

CONCLUSION

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network and/or a wireless link.

Various modifications and changes may be made as would be obvious to a person skilled in the art having the benefit of this disclosure. It is intended that the invention embraces all such modifications and changes and, accordingly, the specifications, appendices and drawings are to be regarded in an illustrative rather than a restrictive sense.

What is claimed is:

1. A method comprising:
accessing a first space, wherein the first space comprises a first network-addressable storage location, wherein information usable to access the first space is provided in an advertisement for the first space, wherein the advertisement for the first space comprises a first schema, and wherein the first schema specifies one or more messages usable to invoke functions of the first space;
a requesting client requesting creation of a second space by sending to the first space one of the messages specified by the first schema;
creating the second space in response to the requesting client requesting creation of the second space, wherein the second space is initially configured to permit access only to the requesting client, wherein the second space comprises a second network-addressable storage location, wherein information usable to access the second space is provided in an advertisement for the second space, wherein the advertisement for the second space comprises a second schema, and wherein the second schema specifies one or more messages usable to invoke functions of the second space; and
the requesting client accessing the second space by sending to the second space one of the messages specified by the second schema.

2. The method of claim 1, further comprising:
creating a root authentication token for the second space;
initializing an authentication service associated with the second space, whereby the second space is configured to permit access only to a client holding the root authentication token; and
sending the root authentication token to the requesting client.

3. The method of claim 2, further comprising:
the requesting client sending the root authentication token to a second client; and
the second client accessing the second space by sending to the second space one of the messages specified by the second schema.

4. The method of claim 1, further comprising:
the requesting client modifying a security policy of the second space, whereby the second space is configured to permit access to a second client.

5. The method of claim 4, further comprising:
the second client reading a service advertisement from the second space, wherein the service advertisement comprises information usable to execute a corresponding service.

6. The method of claim 1,
wherein the accessing the first space comprises sending information to the first space at a first Uniform Resource Identifier (URI); and
wherein the requesting client accessing the second space comprises the requesting client sending information to the second space at a second URI.

7. The method of claim 1,
wherein the first schema is expressed in a data representation language; and
wherein the second schema is expressed in the data representation language.

8. The method of claim 7,
wherein the data representation language comprises eXtensible Markup Language (XML).

9. The method of claim 1, further comprising:
reading a service advertisement stored in the first space, wherein the service advertisement comprises information which is usable to access and execute a second service;
using the information in the service advertisement to execute the second service;
generating a set of results of the second service in response to the executing the second service; and
publishing the set of results of the second service in the second space;
wherein the requesting creation of the second space comprises requesting creation of the second space for storage of the set of results of the service.

10. The method of claim 1,
wherein the accessing the first space comprises accessing the first space at a first address to a storage facility;
wherein the creating the second space comprises creating a second address to the storage facility; and
wherein the accessing the second space comprises accessing the second space at the second address to the storage facility.

11. The method of claim 1,
wherein the functions of the first space comprise storing information in the first space and reading information from the first space; and
wherein the functions of the second space comprise storing information in the second space and reading information from the second space.

12. A system comprising:
a first client;
a first space which is communicatively coupled to the client, wherein the first space comprises a first network-addressable storage location, wherein information usable to access the first space is provided in an advertisement for the first space, wherein the advertisement for the first space comprises a first schema, and wherein the first schema specifies one or more messages usable to invoke functions of the first space;

wherein the first client is operable to:
  access the first space;
  request creation of a second space by sending to the first space one of the messages specified by the first schema, wherein the second space is initially configured to permit access only to the first client, wherein the second space comprises a second network-addressable storage location, wherein information usable to access the second space is provided in an advertisement for the second space, wherein the advertisement for the second space comprises a second schema, and wherein the second schema specifies one or more messages usable to invoke functions of the second space; and
  access the second space by sending to the second space one of the messages specified by the second schema.

13. The system of claim 12,
wherein the second space is configured to permit access only to a client holding a root authentication token; and
wherein the second space is operable to send the root authentication token to the first client.

14. The system of claim 13, further comprising:
a second client which is communicatively coupled to the first client and the second space;
wherein the first client is operable to send the root authentication token to the second client; and
wherein the second client is operable to access the second space by sending to the second space one of the messages specified by the second schema.

15. The system of claim 12, further comprising:
a second client which is communicatively coupled to the first client and the second space;
wherein the first client is operable to modify a security policy of the second space, whereby the second space is configured to permit access to the second client.

16. The system of claim 15,
wherein the second client is operable to read a service advertisement from the second space, wherein the service advertisement comprises information usable to execute a corresponding service.

17. The system of claim 12,
wherein in accessing the first space, the first client is operable to send information to the first space at a first URI; and
wherein in accessing the second space, the first client is operable to send information to the second space at a second URI.

18. The system of claim 12,
wherein the first schema is expressed in a data representation language; and
wherein the second schema is expressed in the data representation language.

19. The system of claim 18,
wherein the data representation language comprises eXtensible Markup Language (XML).

20. The system of claim 12, further comprising:
a service which is communicatively coupled to the first client and to the first space;
wherein the first client is operable to read a service advertisement stored in the first space, wherein the service advertisement comprises information which is usable to access and execute the service;
wherein the service is operable to:
  generate a set of results of executing the service;
  create the second space; and
  publish the set of results in the second space.

21. The system of claim 12,
wherein in accessing the first space, the first client is operable to access the first space at a first address to a storage facility;
wherein in requesting creation of the second space, the first client is operable to request creation of a second address to the storage facility; and
wherein in accessing the second space, the first client is operable to access the second space at the second address to the storage facility.

22. The system of claim 12,
wherein the functions of the first space comprise storing information in the first space and reading information from the first space; and
wherein the functions of the second space comprise storing information in the second space and reading information from the second space.

23. A carrier medium comprising program instructions which are computer-executable to implement:
accessing a first space, wherein the first space comprises a first network-addressable storage location, wherein information usable to access the first space is provided in an advertisement for the first space, wherein the advertisement for the first space comprises a first schema, and wherein the first schema specifies one or more messages usable to invoke functions of the first space;
a requesting client requesting creation of a second space by sending to the first space one of the messages specified by the first schema;
creating the second space in response to the requesting client requesting creation of the second space, wherein the second space is initially configured to permit access only to the requesting client, wherein the second space comprises a second network-addressable storage location, wherein information usable to access the second space is provided in an advertisement for the second space, wherein the advertisement for the second space comprises a second schema, and wherein the second schema specifies one or more messages usable to invoke functions of the second space; and
the requesting client accessing the second space by sending to the second space one of the messages specified by the second schema.

24. The carrier medium of claim 23, wherein the program instructions are further computer-executable to implement:
creating a root authentication token for the second space;
initializing an authentication service associated with the second space, whereby the second space is configured to permit access only to a client holding the root authentication token; and
sending the root authentication token to the requesting client.

25. The carrier medium of claim 24, wherein the program instructions are further computer-executable to implement:
the requesting client sending the root authentication token to a second client; and
the second client accessing the second space by sending to the second space one of the messages specified by the second schema.

26. The carrier medium of claim 23, wherein the program instructions are further computer-executable to implement:
the requesting client modifying a security policy of the second space, whereby the second space is configured to permit access to a second client.

27. The carrier medium of claim 26, wherein the program instructions are further computer-executable to implement:
the second client reading a service advertisement from the second space, wherein the service advertisement comprises information usable to execute a corresponding service.

28. The carrier medium of claim 23,
wherein in the accessing the first space, the program instructions are further computer-executable to implement sending information to the first space at a first URI; and
wherein in the requesting client accessing the second space, the program instructions are further computer-executable to implement the requesting client sending information to the second space at a second URI.

29. The carrier medium of claim 23,
wherein the first schema is expressed in a data representation language; and
wherein the second schema is expressed in the data representation language.

30. The carrier medium of claim 29,
wherein the data representation language comprises eXtensible Markup Language (XML).

31. The carrier medium of claim 23, wherein the program instructions are further computer-executable to implement:
reading a service advertisement stored in the first space, wherein the service advertisement comprises information which is usable to access and execute a second service;
using the information in the service advertisement to execute the second service;
generating a set of results of the second service in response to the executing the second service; and
publishing the set of results of the second service in the second space;
wherein in the requesting creation of the second space, the program instructions are further computer-executable to implement requesting creation of the second space for storage of the set of results of the second service.

32. The carrier medium of claim 23,
wherein in the accessing the first space, the program instructions are further computer-executable to implement accessing the first space at a first address to a storage facility;
wherein in the creating the second space, the program instructions are further computer-executable to implement creating a second address to the storage facility; and
wherein in the accessing the second space, the program instructions are further computer-executable to implement accessing the second space at the second address to the storage facility.

33. The carrier medium of claim 23,
wherein the functions of the first space comprise storing information in the first space and reading information from the first space; and
wherein the functions of the second space comprise storing information in the second space and reading information from the second space.

* * * * *